United States Patent
Yamaguchi et al.

(10) Patent No.: US 12,139,381 B2
(45) Date of Patent: Nov. 12, 2024

(54) MOBILE CRANE

(71) Applicant: KOBELCO CONSTRUCTION MACHINERY CO., LTD., Hiroshima (JP)

(72) Inventors: Takunori Yamaguchi, Hiroshima (JP); Kazufumi Kudara, Hiroshima (JP); Teppei Maedo, Hiroshima (JP); Nobuhiro Takamatsu, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 907 days.

(21) Appl. No.: 17/257,744

(22) PCT Filed: Jul. 12, 2019

(86) PCT No.: PCT/JP2019/027731
§ 371 (c)(1),
(2) Date: Jan. 4, 2021

(87) PCT Pub. No.: WO2020/013320
PCT Pub. Date: Jan. 16, 2020

(65) Prior Publication Data
US 2021/0171322 A1      Jun. 10, 2021

(30) Foreign Application Priority Data

Jul. 13, 2018   (JP) .................................. 2018-133634
Jul. 13, 2018   (JP) .................................. 2018-133635
(Continued)

(51) Int. Cl.
B66C 23/80      (2006.01)
B66C 13/00      (2006.01)
B66C 23/88      (2006.01)

(52) U.S. Cl.
CPC .............. B66C 23/80 (2013.01); B66C 13/00 (2013.01); B66C 23/88 (2013.01); *B66C 2700/0378* (2013.01)

(58) Field of Classification Search
CPC ....... B66C 23/88; B66C 23/90; B66C 23/905; B66C 23/80; B66C 23/94; B66C 2700/0378
See application file for complete search history.

(56) References Cited

U.S. PATENT DOCUMENTS

2007/0012641 A1      1/2007   Hinata

FOREIGN PATENT DOCUMENTS

| CN | 104961061 A | 10/2015 |
| CN | 107572432 A | 1/2018 |

(Continued)

OTHER PUBLICATIONS

Machine Translation of JP 2003112889A. (Year: 2003).*
(Continued)

*Primary Examiner* — Michael R Mansen
*Assistant Examiner* — Juan J Campos, Jr.
(74) *Attorney, Agent, or Firm* — Oblon, McClelland, Maier & Neustadt, L.L.P.

(57) ABSTRACT

A mobile crane includes: a lower traveling body including a pair of crawlers; an upper slewing body supported on the lower traveling body slewably about a slewing axis; a tiltable attachment including a boom tiltably supported on the upper slewing body; and a physical quantity detector. The lower traveling body has a reaction force receiving part for receiving a reaction force from the ground at a position away from the slewing axis in a boom direction in a state where the pair of crawlers are in contact with the ground, the boom direction coinciding with a horizontal component of a direction in which the boom extends from the upper slewing
(Continued)

body, and the physical quantity detector detects a physical quantity which changes in accordance with a change in the reaction force received from the ground by the reaction force receiving part.

25 Claims, 58 Drawing Sheets

(30) Foreign Application Priority Data

| | | |
|---|---|---|
| Jul. 13, 2018 | (JP) | 2018-133636 |
| Jul. 13, 2018 | (JP) | 2018-133637 |
| Jul. 12, 2019 | (JP) | 2019-129729 |
| Jul. 12, 2019 | (JP) | 2019-129730 |

(56) References Cited

FOREIGN PATENT DOCUMENTS

| | | |
|---|---|---|
| DE | 26 09 631 A1 | 9/1977 |
| DE | 20 2010 001 192 U1 | 7/2011 |
| DE | 10 2014 213 724 A1 | 1/2016 |
| EP | 3 067 257 A2 | 9/2016 |
| EP | 3 096 119 A1 | 11/2016 |
| JP | 48-96609 U | 11/1973 |
| JP | 55-175558 U | 12/1980 |
| JP | 60-108595 U | 7/1985 |
| JP | 61-287696 A | 12/1986 |
| JP | 3-8698 A | 1/1991 |
| JP | 7-35559 U | 7/1995 |
| JP | 8-217384 A | 8/1996 |
| JP | 9-58978 A | 3/1997 |
| JP | 9-110383 A | 4/1997 |
| JP | 10-72187 A | 3/1998 |
| JP | 10-265176 A | 10/1998 |
| JP | 11-246176 A | 9/1999 |
| JP | 2000-136090 A | 5/2000 |
| JP | 2002-3172 A | 1/2002 |
| JP | 2003-112889 A | 4/2003 |
| JP | 2004-307188 A | 11/2004 |
| JP | 2014-162607 A | 9/2014 |
| JP | 2014-210625 A | 11/2014 |
| JP | 2016-215744 A | 12/2016 |
| JP | 2016-221993 A | 12/2016 |

OTHER PUBLICATIONS

Machine Translation of JP 038698A. (Year: 1991).*
CN 107572432A Machine Translation (Year: 2018).*
JPH 09110383A Machine Translation (Year: 1997).*
DE 102014213724 A1 Machine Translation (Year: 2016).*
Extended European Search Report issued Jul. 30, 2021 in European Patent Application No. 19834030.9, citing documents AO through AS therein, 7 pages.
International Search Report issued on Sep. 24, 2019 in PCT/JP2019/027731 filed on Jul. 12, 2019, citing documents AA and AO-AT therein, 2 pages.
Office Action issued Oct. 24, 2023, in corresponding Japanese Patent Application No. 2019-129729 (with English Translation), citing documents 15 and 16 therein, 6 pages.
Office Action issued Oct. 24, 2023, in corresponding Japanese Patent Application No. 2019-129730 (with English Translation), citing document 17 therein, 6 pages.
Office Action issued Jun. 14, 2022, in corresponding Japanese Patent Application No. 2018-133634 (with English Translation), citing documents AO, AP therein, 4 pages.
Office Action issued Jun. 14, 2022, in corresponding Japanese Patent Application No. 2018-133637 (with English Translation), citing documents AQ, AR therein, 8 pages.
Office Action issued Jul. 4, 2023, in corresponding Japanese Patent Application No. 2019-129730 (with English Translation), citing documents 15 and 16 therein, 8 pages.
Extended European Search Report issued Jun. 13, 2024, in corresponding European Patent Application No. 24162948.4 citing documents 15-19 therein, 9 pages.

* cited by examiner

FIG.19
(A)
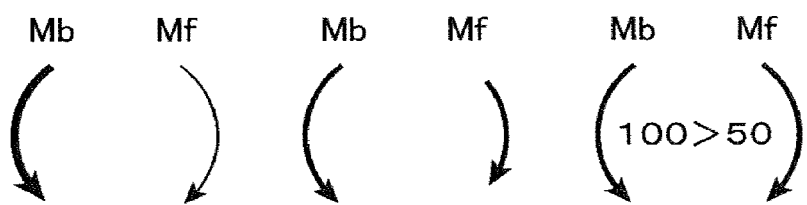
(B)
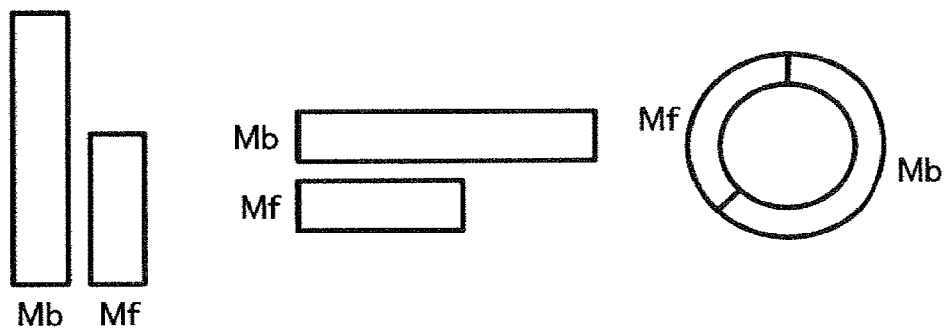
(C)
| Mb=100 |
| Mf=50 |
| Mb | Mf |
|-----|-----|
| 100 | 50 |

FIG.25
(A)
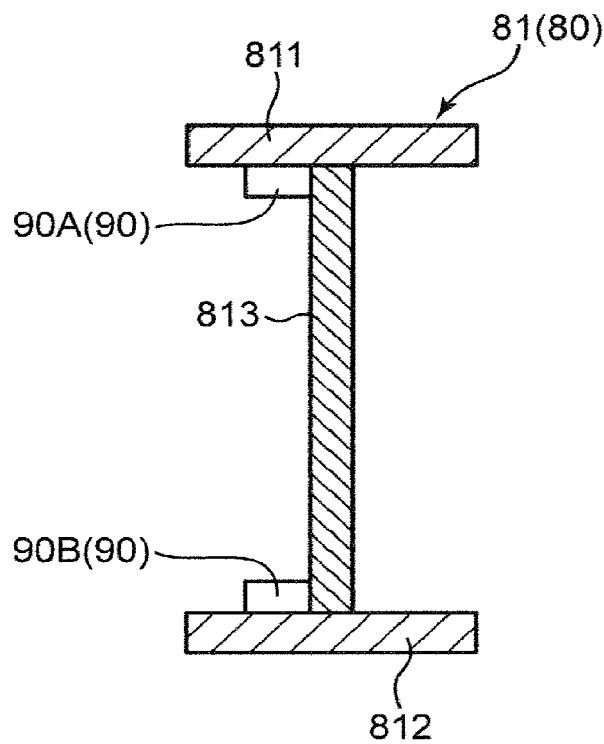
(B)
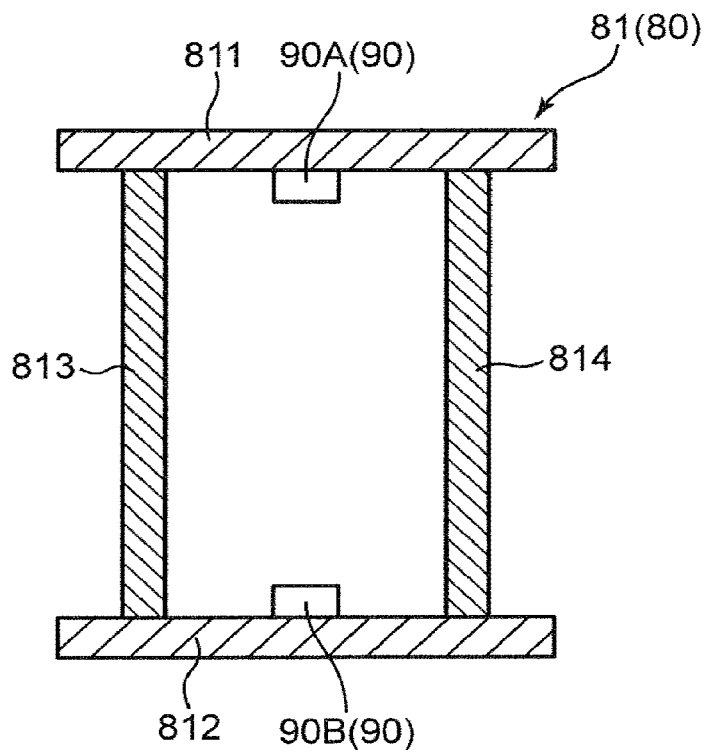

FIG.33
(A)
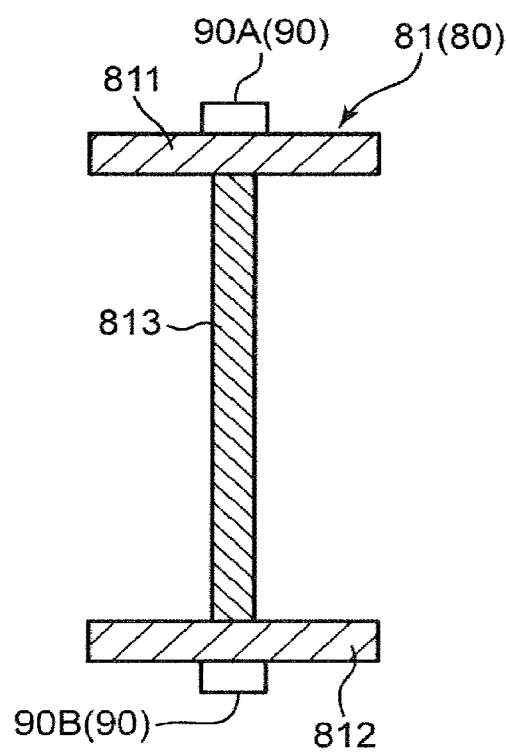
(B)
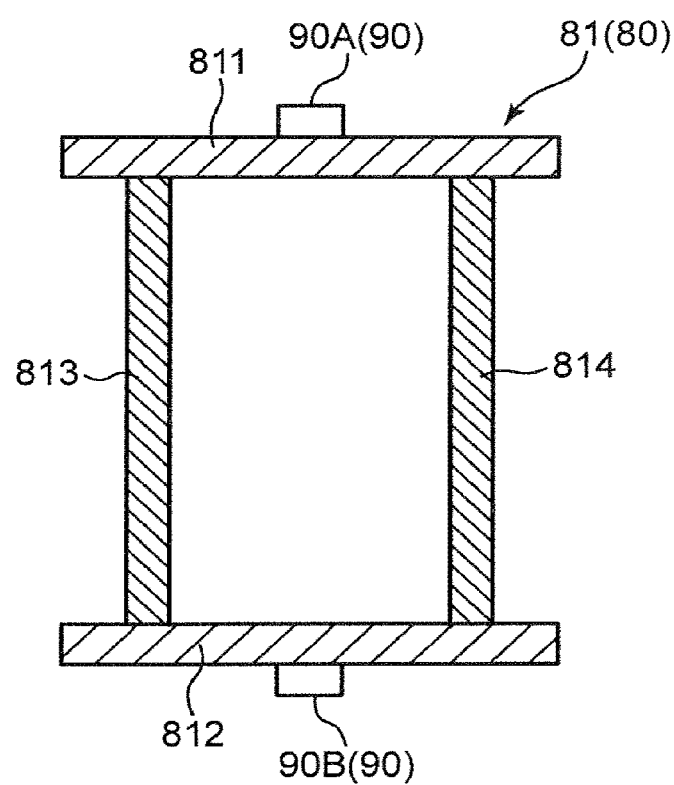

MOBILE CRANE

TECHNICAL FIELD

The present invention relates to a mobile crane.

BACKGROUND ART

There have been conventionally known mobile cranes each including a lower travelling body of a self-running type, an upper slewing body slewably mounted on the lower travelling body, and a tiltable attachment including a boom tiltably attached to the upper slewing body. Such a mobile crane performs a hoisting work of hoisting a hanged load in a state (a raised state) where the boom is raised from the upper slewing body. Further, in an assembly work of assembling the mobile crane, the boom is attached to the upper slewing body in a state (a lowered state) where the boom is lowered with a posture substantially parallel to the ground. For the hoisting work, the posture of the boom is then changed from the lowered state to the raised state by way of a raising operation of gradually increasing an inclination angle of the boom to the ground. Conversely, for a disassembly work of disassembling the mobile crane, the posture of the boom in the raised state is rechanged to the lowered state by way of a lowering operation of gradually decreasing the inclination angle of the boom to the ground.

In the aforementioned crane, a gravity center position of the tiltable attachment including the boom shifts in accordance with a change in the inclination angle of the boom to the ground. Accordingly, a moment correlating with the weight and the gravity center position of the tiltable attachment changes. The mobile crane includes a moment limiter to prevent the change in the moment from causing the mobile crane to turn over. Moreover, the moment limiter gives an alarm to suspend the operation of the mobile crane or the like when a turning-over moment of the mobile crane reaches a predetermined threshold in accordance with the change in the inclination angle of the boom in the hoisting work, resulting in ensuring the safety.

Meanwhile, the assembly work and the disassembly work involving the extensive raising and lowering operations between the raised state and the lowered state as described above differ from the hoisting work in the following respects. Specifically, the moment limiter is a device basically directed to the stability during the hoisting work. Therefore, the moment limiter sets a hoisting performance within a work range presumed to be necessary for the hoisting work. In contrast, the assembly work and the disassembly work may be performed in a situation with a range deviating from the work range of the hoisting work, e.g., may be performed in the situation of the aforementioned lowered state where the inclination angle of the boom to the ground is small, in addition to the work range of the hoisting work. In this regard, the moment limiter sets no hoisting performance for the range deviating from the work range of the hoisting work. Under the circumstances, the angle of the boom is decreased for the assembly work and the disassembly work while the moment limiter is stopped or a limit set by the moment limiter is released without stopping the moment limiter. Hence, an operator of the mobile crane is required to have experiences and knowledge for determining whether the inclination angle of the boom assures safety in the assembly work and the disassembly work. Various technologies have been proposed to increase the safety in the assembly work and the disassembly work.

Patent Literature 1 discloses an operation of raising a boom having a posture extending from an upper slewing body in one of leftward and rightward directions. Patent Literature 1 discloses that a distance from a turning-over fulcrum increases by a side jack attached to a lateral part of a side frame that faces the boom when the boom having the posture is raised (paragraph [0015] of Patent Literature 1).

Patent Literature 2 discloses an operation assisting device for a crane. A certain combination of a boom length and a jib length of a front attachment (a tiltable attachment) attains a stability during an operation of lowering the front attachment in the crane including the operation assisting device under the condition that a relative angle of a boom to a jib is defined as a first target angle. In this case, the operation of lowering the front attachment is continued until a distal end of the jib comes into contact with the ground in the state where the relative angle of the jib to the boom is maintained at the first target angle. The technology disclosed in Patent Literature 2 requires an operator to input in advance, to the operation assisting device, various information including information concerning the boom and the jib, and a target value of the relative angle of the boom to the jib.

However, the operator of the crane is still required to have the experiences and knowledge for determining whether the inclination angle of the boom assures safety in the assembly work and the disassembly work even with the increased distance from the turning-over fulcrum owing to the side jack of Patent Literature 1. That is to say, success or failure in safe operations of raising and lowering the boom depends on the operator's experiences and knowledge.

Additionally, different mobile cranes have different specifications, e.g., a crane including a boom, a jib, and a strut like the crane disclosed in Patent Literature 2, a crane including a boom without a jib, a crane including a lattice mast, and other cranes with various specifications. A tiltable attachment is suitably selected, and a boom length and a jib length are adjusted to meet a required performance and a type of work for each of the mobile cranes. With the technology disclosed in Patent Literature 2, it is necessary to input information concerning a boom and a jib for all the specifications, and a target value suitably for each of the specifications. In this regard, however, the operator is overburden with the grasp and the input of the information and the target values for all the specifications, which may lead to a typographical error made by the operator.

This problem may occur in other works as well as the assembly work and the disassembly work. Such other works include, for example, a work for an overload test related to the mobile crane. The overload test is a test of confirming a hoisting work of hoisting a predetermined hanged load to apply a load exceeding a rated load to the mobile crane while the moment limiter is stopped or a limit of the moment limiter is released without stopping the moment limiter.

CITATION LIST

Patent Literature

Patent Literature 1: Japanese Unexamined Patent Publication No. 2016-221993

Patent Literature 2: Japanese Unexamined Patent Publication No. 2014-162607

SUMMARY OF INVENTION

The present invention has been accomplished to solve the aforementioned problem, and an object of the present invention is to provide a mobile crane which can detect information necessary to safely raise and lower a tiltable attachment without an overburdened input operation by an operator.

Provided is a mobile crane, including: a lower traveling body which includes a pair of crawlers each extending in forward and rearward directions and spaced apart from each other in leftward and rightward directions; an upper slewing body supported on the lower traveling body slewably about a slewing axis; a tiltable attachment including a boom tiltably supported on the upper slewing body; and a physical quantity detector. The lower traveling body has a reaction force receiving part for receiving a reaction force from the ground at a position away from the slewing axis in a boom direction in a state where the pair of crawlers is in contact with the ground, the boom direction coinciding with a horizontal component of a direction in which the boom extends from the upper slewing body. The physical quantity detector is configured to detect a physical quantity which changes in accordance with a change in the reaction force received from the ground by the reaction force receiving part.

BRIEF DESCRIPTION OF DRAWINGS

FIG. 19 shows specific examples of stability information notified on a display part of a notification device in the mobile crane.

FIG. 25A is an exemplary cross-sectional view of a beam of the support member taken along the line XXV-XXV in FIG. 24.

FIG. 25B is another exemplary cross-sectional view of the beam of the support member taken along the line XXV-XXV in FIG. 24.

FIG. 33A is an exemplary cross-sectional view of a beam of a support member taken along the line XXXIII-XXXIII in FIG. 32.

FIG. 33B is another exemplary cross-sectional view of the beam of the support member taken along the line XXXIII-XXXIII in FIG. 32.

DESCRIPTION OF EMBODIMENTS

Hereinafter, a mobile crane according to each of the embodiments will be described.

[Mobile Crane]

Figure 1:
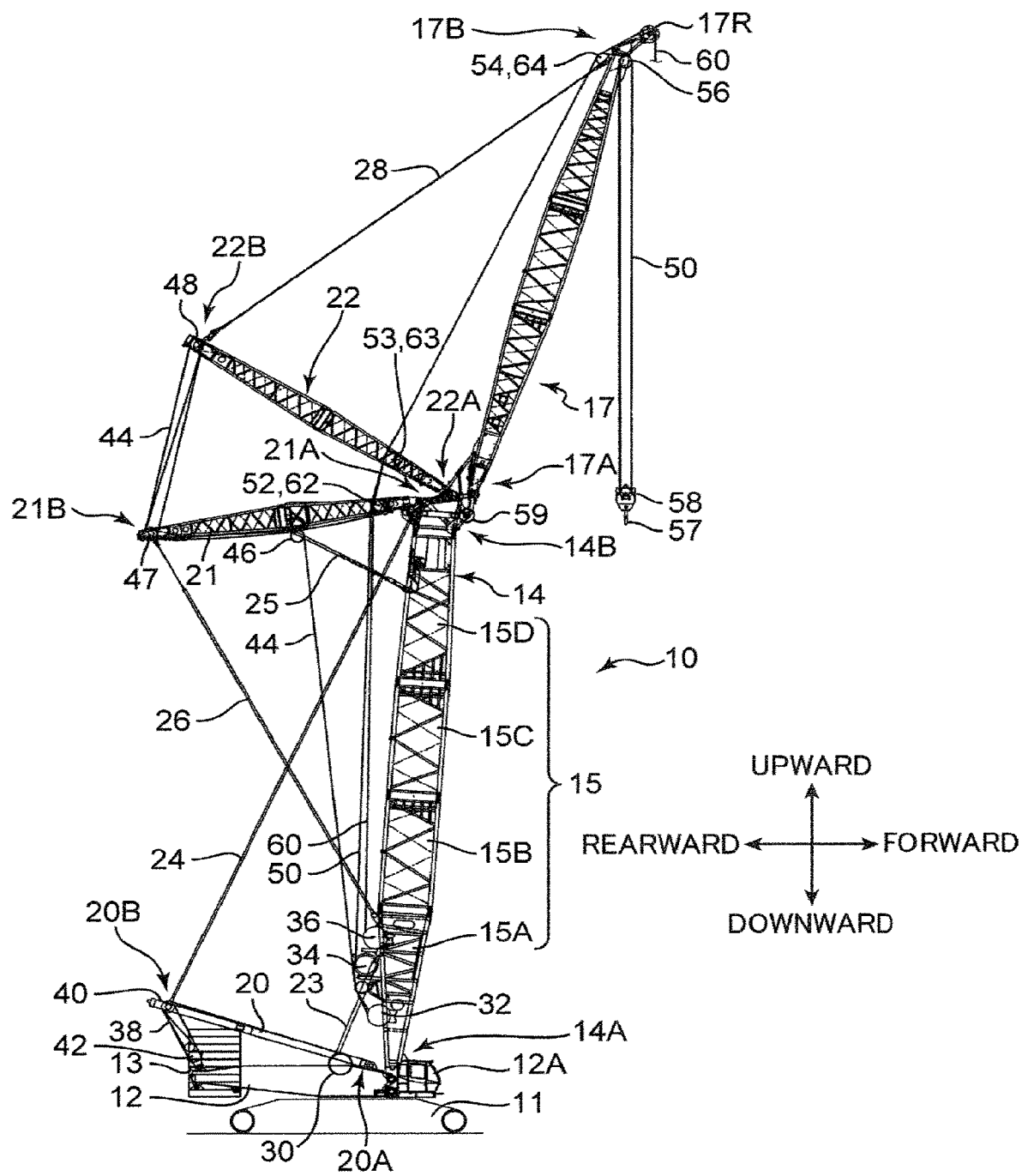
FIG. 1 is a sideview of a mobile crane according to embodiments including a tiltable attachment having a posture in a raised state in a hoisting work.
Figure 2:
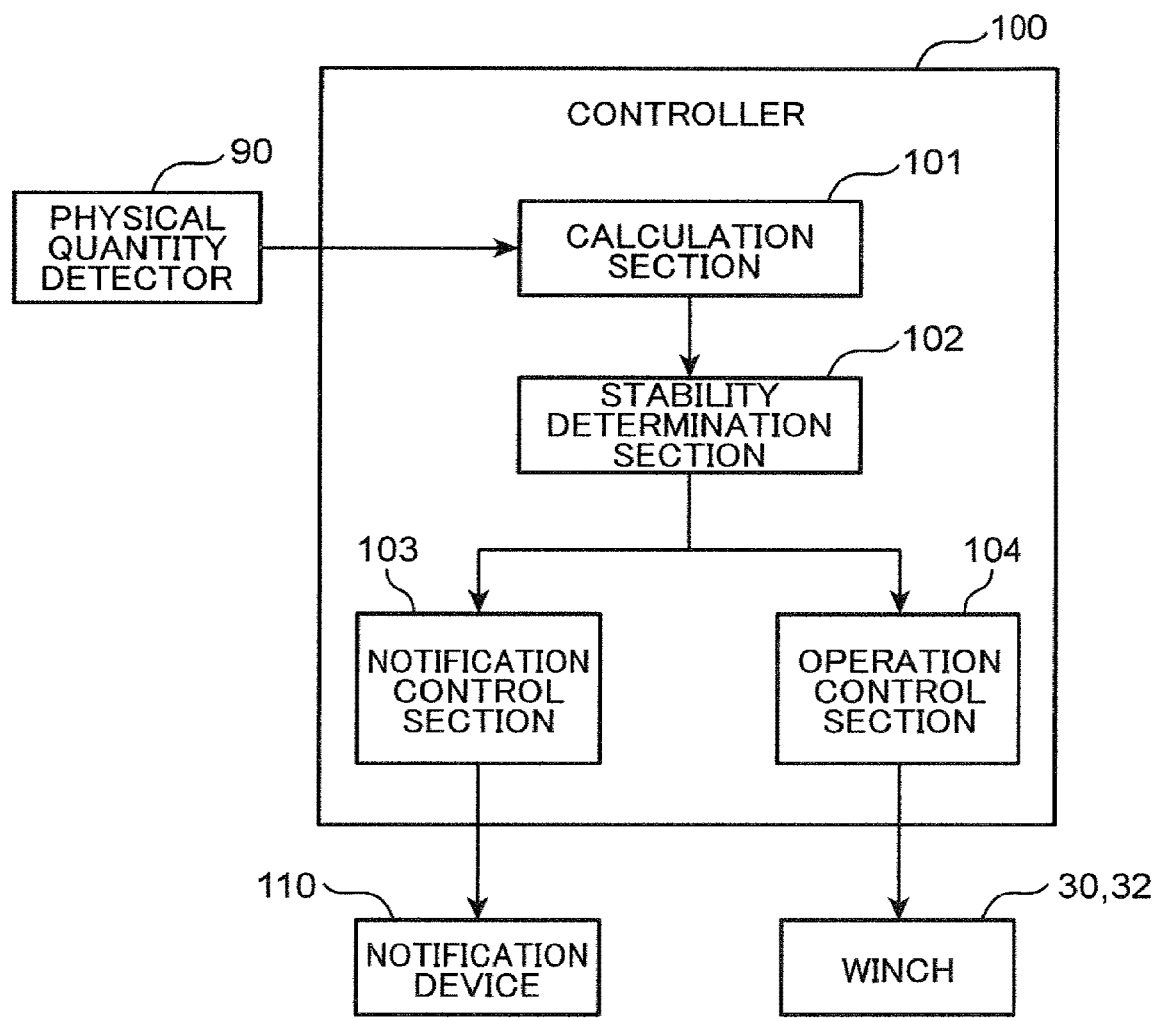
FIG. 2 is a block diagram showing an operative configuration of the mobile crane shown in FIG. 1.

FIG. 1 is a sideview of a mobile crane 10 according to each of the embodiments having a specific posture that a tiltable attachment is in a raised state in a hoisting work of hoisting a hanged load on a work site. FIG. 2 is a block diagram showing an operative configuration of the mobile crane 10 in FIG. 1.

The directions denoted by "UPWARD", "DOWNWARD", "FORWARD", "REARWARD", "RIGHTWARD", and "LEFTWARD" in the drawings are defined with respect to a lower traveling body 11 of the mobile crane. The forward and rearward directions in the drawings represent directions in which the lower traveling body 11 moves forward and rearward. Specifically, in the embodiments, a direction from a longitudinal center of a crawler frame 1 to a wheel 4a (see FIG. 3) to be described later is defined as a forward direction, and a direction from the longitudinal center of the crawler frame 1 to a wheel 4c (see FIG. 3) to be described later is defined as a rearward direction. Leftward and rightward directions are determined in relation to the forward and rearward directions. However, the way of defining the forward and rearward directions is just an example, and thus should not be limited thereto. For instance, the direction from the longitudinal center of the crawler frame 1 to the wheel 4a may be defined as a rearward direction, and the direction from the longitudinal center of the crawler frame 1 to the wheel 4c may be defined as a forward direction.

As shown in FIG. 1, the crane 10 includes the lower traveling body 11 of a self-travelling type, an upper slewing body 12 mounted on the lower traveling body 11 slewably about a slewing axis C (see FIGS. 3, 4 and 10), a tiltable attachment, a mast 20, a counterweight 13 carried on a rear part of the upper slewing body, at least one physical quantity detector 90 (see FIG. 2), a controller 100 (see FIG. 2), and a notification device 110 (see FIG. 2). In the embodiments, the tiltable attachment includes a boom 14, a jib 17, an upper strut 22, and a lower strut 21.

The boom 14 is tiltably and detachably attached to the upper slewing body 12. The boom 14 shown in FIG. 1 has a boom main body 15 of a lattice-type, a proximal end 14A, and a distal end 14B.

The boom main body 15 has a proximal end member 15A, one or more (two in the illustrated example) intermediate members 15B, 15C, and a distal end member 15D. The proximal end member 15A is coupled to a front part of the upper slewing body 12 swingably in raising and lowering directions. The intermediate members 15B, 15C are detachably connected with a distal end of the proximal end member 15A in this order. The distal end member 15D is detachably connected with a distal end of the intermediate member 15C. The intermediate members 15B, 15C are excludable.

The jib 17 is rotatably and detachably attached to a distal end of the boom 14. The jib 17 has a lattice configuration in the illustrated example. The jib 17 has a proximal end 17A rotatably coupled to the distal end 14B of the boom 14. A rotational axis of the jib 17 is parallel to a rotational axis of the boom main body 15 with respect to the upper slewing body 12. As shown in FIG. 1, the jib 17 has a distal end 17B provided with a roller 17R which can support the jib 17 and rotate on the ground while the distal end 17B is in contact with the jib 17.

The upper strut 22 and the lower strut 21 enable the jib 17 to rotate. The upper strut 22 is rotatably attached to the distal end 14B of the boom 14. The lower strut 21 is rotatably attached to the distal end 14B of the boom 14 in the rear of or below the upper strut 22. The upper strut 22 and the lower strut 21 are attachable to and detachable from the distal end 14B of the boom 14.

A pair of left and right backstops 23 is disposed above the upper slewing body 12. The left and right backstops 23 respectively come into contact with the left and right opposite side ends of the proximal end member 15A of the boom 14 when the boom 14 is raised and reaches the posture shown in FIG. 1. The contact restricts the boom 14 from being blown rearward with a strong wind or the like.

The lower strut 21 is held in a posture of protruding from the distal end 14B of the boom 14 in a boom raising direction (a leftward direction in FIG. 1). A way of holding the posture includes arranging a pair of left and right backstops 25 and a pair of left and right strut guide lines 26 between the lower strut 21 and the boom 14. Each of the backstops 25 connects the distal end member 15D and a middle portion of the lower strut 21 with each other for supporting the lower strut 21 from below. The guide line 26 extends under a tension to connect the distal end 21B of the lower strut 21 and the proximal end member 15A with each other, and restricts the position of the lower strut 21 by using its tension force.

The upper strut 22 is rotatably coupled to the jib 17 to cooperate with the jib 17. Specifically, a pair of left and right jib guide lines 28 extends under a tension to connect a distal end 22B of the upper strut 22 and the distal end 17B of the jib 17 with each other. Accordingly, the jib 17 rotates in cooperation with the rotation of the upper strut 22.

The mast 20 has a proximal end 20A and a rotatable end 20B. The proximal end 20A of the mast 20 is swingably coupled to the upper slewing body 12. The mast 20 has a rotational axis extending in parallel to a rotational axis of the boom 14 and just in the rear of the rotational axis of the boom 14. In other words, the mast 20 is swingable in a direction corresponding to the raising direction of the boom 14. In contrast, the rotatable end 20B of the mast 20 is connected with the distal end 14B of the boom 14 via a pair of left and right boom guide lines 24. The connection allows the mast 20 and the boom 14 to swing in cooperation with each other.

The crane 10 is mounted with various winches, specifically, a boom raising and lowering winch 30 for raising and lowering the boom 14, a jib raising and lowering winch 32 for causing the jib 17 to swing in the raising and lowering directions, a main winch 34 and an auxiliary winch 36 for lifting and lowering the hanged load.

The boom raising and lowering winch 30 executes winding and unwinding of a boom raising and lowering rope 38. The boom raising and lowering rope 38 is arranged so that the mast 20 swings in accordance with the winding and the unwinding. Specifically, the rotatable end 20B of the mast 20 and a rear end of the upper slewing body 12 are provided with their respective sheave blocks 40, 42 each having a plurality of sheaves arrayed in a width direction. The boom raising and lowering rope 38 drawn out from the boom raising and lowering winch 30 is supported on the sheave blocks 40, 42 and extends therebetween. Consequently, the winding and unwinding of the boom raising and lowering rope 38 by the boom raising and lowering winch 30 brings a change in a distance between the sheave blocks 40, 42, thereby allowing the mast 20 and the boom 14 to swing in cooperation with each other in the raising and lowering directions.

The jib raising and lowering winch 32 executes winding and unwinding of a jib raising and lowering rope 44. The jib raising and lowering rope 44 is arranged so that the upper strut 22 rotates in accordance with the winding and unwinding. Specifically, the lower strut 21 has a longitudinally intermediate portion provided with a guide sheave 46. Further, the distal end 21B of the lower strut 21 and the distal end 22B of the upper strut 22 are provided with their respective spreaders 47, 48 (sheave blocks) each having a plurality of sheaves arrayed in a width direction. The jib raising and lowering rope 44 drawn out from the jib raising and lowering winch 32 is supported on the guide sheave 46 and extends between the spreaders 47, 48. Consequently, the winding and unwinding of the jib raising and lowering rope 44 by the jib raising and lowering winch 32 brings a change in the distance between the spreaders 47, 48, thereby allowing the upper strut 22 and the jib 17 to rotate in cooperation with each other in the raising and lowering directions.

The main winch 34 executes the lifting and lowering of the hanged load by using a main rope 50. For the main lifting and lowering, main guide sheaves 52, 53, 54 are rotatably provided in the vicinities of a proximal end 21A of the lower strut 21, a proximal end 22A of the upper strut 22, and the distal end 17B of the jib 17, respectively. Furthermore, a jib point sheave 56 is located adjacently to the main guide sheave 54 (at the distal end 17B of the jib 17). The main rope 50 drawn out from the main winch 34 is sequentially supported on the main guide sheaves 52, 53, 54, and extends between the jib point sheave 56 and a hook sheave 58 provided at a main hook 57 for the hanged load. Consequently, winding and unwinding of the main rope 50 by the main winch 34 brings a change in the distance between the sheaves 56, 58, thereby achieving lifting and lowering of the main hook 57.

Similarly, the auxiliary winch 36 executes lifting and lowering of the hanged load by using an auxiliary rope 60. For the auxiliary lifting and lowering, auxiliary guide sheaves 62, 63, 64 are provided rotatably and coaxially with the corresponding main guide sheaves 52, 53, 54. The roller 17R (serves as an assistive sheave) is rotatably located adjacently to the auxiliary guide sheave 64 (at the distal end of the jib 17). The auxiliary rope 60 is supported on the assistive sheave. Specifically, the auxiliary rope 60 drawn out from the auxiliary winch 36 is sequentially supported on the auxiliary guide sheaves 62, 63, 64, and eventually hangs down from the assistive sheave. Consequently, winding and unwinding of the auxiliary rope 60 by the auxiliary winch 36 leads to lifting and lowering of an unillustrated auxiliary hook for the hanged load attached to a leading end of the auxiliary rope 60.

The physical quantity detector 90 detects information necessary to safely raise and lower the boom 14 in a specific work of the crane 10. The physical quantity detector 90 is configured to detect a physical quantity which changes in accordance with a change in a reaction force received from the ground by a reaction force receiving part to be described later in the lower traveling body 11. The physical quantity includes, for example, a strain occurring in the crawler frame 1 to be described later, and at least one of a pressure in a head chamber and a pressure in a rod chamber of a hydraulic cylinder to be described later, but should not be limited thereto. A signal representing the physical quantity detected by the physical quantity detector 90 is input to the controller 100.

The specific work means a work accompanied by an occurrence of a large moment in a direction of causing the crane 10 to turn over. The specific work includes, for example, the assembly work and the disassembly work. The specific work further includes, for example, a work for the overload test. Hereinafter, each of the assembly work and the disassemble work will be described as the specific work.

The notification device 110 shown in FIG. 2 is a device for notifying an operator of stability information concerning a stability of the crane 10 based on the physical quantity detected by the physical quantity detector 90. For instance, the stability information includes information concerning a front and rear balance of the crane 10.

The notification device 110 includes, for example, at least one of a sound emitter for emitting a sound, a light emitter for emitting a light beam, and a display part for displaying a character, a geometric shape, or the like. The notification device 110 is disposed in a place easily recognizable for the operator, specifically, in a cab 12A on the upper slewing body 12.

The sound emitter has a function of emitting a sound hearable by the operator through the operator's auditory. For example, the sound emitter has an alarming buzzer, a speaker or the like. The light emitter has a function of emitting a light beam visible by the operator through the operator's sight. For example, the light emitter has a display lump, a revolving lump, a signal lump or the like, which is unillustrated. The display part has a function of displaying a character, a geometric shape or the like understandable by the operator through the operator's sight. For example, the display part has an unillustrated display element.

The controller 100 is composed of a central processing unit (CPU), a ROM which stores various control programs, a RAM for use as a working area of the CPU, and the like. As shown in FIG. 2, the controller 100 includes a calculation section 101, a stability determination section 102, a notification control section 103, and an operation control section 104.

The calculation section 101 has a parameter calculation part and a ratio calculation part. The parameter calculation part of the calculation section 101 calculates, based on the physical quantity detected by the physical quantity detector 90, a moment caused by the weight of the tiltable attachment (a gravity acting on the tiltable attachment) in the crane 10 to cause the crane 10 to turn over. The ratio calculation part of the calculation section 101 calculates a ratio between a first parameter in connection with a first moment Mf to be described later and a second parameter in connection with a second moment Mb to be described later. In the embodiments, the first parameter serves as the first moment Mf, and the second parameter serves as the second moment Mb. However, the first parameter may be other parameter which changes in accordance with a change in the first moment Mf, and hence is not necessarily limited to the first moment Mf. Similarly, the second parameter may be other parameter which changes in accordance with a change in the second moment Mb, and hence is not necessarily limited to the second moment Mb.

The stability determination section 102 determines the stability based on the physical quantity detected by the physical quantity detector.

The notification control section 103 outputs a notification instruction of notifying in the notification device 110 the operator of the stability information concerning the stability determined by the stability determination section 102. The notification device 110 notifies the operator of the stability information in response to the notification instruction output from the notification control section 103.

The operation control section 104 outputs an operation instruction directing an operation required to avoid a decrease in the stability of the crane 10 based on the stability determined by the stability determination section 102. Each of the boom raising and lowering winch 30 and the jib raising and lowering winch 32 is controlled to operate in accordance with the operation instruction output from the operation control section 104. Specifically, each of the winches 30, 32 suspends or decelerates the operation of winding or unwinding of the corresponding rope, for example.

More specifically, the crane 10 includes a hydraulic circuit having a boom winch control valve and a jib winch control valve each operating in response to the operation instruction output from the operation control section 104. The valves accordingly control a flow rate and a flow direction of hydraulic fluid supplied from a hydraulic pump to the boom raising and lowering winch 30 and the jib raising and lowering winch 32. As a result, each of the winches 30, 32 suspends or decelerates the operation of winding or unwinding the corresponding rope in accordance with the operation instruction.

The above-described configuration is common in first to seventh embodiments to be described below. Hereinafter, the mobile crane 10 according to each of the first to the seventh embodiments will be sequentially described.

First Embodiment

Figure 3:
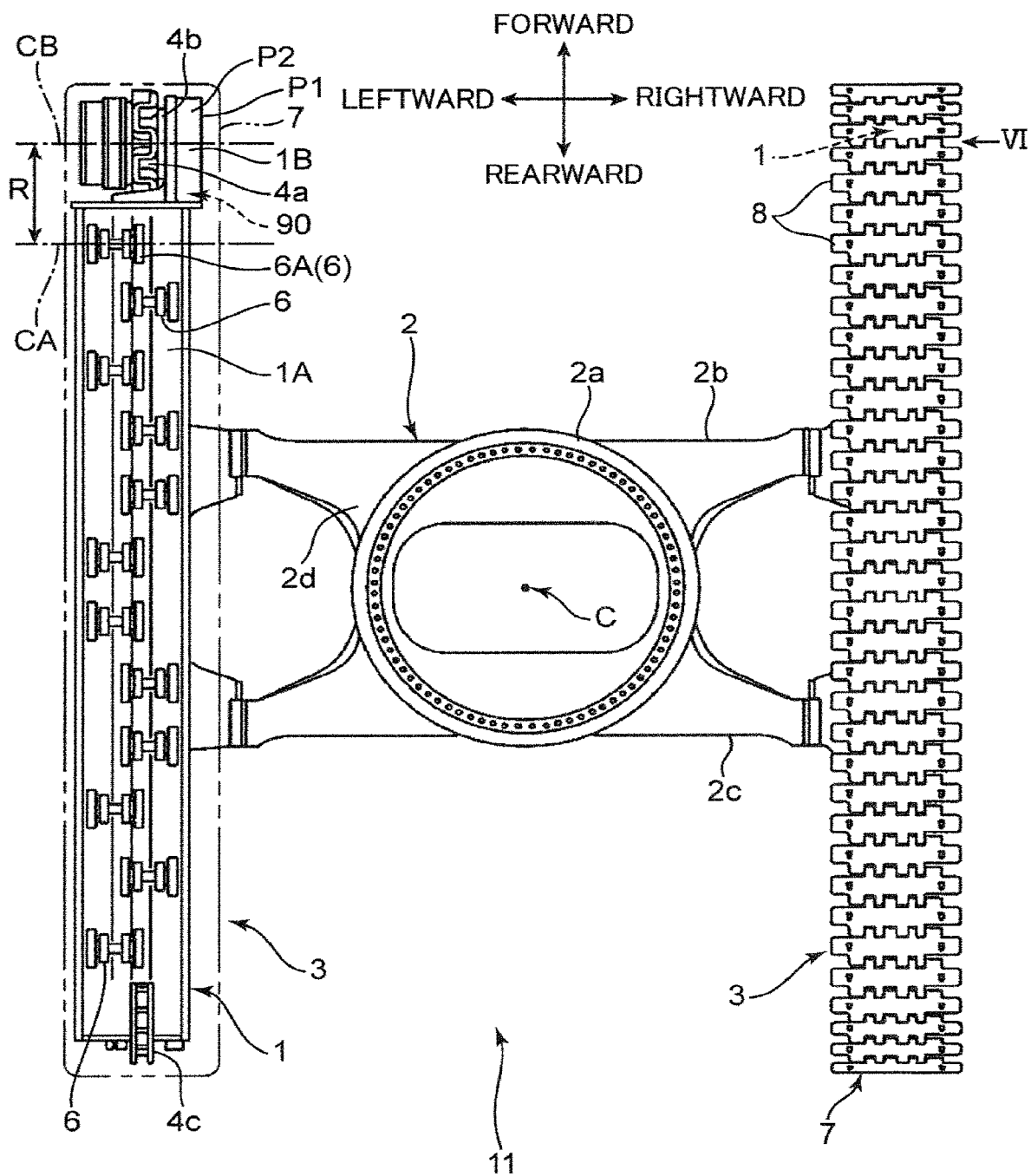
FIG. 3 is a plan view of a lower traveling body of the mobile crane according to a first embodiment.
Figure 4:
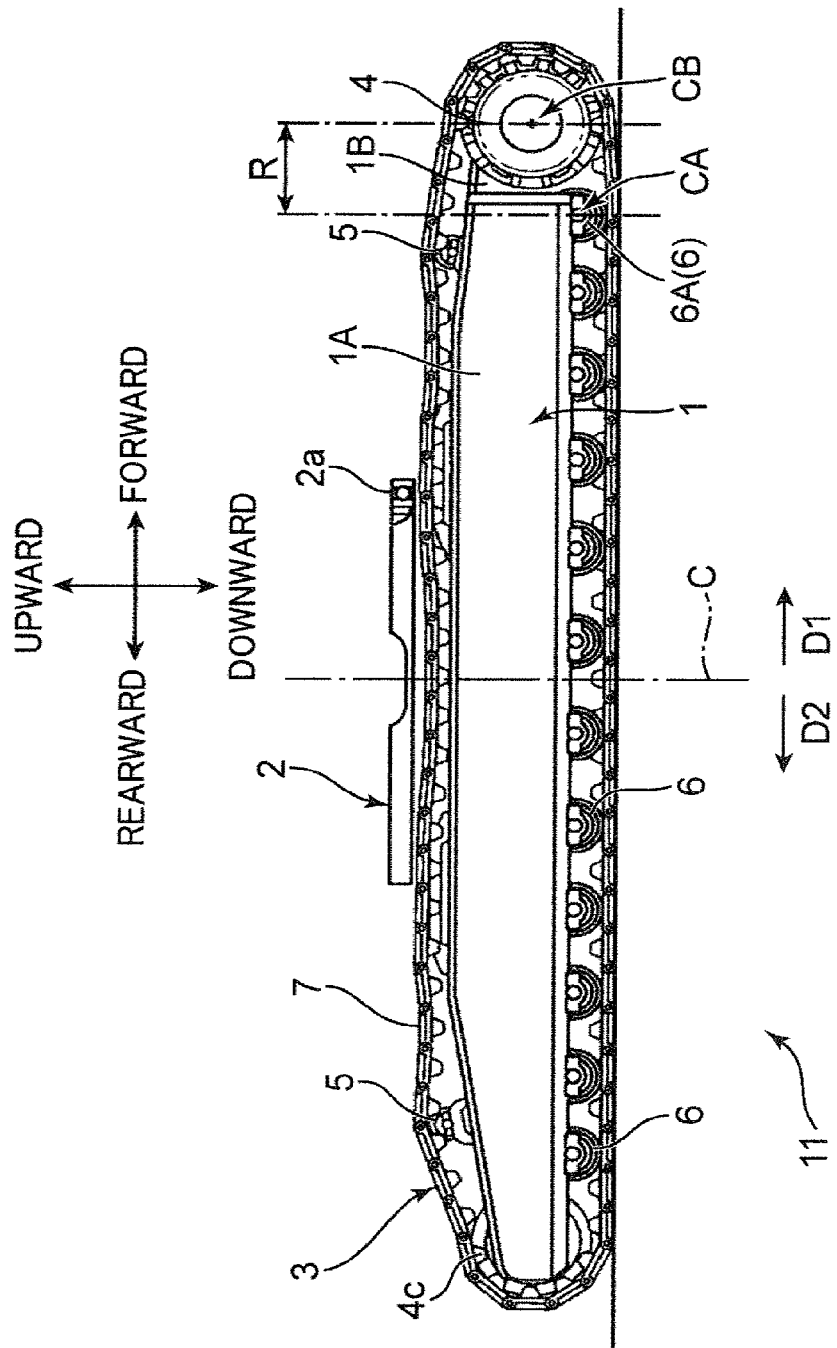
FIG. 4 is a sideview of the lower traveling body of the mobile crane according to the first embodiment.
Figure 5:
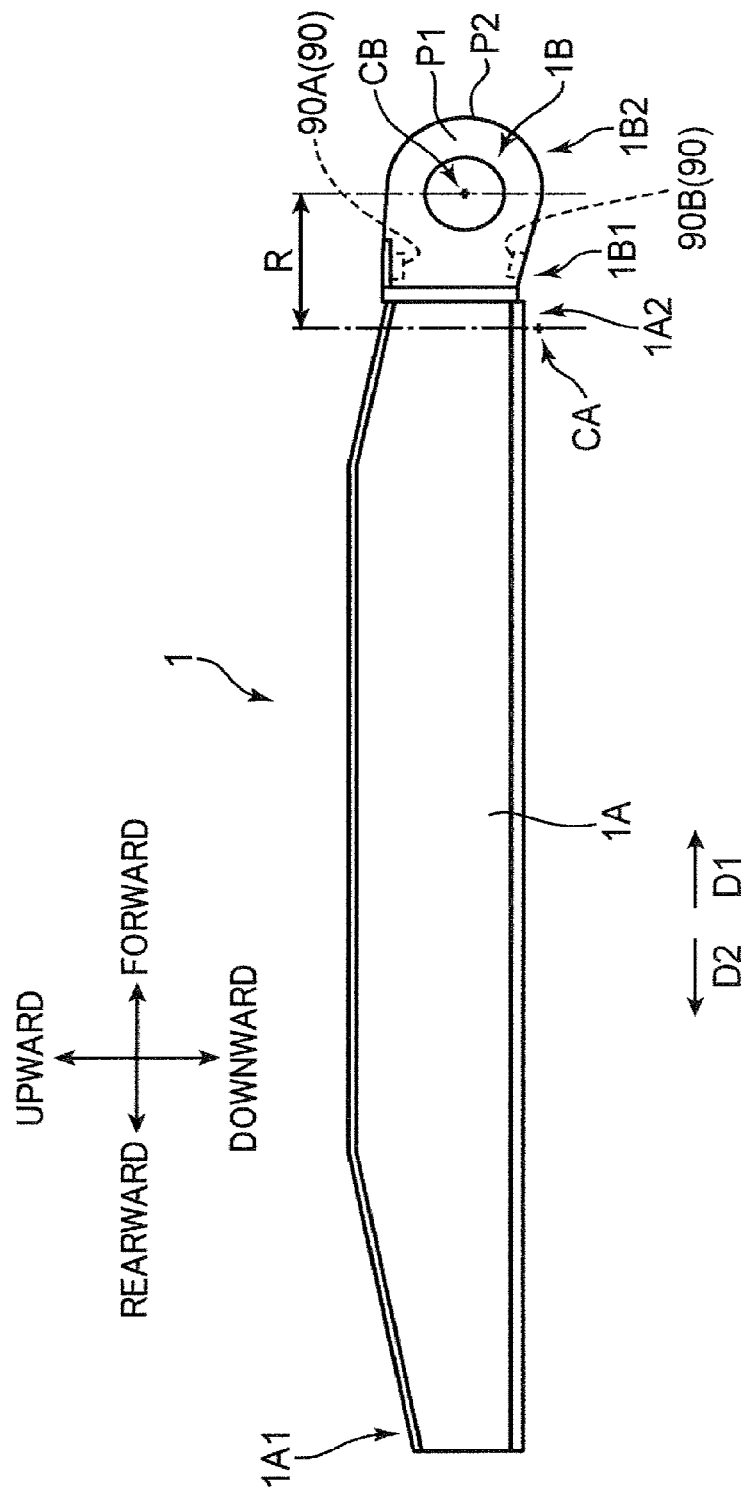
FIG. 5 is a sideview of a crawler frame of the lower traveling body of the mobile crane according to the first embodiment.
Figure 6:
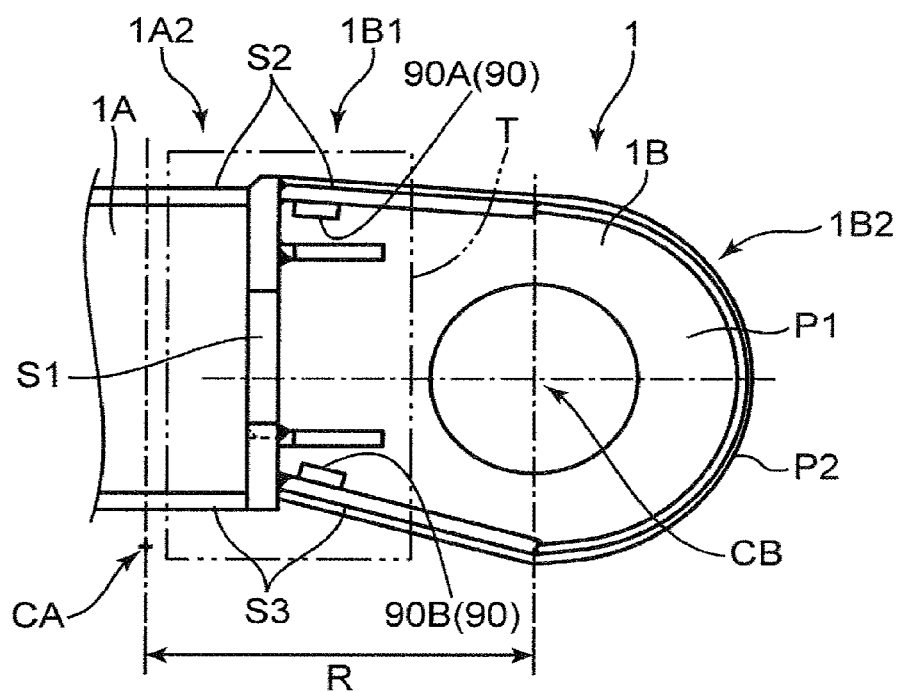
FIG. 6 is a sideview of a front end of the crawler frame seen in a direction of the arrow VI in FIG. 3.

FIG. 3 is a plan view of a lower traveling body 11 of a crane 10 according to the first embodiment. FIG. 4 is a sideview of the lower traveling body 11. FIG. 5 is a sideview of a crawler frame 1 of the lower traveling body 11 of the crane 10 in FIG. 1. FIG. 6 is a sideview of a front end of the crawler frame 1 of a right crawler 3 seen in the direction of the arrow VI in FIG. 3.

As shown in FIGS. 3 and 4, the lower traveling body 11 is of a crawler type. The lower traveling body 11 includes a pair of crawlers 3, 3, a slewing bearing 2a which bears the upper slewing body 12 thereon, and a center frame 2 connecting the pair of crawlers 3, 3 with each other and supporting the slewing bearing 2a. The pair of crawlers 3, 3 includes a first crawler 3 and a second crawler 3.

The center frame 2 has a car body 2d for retaining the slewing bearing 2a under the slewing bearing 2a, a front axle 2b extending in the leftward and rightward directions at the front of the car body 2d, and a rear axle 2c extending in the leftward and rightward directions at the rear of the car body 2d. The first crawler 3 is attached to one end (a right end) of the front axle 2b and one end (a right end) of the rear axle 2c, and the second crawler 3 is attached to another end (a left end) of the front axle 2b and another end (a left end) of the rear axle 2c.

The first crawler 3 and the second crawler 3 have the same configuration except that their structural elements are symmetrically arranged in the leftward and rightward directions. The crawlers 3 extend in the forward and rearward directions, and are spaced apart from each other in the leftward and rightward directions. Each of the crawlers 3 includes the crawler frame 1, a pair of wheels 4a, 4c (a first wheel 4a and a second wheel 4c), a drive mechanism 4b, a crawling member 7, a plurality of upper rollers 5, and a plurality of lower rollers 6. The crawler frame 1 of the first crawler 3, the crawler frame 1 of the second crawler 3, and the center frame 2 constitute a frame unit.

The drive mechanism 4b has a hydraulic motor (a traveling motor) and a travelling speed reducer, which are unillustrated. The crawling member 7 is formed of multiple shoes connected with one another. The crawling member 7 laid over the pair of wheels 4a, 4c is endlessly supported (in a loop) by the pair of wheels 4a, 4c and cyclically movable. In this embodiment, the first wheel 4a serves as a drive tumbler 4a, and the second wheel 4c serves as an idler 4c.

As shown in FIG. 5, the crawler frame 1 has a shape extending in the forward and rearward directions. The crawler frame 1 includes a frame main body 1A and a tumbler bracket 1B (a bracket). The tumbler bracket 1B constitutes an end (the front end) of the crawler frame 1. The frame main body 1A has a shape extending in the forward and rearward directions, and has a proximal end 1A1 that is a rear end thereof and a distal end 1A2 that is a front end thereof. The tumbler bracket 1B has a proximal end 1B1 (a rear end) attached to the distal end 1A2 of the frame main body 1A and a distal end 1B2 that is a front end thereof, and extends from the proximal end 1B1 to the distal end 1B2 in the forward and rearward directions. The proximal end 1B1 of the tumbler bracket 1B is joined to the distal end 1A2 of the frame main body 1A by a joining way such as welding. The tumbler bracket 1B bears the drive tumbler 4a and the drive mechanism 4b.

As shown in FIGS. 3, 5, and 6, the tumbler bracket 1B has a bracket main body P1 and an outer periphery P2. The bracket main body P1 is a plate-shaped part substantially perpendicularly intersecting a rotational axis CB of the drive tumbler 4a and facing the drive mechanism 4b in the leftward and rightward directions. The outer periphery P2 is a plate-shaped part surrounding the bracket main body P1 in substantially parallel to the rotational axis CB. The outer periphery P2 covers a part of or all the periphery of the drive mechanism 4b.

The drive tumbler 4a is rotatably supported on the tumbler bracket 1B constituting the front end of the crawler frame 1. The drive tumbler 4a is a wheel to rotate under a rotational force transmitted from the traveling motor to the traveling speed reducer, thereby driving the crawling member 7. The drive tumbler 4a serves as a reaction force receiving part.

The reaction force receiving part is a part of the lower traveling body 11, and receives a reaction force from the ground at a position away from the slewing axis C in a boom direction in a state where the pair of crawlers 3, 3 is in contact with the ground. The boom direction coincides with a horizontal component of a direction in which the boom 14 extends from the upper slewing body 12. In the first embodiment, the boom direction corresponds to a first direction D1 (the forward direction) denoted in FIGS. 4 and 5. The tumbler bracket 1B constituting the front end of the crawler frame 1 is away from the slewing axis C in the boom direction D1.

The idler 4c is rotatably supported on a proximal end of the crawler frame 1 (the proximal end 1A1 of the frame main body 1A). The idler 4c is a wheel for guiding the crawling member 7 at the opposite position to the drive tumbler 4a in the forward and rearward directions.

The plurality of upper rollers 5 is rotatably supported on an upper portion of the crawler frame 1. The upper rollers 5 are arranged at intervals between the drive tumbler 4a and the idler 4c in the forward and rearward directions for guiding the crawling member 7.

The plurality of lower rollers 6 is rotatably supported on a lower portion of the crawler frame 1. The lower rollers 6 are arranged at intervals between the drive tumbler 4a and the idler 4c in the forward and rearward directions for guiding the crawling member 7. Hereinafter, a lower roller closest to the drive tumbler 4a (the first wheel 4a) among the lower rollers 6 is called a first lower roller 6A.

[Physical Quantity Detector]

The physical quantity detector 90 is configured to detect, as the physical quantity, a strain that is caused in each of the pair of crawler frames 1, 1 by the reaction force which the drive tumbler 4a (the reaction force receiving part) receives from the ground via the crawling member 7 in the assembly work and the disassembly work including operations such as the raising operation, the lowing operation and the like. Specifically, the physical quantity detector 90 serves as a strain detector that can detect a strain which changes in accordance with a change in a moment in a direction in which the weight of the tiltable attachment causes the crane 10 to turn over. The raising operation includes increasing an inclination angle of the boom 14 to the ground, and the lowing operation includes decreasing the inclination angle.

In the first embodiment, the crane 10 includes a plurality of physical quantity detectors 90. The plurality of physical quantity detectors 90 includes a first physical quantity detector 90 for detecting a strain occurring in the crawler frame 1 (a first crawler frame 1) of the first crawler 3, and a second physical quantity detector 90 for detecting a strain occurring in the crawler frame 1 (a second crawler frame 1) of the second crawler 3. The first physical quantity detector 90 and the second physical quantity detector 90 have the same configuration, and each of the detectors is provided at the same position in the corresponding crawler frame 1. Therefore, only one of the physical quantity detectors 90 is mainly focused below.

As shown in FIGS. 3 and 4, a specific portion of the crawler frame 1 where the strain is to be detected by the physical quantity detector 90 in the forward and rearward directions is at a position (a detection position) away in the boom direction D1 from a rotational axis of the first lower roller 6A. The detection position is preferably located in a region R between the rotational axis CA of the first lower roller 6A and the rotational axis CB of the drive tumbler 4a. In the detailed example shown in FIGS. 5 and 6, the physical quantity detector 90 is configured to detect a strain occurring in the tumbler bracket 1B of the crawler frame 1 that supports the drive tumbler 4a.

The physical quantity detector 90 includes at least one device for detecting the strain in the crawler frame 1. For instance, a strain gauge, such as a metal strain gauge and a semiconductor strain gauge, is adaptable to the device. The strain gauge is attached to the crawler frame 1 by, for example, applying the same on a surface of the crawler frame 1. However, the device of the physical quantity detector 90 should not be limited to the strain gauge, and may be other device which can detect the strain in the crawler frame 1. Such other device may be, for example, a loadcell like a pin-typed loadcell.

The metal strain gauge has a configuration in which, for example, a metal resistor (a metal foil) is arranged on a thin insulator in a zigzag manner for detecting a change in an electric resistance accompanied by a deformation of the resistor. The change in the measured electric resistance is converted into a strain quantity of the crawler frame 1. The semiconductor strain gauge utilizes, for example, a piezo resistance effect that an electric resistance ratio of a semiconductor changes depending on a stress.

As shown in FIGS. 5 and 6, the physical quantity detector 90 in the first embodiment is provided at the proximal end 1B1 of the tumbler bracket 1B of the crawler frame 1. The physical quantity detector 90 includes a plurality of strain gauges (a first strain gauge 90A and a second strain gauge 90B in the illustrated example).

As shown in FIG. 6, the first strain gauge 90A is provided in an upper portion of the front end of the crawler frame 1, and the second strain gauge 90B is provided in a lower portion of the front end of the crawler frame 1. Specifically, the first strain gauge 90A is provided in an upper portion of the proximal end 1B1 of the tumbler bracket 1B, and the second strain gauge 90B is provided in a lower portion of the proximal end 1B1 of the tumbler bracket 1B.

Region T enclosed by a long-dashed double-dotted line in FIG. 6 contains the distal end 1A2 of the frame main body 1A and the proximal end 1B1 of the tumbler bracket 1B, the distal end 1A2 and the proximal end 1B being connected with each other. The region T thus includes the connection portion between the frame main body 1A and the tumbler bracket 1B, and adjacent portions that are adjacent to the connection portion. The region T has an I-shaped cross section defined by a plate-shaped web section S extending in the upward and downward directions, a plate-shaped upper flange section S2 connected with an upper end of the web section S1 and extending in the forward and rearward directions, and a plate-shaped lower flange section S3 connected with a lower end of the web section S and extending in the forward and rearward directions.

The web section S1 is constituted by at least one of a part of the distal end 1A2 of the frame main body 1A and apart of the proximal end 1B1 of the tumbler bracket 1B. The upper flange section S2 is constituted by a part of the distal end 1A2 of the frame main body 1A and a part of the proximal end 1B1 of the tumbler bracket 1B. The lower flange section S3 is constituted by a part of the distal end 1A2 of the frame main body 1A and a part of the proximal end 1B1 of the tumbler bracket 1B.

In the first embodiment, the first strain gauge 90A is provided at the proximal end 1B1 of the tumbler bracket 1B defining the upper flange section S2 (in the upper portion of the outer periphery P2 of the tumbler bracket 1B described above). The second strain gauge 90B is provided at the proximal end 1B1 of the tumbler bracket 1B defining the lower flange section S3 (in the lower portion of the outer periphery P2 of the tumbler bracket 1B described above).

The physical quantity detector 90 detects a strain occurring in the crawler frame 1 in the assembly work and the disassembly work of the crane 10 including the raising and lowering operations. A signal representing the strain detected by the physical quantity detector 90 is input to the controller 100 shown in FIG. 2. For instance, the calculation section 101 calculates, based on the physical quantity, a moment in a direction of causing the crane 10 to turn over in the boom direction D1. The stability determination section 102 determines the stability based on the physical quantity detected by the physical quantity detector 90, specifically, based on the moment calculated by the calculation section 101. The notification control section 103 controls the notification device 110 to notify the operator of the stability information concerning the stability (the information concerning the front and rear balance of the crane 10) by using a sound, a light beam, a character, a geometric shape or the like. The operation control section 104 outputs an operation instruction directing an operation required to avoid a decrease in the stability of the crane 10 based on the stability determined by the stability determination section 102.

[Assembly Work and Disassembly Work]

Next, the assembly work and the disassembly work of the crane 10 will be described. It should be noted here that a basic sequence of each of the assembly work and the disassembly work described below is common in the first to the seventh embodiments.

Figure 8:
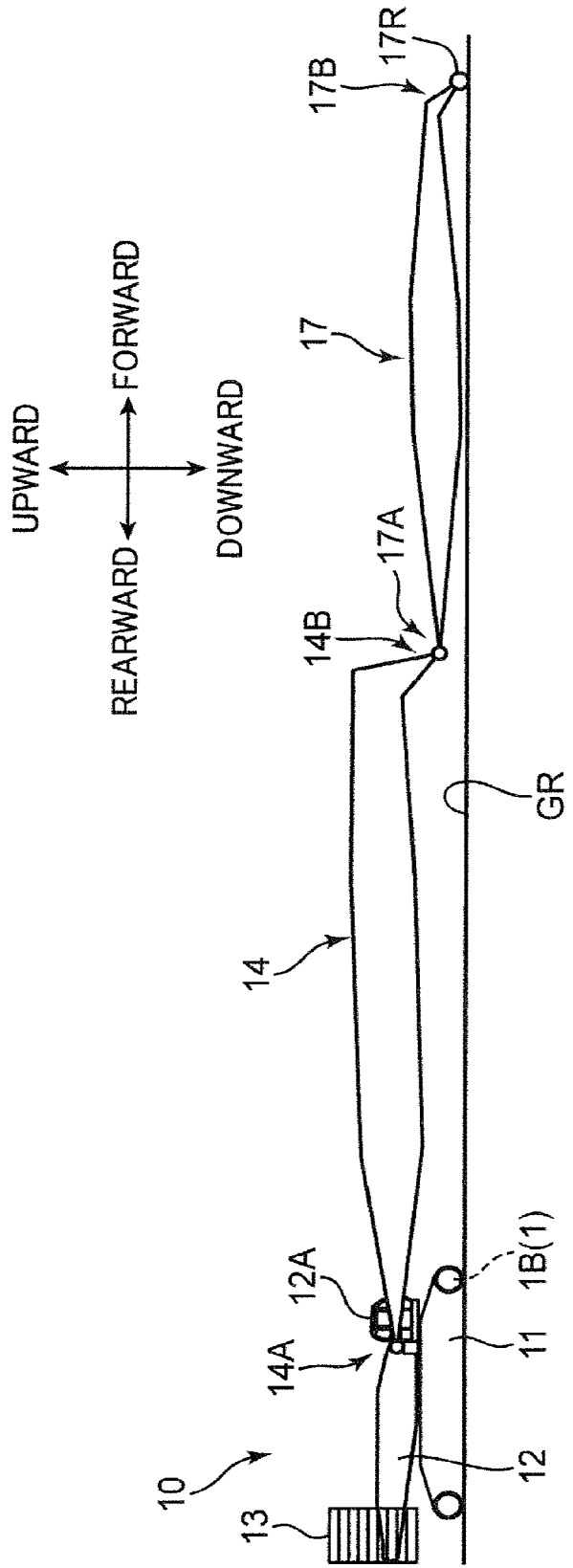
FIG. 8 is a schematic sideview of the mobile crane having a specific posture that the tiltable attachment is in a lowered state in an assembly work or a disassembly work of the mobile crane.
Figure 9:
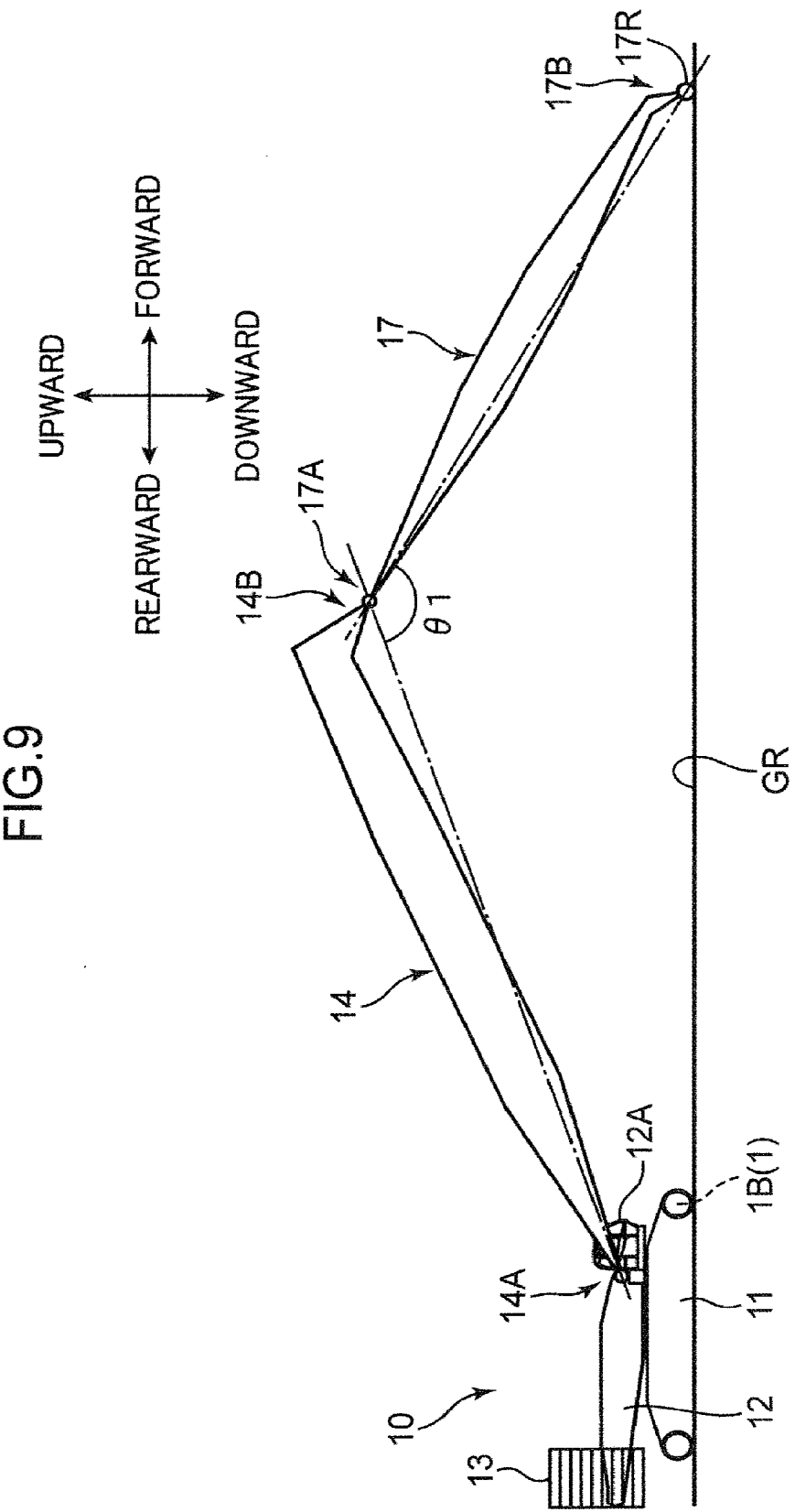
FIG. 9 is a schematic sideview of the mobile crane having a specific posture that the tiltable attachment is being raised or lowered in the assembly work or the disassembly work.
Figure 10:
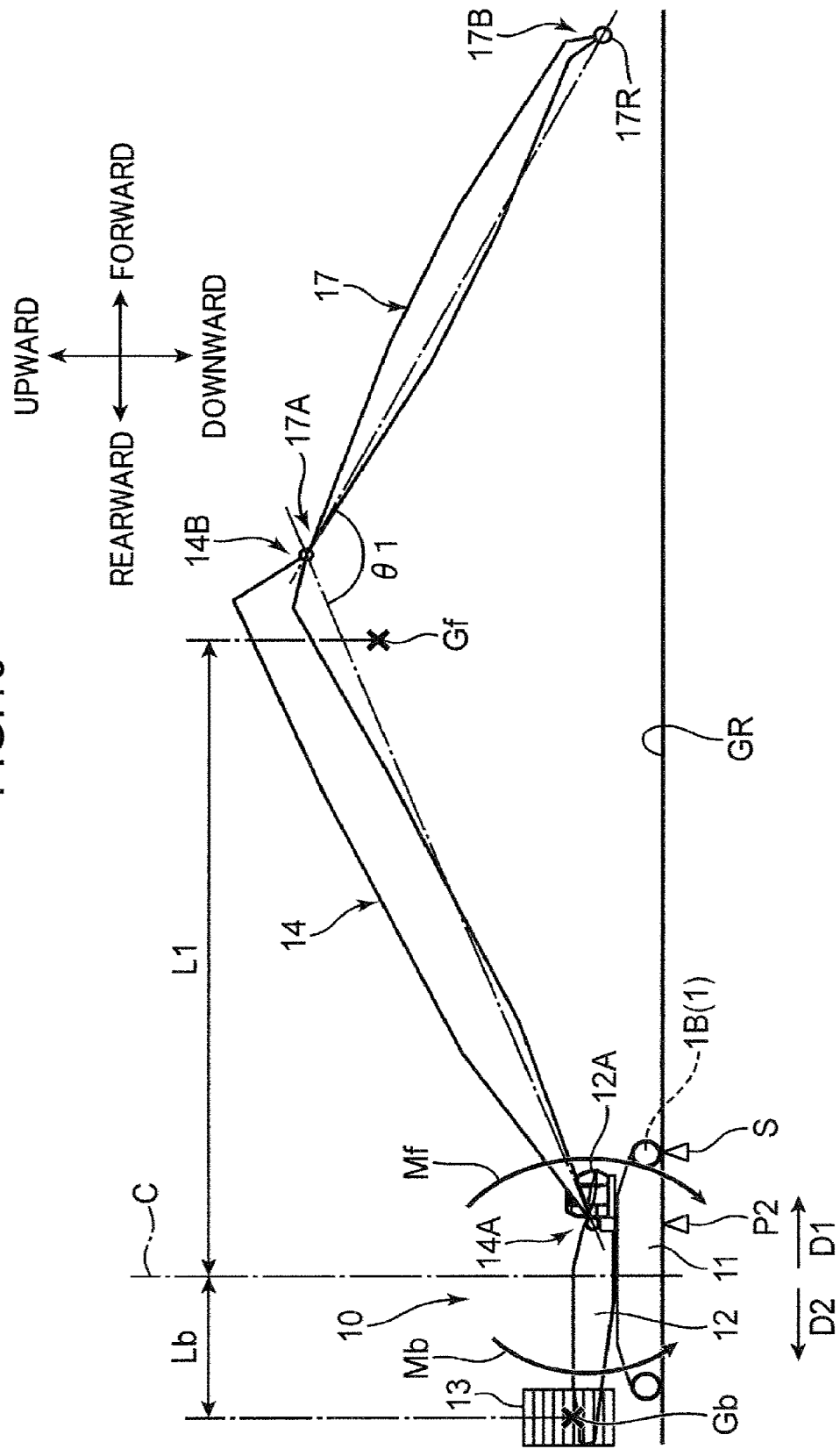
FIG. 10 is a schematic sideview of the mobile crane having a specific posture that the tiltable attachment is being raised or lowered in the assembly work or the disassembly work.
Figure 11:
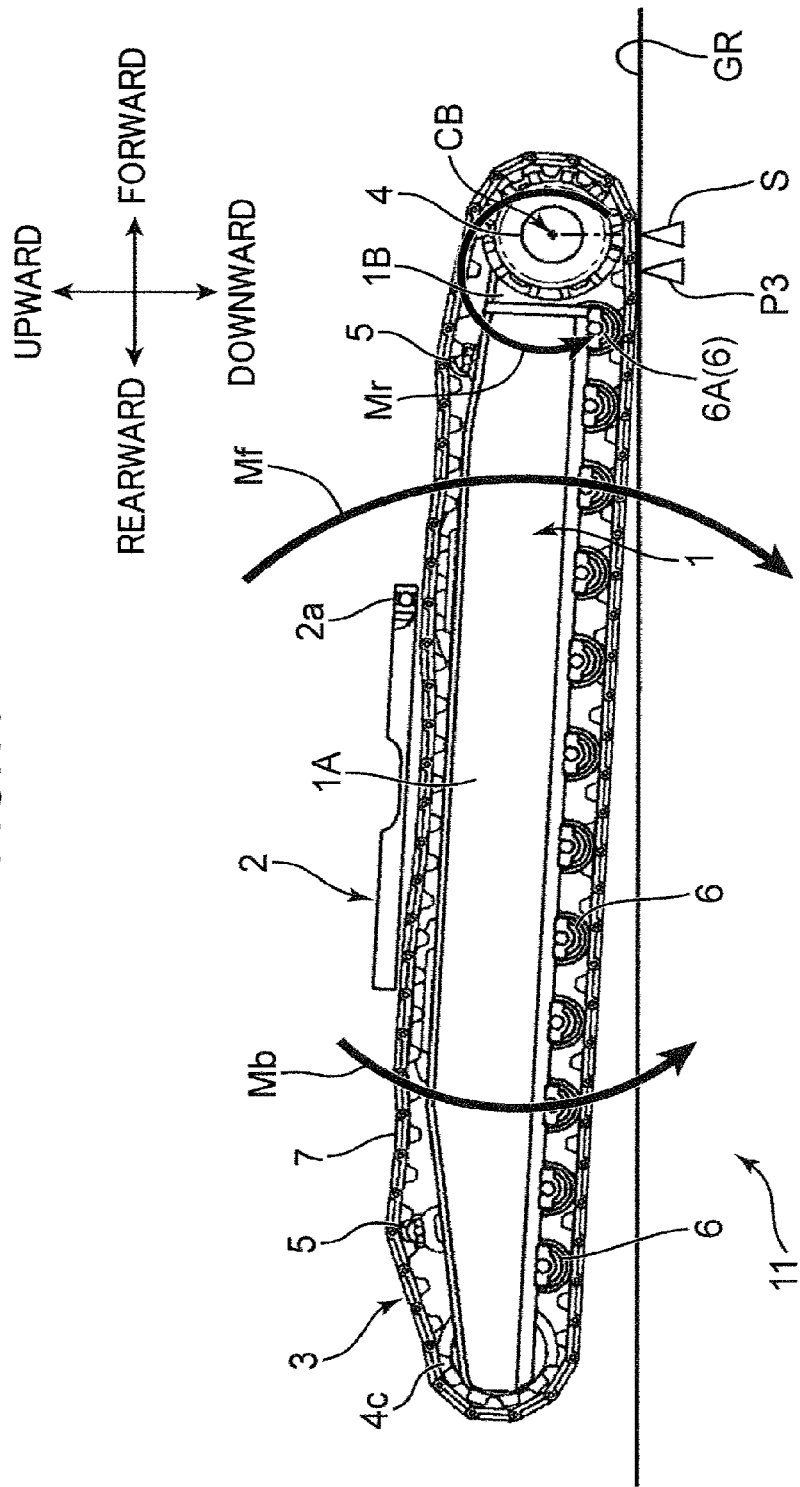
FIG. 11 is a schematic sideview of the mobile crane having a specific posture with a moment balanced position close to a turning-over fulcrum in the assembly work or the disassembly work.
Figure 12:
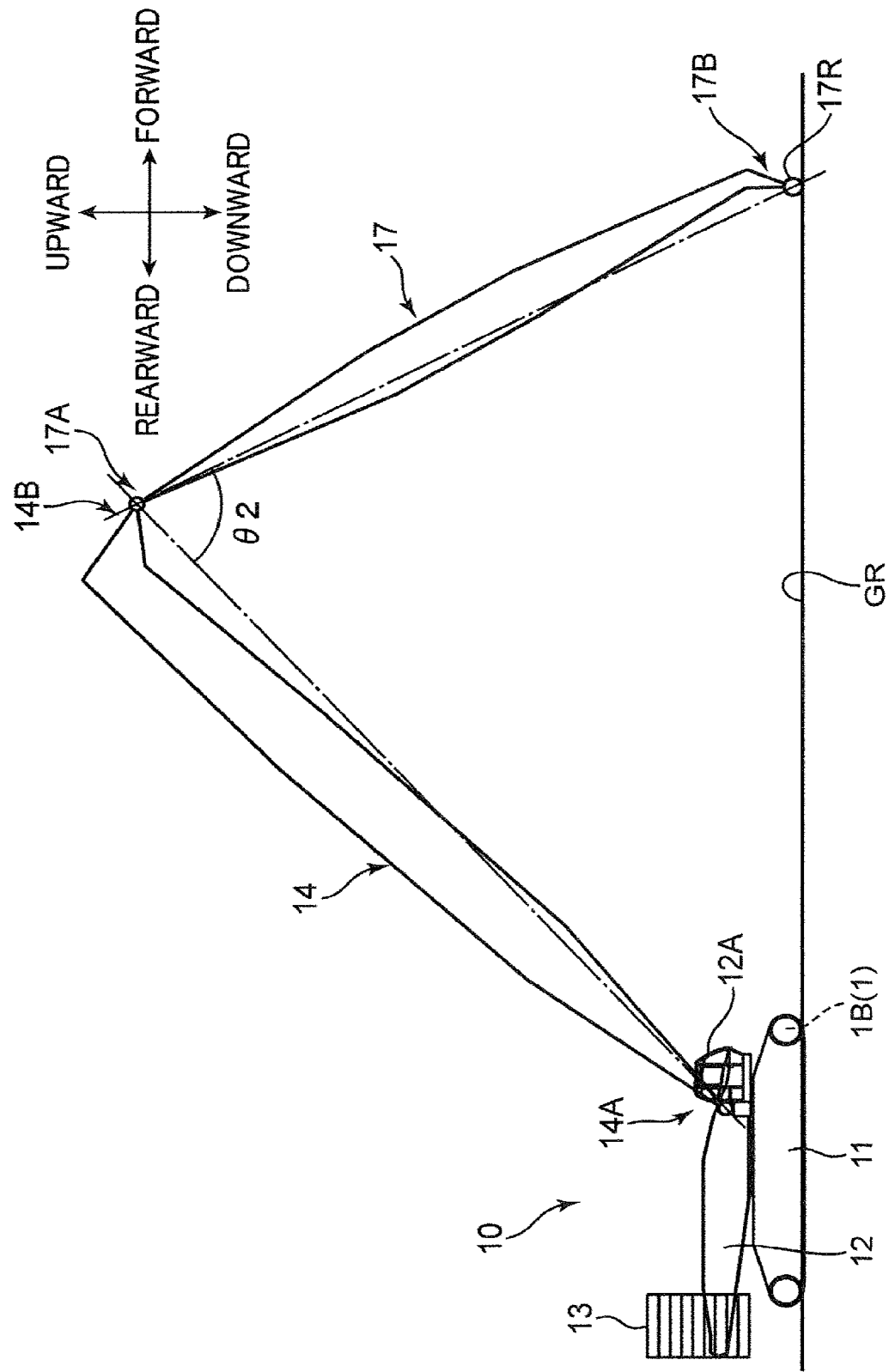
FIG. 12 is a schematic sideview of the mobile crane having a specific posture that the tiltable attachment is being raised or lowered in the assembly work or the disassembly work.
Figure 13:
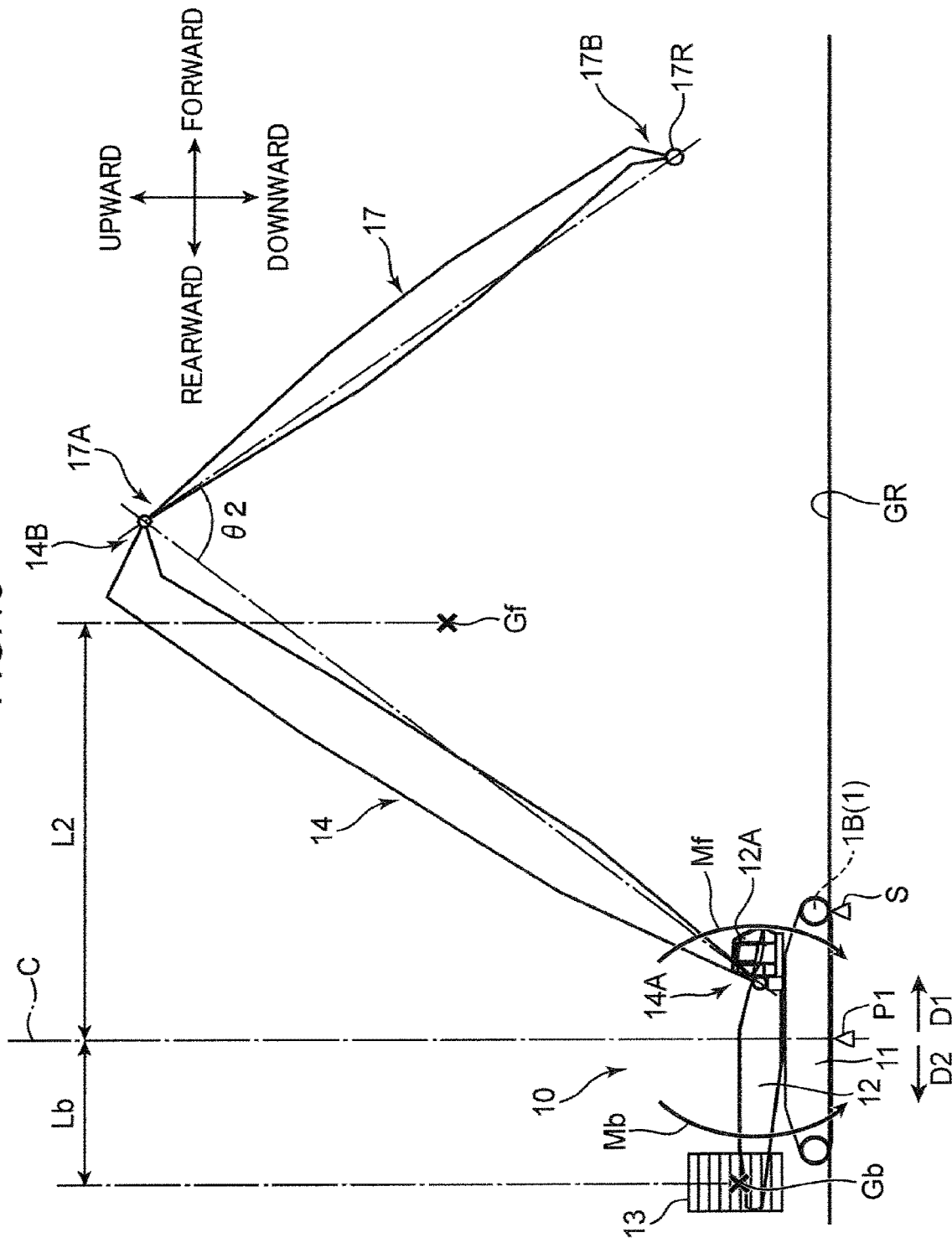
FIG. 13 is a schematic sideview of the mobile crane having a specific posture that the tiltable attachment is being raised or lowered in the assembly work or the disassembly work.

Each of FIGS. 8 to 13 is a schematic sideview of the mobile crane in FIG. 1 having a specific posture in the assembly work or the disassembly work thereof. FIG. 8 shows the tiltable attachment in a lowered state. Each of FIGS. 9 and 10 shows the tiltable attachment being raised or lowered with a large relative angle of the jib 17 to the boom 14. FIG. 11 shows a state where a moment balanced position is close to a turning-over fulcrum. Each of FIGS. 12 and 13 shows the tiltable attachment being raised or lowered with a small relative angle of the jib 17 to the boom 14. FIGS. 8 to 13 illustrate only the structural elements necessary to explain the moment that the crane 10 receives, and hence some structural elements are omitted.

As shown in FIGS. 10 and 13, in the crane 10, the tiltable attachment including the boom 14 and the jib 17 extends in the boom direction D1 (the first direction D1), and the counterweight 13 is arranged in the opposite direction D2 to the boom direction D1 with respect to the slewing axis C. Hereinafter, a moment acting on the crane 10 will be described mainly with respect to the slewing axis C of the upper slewing body 12.

It can be said that a moment (hereinafter, referred to as a moment Mt) of causing the crane 10 to turn over in the boom direction D1 is determined in accordance with a first moment Mf and a second moment Mb. The first moment Mf is mainly caused by the gravity acting on the tiltable attachment. In other words, the first moment Mf is caused by the weight and the posture of the tiltable attachment. The second moment Mb is mainly caused by the gravity acting on the counterweight. The second moment Mb is caused by the weight of the counterweight 13 and a part of the weight of the upper slewing body 12. The second moment Mb is further caused to oppose to the first moment Mf and prevent the crane 10 from turning over. In summary, the moment Mt is obtained by subtracting the second moment Mb from the first moment Mf (Mt=Mf−Mb).

As shown in FIGS. 10 and 13, under the condition of no change in a loading weight of the counterweight 13 and a distance from the slewing axis C thereto, a gravity center position Gb thereof in relation to the second moment Mb are substantially unchanged. Therefore, the second moment Mb remains substantially constant. Specifically, when the weight of which the weight of the counterweight 13 accounts for a large proportion (in a portion away from the slewing axis C in the direction D2) is defined as "Wb", the second moment Mb is expressed by a product of the weight Wb and a distance Lb from the slewing axis C to the gravity center position Gb (Mb=Wb×Lb). In this respect, the second moment Mb may be calculated and stored in a storage of the controller 100 in advance. Furthermore, the second moment Mb may be calculated by the parameter calculation part of the calculation section 101 based on the weight Wb and the distance Lb in the assembly work and the disassembly work.

In contrast, a distance L (e.g., a distance L1 shown in FIG. 10, and a distance L2 shown in FIG. 13) from the slewing axis C to a gravity center position Gf of the tiltable attachment including the boom 14 and the jib 17 changes depending on the posture of the tiltable attachment. Accordingly, the first moment Mf changes depending on the posture of the tiltable attachment. The gravity center position Gf is mainly determined in accordance with an inclination angle of the boom 14 to the ground and a relative angle of the jib 17 to the boom 14. Specifically, when the weight of the tiltable attachment is defined as "Wat", the first moment Mf is expressed by a product of the weight Wat and the distance L (e.g., the distance L1, the distance L2) from the slewing axis C to the gravity center position Gf (Mf=Wat×L). The first moment Mf is calculated by the parameter calculation part of the calculation section 101 based on the weight Wat and the distance L in the assembly work and the disassembly work.

For instance, as shown in FIG. 13, the first moment Mf and the second moment Mb around the center on the slewing axis C become substantially equal to each other in a state where the boom 14 is so sufficiently raised from the upper slewing body 12 that the inclination angle of the boom 14 to the ground is relatively large and the relative angle of the jib 17 to the boom 14 is relatively small (at a relative angle θ2). The moment Mt reaches approximately zero in this substantially equal situation. Eventually, the crawling member 7 undertakes the weight of the crane 10 almost equally over the entirety thereof in the forward and rearward directions.

In comparison with the substantially equal situation, as shown in FIG. 10, the gravity center position Gf shifts in the boom direction D1 in a state where the boom 14 is so sufficiently lowered with respect to the upper slewing body 12 that the inclination angle of the boom 14 to the ground is relatively small and the relative angle of the jib 17 to the boom 14 is relatively large (at a relative angel θ1). Accordingly, the first moment Mf occurring around the center on the slewing axis C increases. In such a biased situation where the moment increases in the boom direction D1, the moment Mt takes a larger positive value than in the substantially equal situation (Mt=Mf−Mb>0).

Here, the center of the moment for calculating the moment is shifted in the forward and rearward directions from the center on the slewing axis C, and a forward moment and a rearward moment around the shifted center are calculated. At this time, a certain shifted center where the magnitude of the forward moment becomes the same as the magnitude of the rearward moment is defined as a "moment balanced position". Furthermore, as shown in FIGS. 10, 11, and 13, a position S of the crawler frame 1 corresponding to the rotational axis CB of the drive tumbler 4a in the forward and rearward directions is called a turning-over fulcrum S.

In the substantially equal situation described above (e.g., the situation shown in FIG. 13), a moment balanced position P1 substantially coincides with the slewing axis C. In contrast, in the biased situation (e.g., the situation shown in FIG. 10), a moment balanced position P2 is away from the slewing axis C in the boom direction D1. It is not that the crane 10 is caused to turn over as soon as the moment Mt takes a positive value and the moment balanced position shifts from the slewing axis C to the position P2 in the boom direction D1 as shown in FIG. 10. In other words, the biased situation shows that the crawler frame 1 of the lower traveling body 11 opposes to the moment Mt of causing the crane 10 to turn over in the boom direction D1.

In the biased situation shown in FIG. 10, the moment Mt reaches zero (Mt=0) at the moment balanced position P2. In the biased situation, a bending moment mainly acts on a portion of the crawler frame 1 extending from the moment balanced position P2 to the turning-over fulcrum S. From these perspectives, not the entirety of the crawler frame 1 but the front end (in the portion extending from the moment balanced position P2 to the turning-over fulcrum S) of the crawler frame 1 opposes to the moment Mt in the biased situation. In this way, a flexural rigidity at the front end of the crawler frame 1 results in preventing the crane 10 from turning-over, thereby maintaining the posture thereof.

For instance, as shown in FIG. 11, a moment balanced position P3 mostly coincides with the turning-over fulcrum S in a situation immediately before the crane 10 is caused to turn over after the gravity center position Gf of the tiltable attachment shifts furtherer away from the position shown in FIG. 13 in the first direction D1. In this situation immediately before the turning-over, the front end of each of the pair of crawler frames 1 undertakes almost all the moment Mt. A circular arrow Mr in FIG. 11 indicates that the front end of the crawler frame 1 opposes to the moment Mt.

In this configuration, in a case where the physical quantity detector 90 can detect a strain occurring in the front end of the crawler frame 1 appropriately for various situations including the substantially equal situation shown in FIG. 10, the biased situation shown in FIG. 13, and the situation immediately before the turning-over shown in FIG. 11, and the parameter calculation part of the calculation section 101 can calculate, based on the detected strain, a moment that the front end of the crawler frame 1 receives, the stability determination section 102 can determine various possible states of the crane 10 based on the calculated moment.

In the first embodiment, the physical quantity detector 90 provided at the front end of the crawler frame 1, i.e., in a portion located in the region R described above, can effectively detect a strain occurring in the front end of the crawler frame 1 in the biased situation. As a result, it is possible to obtain a criterion for determining a state of the front and rear balance of the crane 10.

In the first embodiment, the information concerning the strain occurring in the front end of the crawler frame 1 and detected by the physical quantity detector 90 is obtainable in the above-described manner. Thus, information concerning a state of the crane 10 necessary to safely raise and lower the tiltable attachment in the assembly work and the disassembly work of the crane 10 is detectable without an overburdened work by the operator. The crane 10 then utilizes the detected information to safely execute the raising and lowering operations. Details will be described below.

As shown in FIG. 8, the boom 14 and the jib 17 are mounted on the upper slewing body 12 in a state (a lowered state) where each of the boom 14 and the jib 17 is lowered with a posture substantially parallel to the ground GR in the assembly work of assembling the crane 10. For the hoisting work, the posture of the boom 14 in the lowered state is changed to the raised state (shown in FIG. 1) by the raising operation of gradually increasing the inclination angle of the boom 14 to the ground GR.

First, the inclination angle of the boom 14 is gradually increased in a state where the roller 17R provided at the distal end 171 of the jib 17 is in contact with the ground OR to change the posture of the tiltable attachment from the lowered state to the raised state described above. During this operation, the relative angle of the jib 17 to the boom 14 gradually decreases.

For instance, after the relative angle has reached the angle θ1 shown in FIG. 9, further increasing the inclination angle of the boom 14 while keeping the relative angle at the angle θ1 as shown in FIG. 10 causes the roller 17R at the distal end 17B of the jib 17 to leave the ground GR. Accordingly, the moment Mf acts on the crane 10.

At this time, the notification control section 103 of the controller 100 controls the notification device 110 to notify the operator of the information concerning the front and rear balance of the crane 10 via the notification device 110 based on a detection signal output from the physical quantity detector 90. Owing to the notification, the operator can acquire the stability information concerning the front and rear balance of the crane 10 via the notification device 110. For instance, upon recognition of an unstable state of the crane 10 shown in FIG. 10, the operator decreases the inclination angle of the boom 14 again to bring, for example, the roller 17R at the distal end 17B of the jib 17 into contact with the ground as shown in FIG. 9. Thereafter, the operator gradually increases the inclination angle of the boom 14 in the state where the roller 17R at the distal end 17B of the jib 17 is in contact with the ground GR. The relative angle of the jib 17 to the boom 14 gradually decreases during this operation (e.g., the state shown in FIG. 12).

For example, after the relative angle has reached the angle θ2 shown in FIG. 12, further increasing the inclination angle of the boom 14 while keeping the relative angle at the angle θ2 as shown in FIG. 13 causes the roller 17R at the distal end 17B of the jib 17 to leave the ground GR. Accordingly, the moment Mf acts on the crane 10. At this time, the moment balanced position P1 is close to the slewing axis C. Therefore, it is possible to safely raise the tiltable attachment of the crane 10.

The disassembly work of disassembling the crane 10 can be safely performed in a reverse sequence of the assembly work.

[Way of Calculating Turning-Over Moment]

Hereinafter, a way of calculating a moment acting on the front end of the crawler frame 1 will be described in detail.

As shown in FIG. 6, in the first embodiment, the distal end 1A2 of the frame main body 1A and the proximal end 1B of the tumbler bracket B. i.e., the connection portion between the frame main body 1A and the tumbler bracket 1B, and the adjacent portions that are adjacent to the connection portion in the forward and rearward directions have the I-shaped (or H-shaped) cross section defined by the web section S1, the upper flange section S2, and the lower flange section S3.

Upon occurrence of a bending deformation in each of the pair of crawler frames 1 having received a bending load in the upward and downward directions during the raising and lowering operations for the tiltable attachment, an upper portion of the front end of the crawler frame 1 from a neutral plane (a neutral axis) thereof is compressed and contracted, and the lower portion from the neutral plane is pulled and stretched.

Further, a strain occurring in each of the upper portion and the lower portion of the crawler frame 1 increases in proportion to a distance from the neutral plane. Each of the upper and lower flange sections S2, S3 is at a relatively large distance from the neutral plane in the I-shaped (or H-shaped) cross-section, and hence a relatively large strain (a relatively large bending stress) occurs in each of the upper flange section S2 and the lower flange section S3. In this case, the physical quantity detector 90 provided in each of the upper flange section S2 and the lower flange section S3 in the above-described manner in the first embodiment can detect the relatively large strain.

Here, a strain occurring in the upper flange section S2 is defined as "ε1", and a strain occurring in the lower flange section S3 is defined as "ε2". Besides, a distance from the neutral plane of the front end of the crawler frame 1 to the first strain gauge 90A is defined as "r1", and a distance from the neutral plane to the second strain gauge 90B is defined as "r2". Further, a moment of inertia of area in a cross section where the strain is measured is defined as "I", and a Young's modulus is defined as "E". Moreover, an upward stress of stresses caused only by the bending moment at the front end of the crawler frame 1 is defined as "σmt", and a downward stress thereof is defined as "σmc".

The neutral plane (the neutral axis) of the front end of the crawler frame 1 in connection with the bending deformation is not limited to the center of the front end in the upward and downward directions. Thus, the upward stress σmt and the downward stress σmc can differ from each other. In this case, the ratio between the upward stress σmt and the downward stress σmc (σmt:σmc) corresponds to the ratio between the distances (r1:r2) from the neutral plane (σmt: σmc=r1:r2).

Additionally, the crawling member 7 is wound around the crawler frame 1 without being slackened. In this state, the crawler frame 1 receives a compressive force σn (an axial force) in the forward and rearward directions. Taking these premises into consideration, the way of calculating the moment will be described below.

Figure 7:
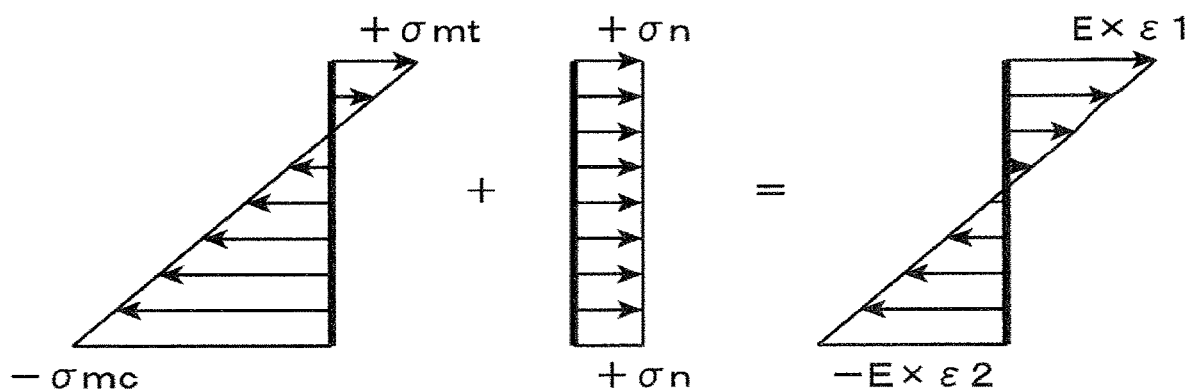
FIG. 7 is a schematic view showing a stress distribution in a target cross section of the front end of the crawler frame for which a strain is measured.

FIG. 7 is a schematic view showing a stress distribution in a target cross section of the front end (the tumbler bracket 1B in the first embodiment) of the crawler frame 1 for which a strain is measured. As shown in FIG. 7, the stress distribution is obtainable by a sum of the stresses (σmt, σmc) attributed to the bending moment and the aforementioned compressive force σn.

Accordingly, a bending stress σmt required to obtain the moment M is calculated by the following Formula (1):

$$E \times \varepsilon_1 - E \times \varepsilon_2 = (\sigma mt + \sigma n) - (-\sigma mc + \sigma n) = \sigma mt + \sigma mc = \sigma mt (1 + r2/r1) \quad (1).$$

The following Formula (2) is obtainable as a result of Formula (1):

$$\sigma mt = E(\varepsilon_1 - \varepsilon_2)/(1 + r2/r1) \quad (2).$$

From these Formulas, the moment M applied to the front end of the crawler frame 1 is calculated by the following Formula (3):

$$M = E \times \sigma mt \times I/r1 \quad (3).$$

The crane 10 includes the pair of crawler frames 1. The moments obtainable from the strains respectively in the front ends of the left and right crawler frames 1 are defined as "ML", "MR". The turning-over moment Mt is calculated by the following Formula (4) where:

$$Mt = MR + ML \quad (4).$$

The calculation section 101 (specifically, the parameter calculation part of the calculation section 101) of the controller 100 calculates the turning-over moment Mt in the manner described above based on a signal (a detection signal) representing the physical quantity input from the physical quantity detector 90. In this way, the turning-over moment Mt of causing the crane 10 to turn over is obtained. The frequency of detection by the physical quantity detector 90 and the frequency of calculation by the calculation section 101 are not particularly limited. For instance, the detection by the physical quantity detector 90 and the calculation by the calculation section 101 may be executed per predetermined time period, or continuously (always) executed.

Meanwhile, the moment M is calculated by the following Formula (5) in no consideration of the compressive force an (the axial force):

$$M = E \times I (|\varepsilon 1/r1| + |\varepsilon 2/r2|)/2 \quad (5).$$

[Operations]

Figure 18:
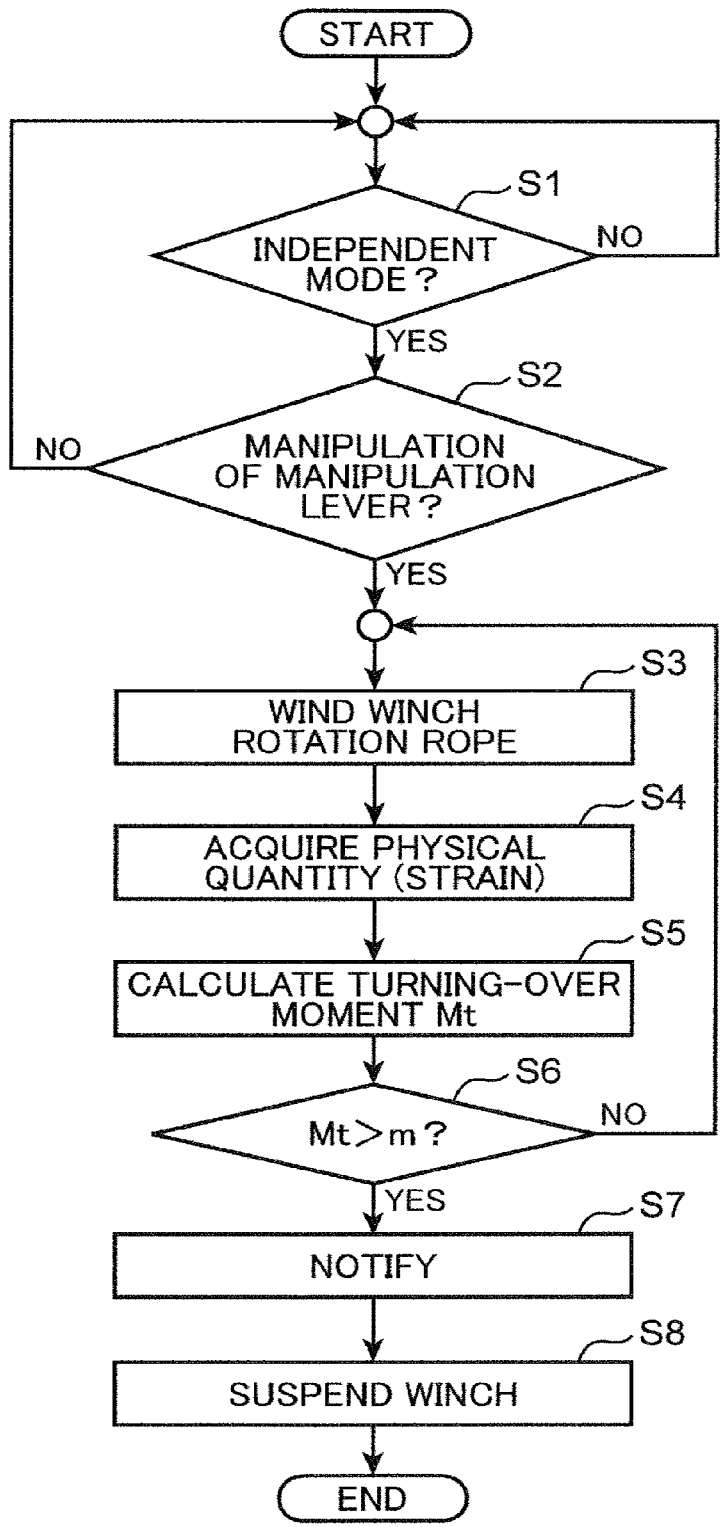
FIG. 18 is a flowchart showing exemplary arithmetic processing by a controller in the mobile crane.

Next, the arithmetic processing by the controller 100 in the crane 10 will be described. FIG. 18 is a flowchart of exemplary arithmetic processing by the controller 100. As shown in FIG. 18, the controller 100 determines whether or not an operation mode is set at an independent mode (step S1). In the raising operation for the tiltable attachment in the specific work such as the assembly work, the independent mode permits the controller 100 to determine the stability of the crane 10 and to automatically execute an avoidance operation required to avoid a decrease in the stability when the stability is determined to be low. The independent mode is selectable by the operator in the cab 12A of the upper slewing body 12.

When the independent mode is selected (YES in step S1), the controller 100 determines whether or not a manipulation lever is manipulated by the operator to activate the boom raising and lowering winch 30 (step S2). When it is determined that the manipulation lever is manipulated (YES in step S2), the operation control section 104 of the controller 100 controls the boom raising and lowering winch 30 to wind the boom raising and lowering rope 38 (step S3).

Subsequently, the controller 100 acquires a physical quantity (a strain in the first embodiment) detected by the physical quantity detector 90 (step S4).

Next, the calculation section 101 (specifically, the parameter calculation part) of the controller 100 calculates the turning-over moment Mt by using, for example, the calculation way described above (step S5).

Then, the stability determination section 102 of the controller 100 determines the stability of the crane 10 (step S6). Specifically, the stability determination section 102 determines whether or not the turning-over moment Mt is larger than a predetermined threshold m (step S6). The threshold m indicates a value for determining the stability of the crane 10, and is set in advance for each type of the crane 10 with reference to a limit value of the turning-over moment Mt of causing the crane 10 to turn over.

When the stability determination section 102 determines that the turning-over moment Mt is larger than the threshold m (YES in step S6), the notification control section 103 outputs a notification instruction of notifying in the notification device 110 the operator of the stability information concerning the stability determined by the stability determination section 102 (step S7).

As described above, the notification device 110 includes, for example, at least one of a sound emitter for emitting a sound, a light emitter for emitting a light beam, and a display part for displaying a character, a geometric shape, or the like. The stability information is notified to the operator by way of at least one of the sound emitter, the light emitter, and the display part in response to the notification instruction.

FIG. 19 shows specific examples of the stability information notified on the display part of the notification device 110. In FIG. 19A, each of the directions of the first moment Mf and the second moment Mb is denoted by an arrow. The magnitude of each of the first moment Mf and the second moment Mb is expressed with, for example, a thickness of the arrow, a length of the arrow, and a numerical value given therefor. For instance, each arrow may be displayed with an image of the crane 10 as shown in FIGS. 10 and 13. In FIG. 1913, the magnitude of each of the first moment Mf and the second moment Mb is shown in the form of a graph such as a bar graph and a pie chart. In FIG. 19C, the magnitude of each of the first moment Mf and the second moment Mb is shown with a numeric value given therefor.

When the stability determination section 102 determines that the turning-over moment Mt is larger than the threshold m, the notification control section 103 may control the notification device 110 to display the arrows and numeric values shown in FIGS. 19A to 19C while flashing the same, or control the notification device 110 to change a period of the flashing depending on the stability. Further, when the stability determination section 102 determines that the turning-over moment Mt is larger than the threshold m, the notification control section 103 may control the notification device 110 to notify the stability information by using a voice in addition to the displaying ways shown in FIGS. 19A to 19C. The stability information using the voice may include massages, for example, "The value approaches the turning-over limit.", "There is a risk of turning-over.", or the like.

Subsequently, the operation control section 104 outputs an operation instruction directing an operation required to avoid a decrease in the stability of the crane 10 based on the stability determined by the stability determination section 102 (step S8). Specifically, the boom raising and lowering winch 30 suspends, for example, the operation of winding the rope 38 in accordance with the operation instruction. In a case where the jib raising and lowering winch 32 is operating, the jib raising and lowering winch 32 suspends, for example, the operation of winding (or unwinding) the rope 44 in accordance with the operation instruction.

Figure 20:
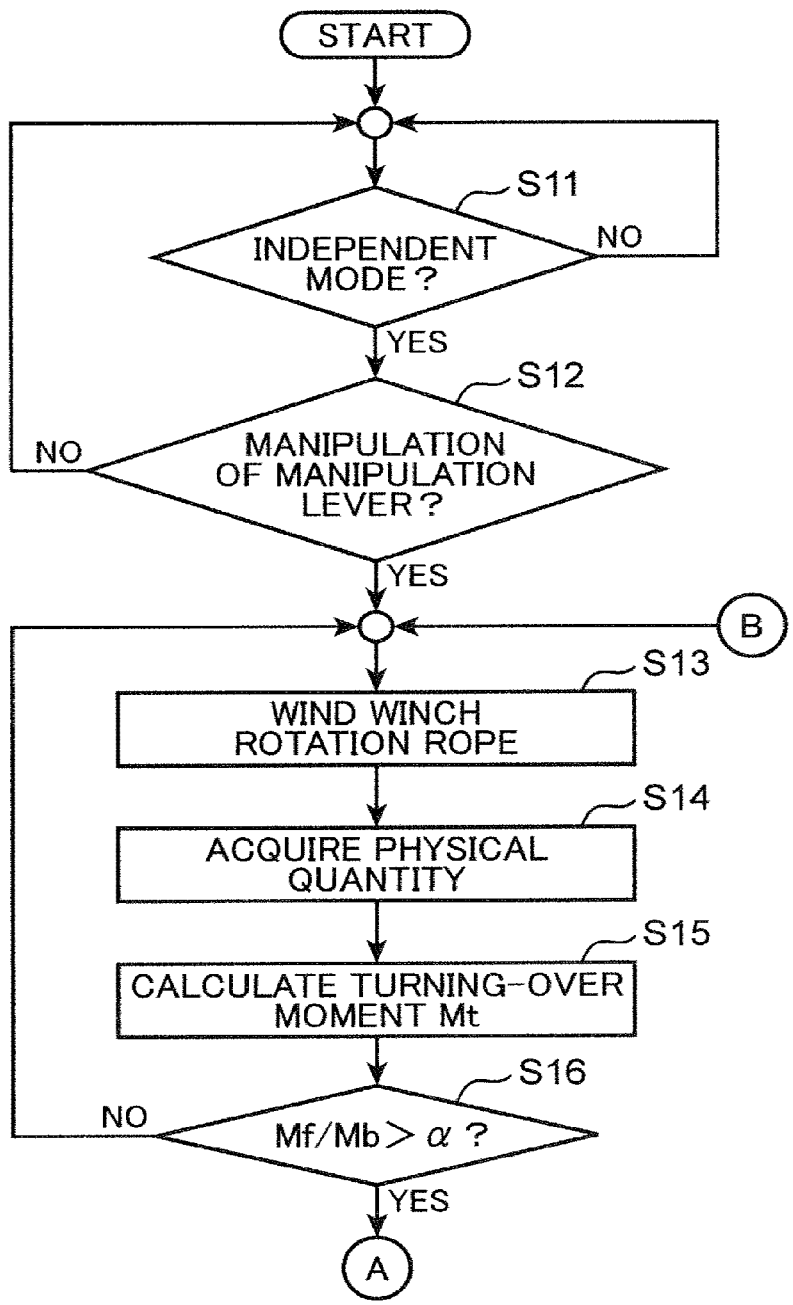
FIG. 20 is a flowchart showing another exemplary arithmetic processing by the controller.
Figure 21:
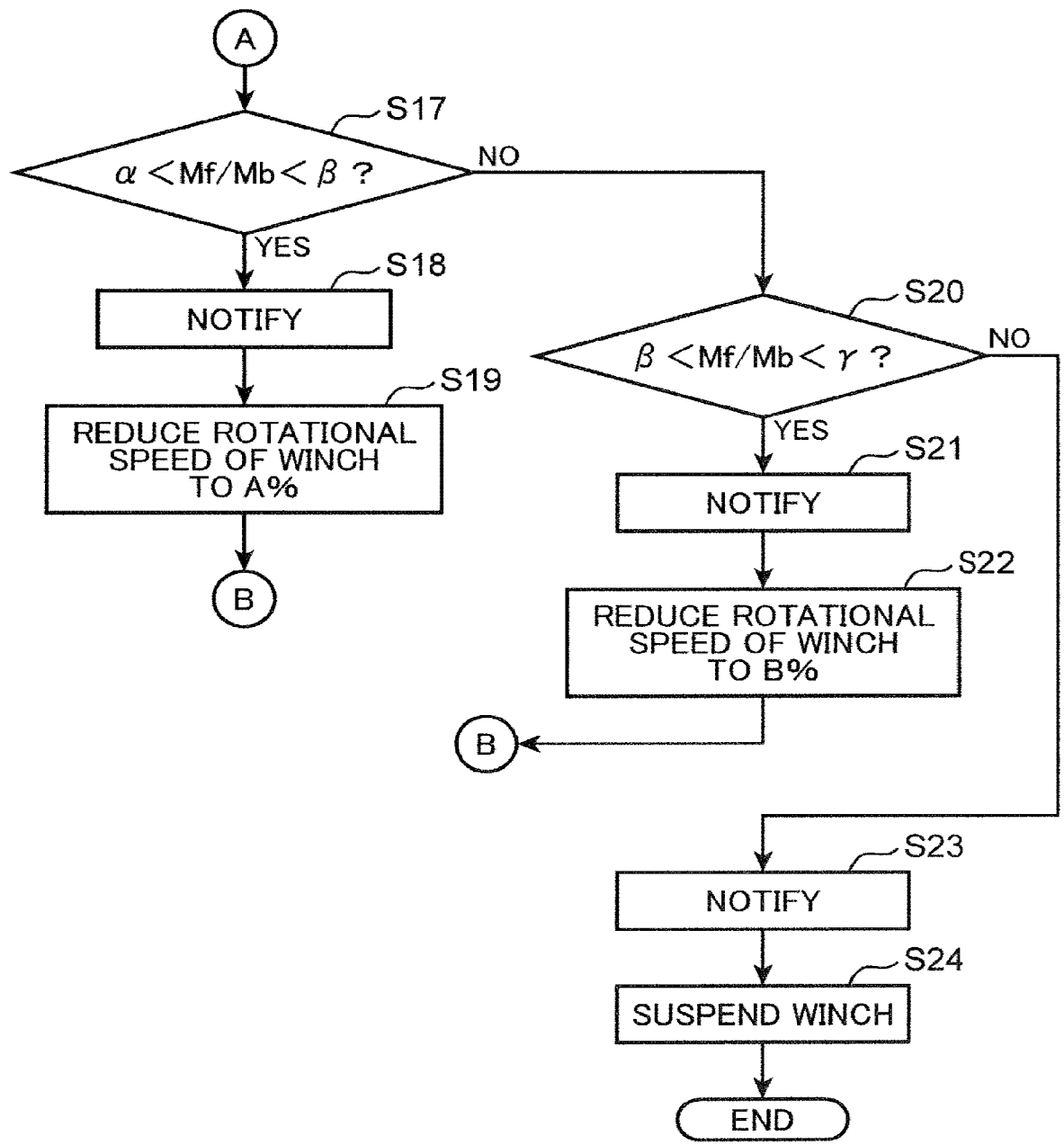
FIG. 21 is the flowchart showing another exemplary arithmetic processing by the controller.

Each of FIGS. 20 and 21 is a flowchart showing another exemplary arithmetic processing by the controller 100. Steps S11 to S15 in FIG. 20 are the same as steps S1 to S5 in FIG. 18, and thus the descriptions therefor are omitted. Hereinafter, the differences from the arithmetic processing shown in FIG. 18 will be described.

As shown in FIGS. 20 and 21, the stability determination section 102 of the controller 100 determines the stability of the crane 10 (steps S16, S17, S20). Specifically, the ratio calculation part of the calculation section 101 calculates a ratio (Mf/Mb) between the first moment Mf and the second moment Mb, and the stability determination section 102 compares the ratio (Mf/Mb) with each of thresholds α, β, γ. The thresholds α, β, γ are values for determining the stability of the crane 10, and are set in advance so as to satisfy, for example, the relation of 0<α<β<γ<1.0.

When the ratio (Mf/Mb) is equal to or lower than the threshold α (NO in step S16), the stability is not low. Thus, the operation control section 104 controls the boom raising and lowering winch 30 to continue the operation of winding the boom raising and lowering rope 38 (step S13).

Conversely, when the ratio (Mf/Mb) is higher than the threshold α (YES in step 16), the stability determination section 102 determines whether the ratio (Mf/Mb) is higher than the threshold α and lower than the threshold β (step S17). When the ratio (Mf/Mb) is higher than the threshold α and lower than the threshold β (YES in step S17), the notification control section 103 outputs a notification instruction of notifying in the notification device 110 the operator of the stability information concerning the stability determined by the stability determination section 102 (step S18). In this case, the stability information includes information of warning the operator of a low stability of the claim 10.

Next, the operation control section 104 outputs an operation instruction directing an operation required to avoid a decrease in the stability of the crane 10 based on the stability determined by the stability determination section 102 (step S19). In this case, the operation instruction includes, for example, an instruction of reducing the rotational speed of the boom raising and lowering winch to A %. Then, the operation control section 104 controls the boom raising and lowering winch 30 to continue the operation of winding the boom raising and lowering rope 38 at the reduced rotational speed (step S13).

When the ratio (Mf/Mb) is equal to or higher than the threshold β (NO in step S17), the stability determination section 102 determines whether the ratio (Mf/Mb) is higher than the threshold β and lower than the threshold γ (step S20). When the ratio (Mf/Mb) is higher than the threshold β and lower than the threshold γ (YES in step S20), the notification control section 103 outputs a notification instruction of notifying in the notification device 110 the operator of the stability information concerning the stability determined by the stability determination section 102 (step S21). In this case, the stability information may include information of warning the operator of the low stability of the crane 10 in a more persuading manner than in step S18.

Subsequently, the operation control section 104 outputs an operation instruction directing an operation required to avoid a decrease in the stability of the crane 10 based on the stability determined by the stability determination section 102 (step S22). In this case, the operation instruction includes, for example, an instruction of reducing the rotational speed of the boom raising and lowering winch 30 to B %. Then, the operation control section 104 controls the boom raising and lowering winch 30 to continue the operation of winding the boom raising and lowering rope 38 at the reduced rotational speed (step S13). The values A, B indicate degrees of reduction in the rotational speed of the raising and lowering winch 30, and are set in advance so as to satisfy the relation 100>A>B>0.

When the ratio (Mf/Mb) is equal to or higher than the threshold γ (NO in step S20), the notification control section 103 outputs a notification instruction of notifying in the notification device 110 the operator of the stability information concerning the stability determined by the stability determination section 102 (step S23). In this case, the stability information includes information (warning information) of warning the operator of the low stability of the crane 10 in a still further persuading manner than in step S21.

Next, the operation control section 104 outputs an operation instruction directing an operation required to avoid a decrease in the stability of the crane 10 based on the stability determined by the stability determination section 102 (step S24). Specifically, the boom raising and lowering winch 30 suspends, for example, the operation of winding the rope 38 in accordance with the operation instruction. In a case where the jib raising and lowering winch 32 is operating, the jib raising and lowering winch 32 suspends, for example, the operation of winding (or unwinding) the rope 44 in accordance with the operation instruction.

Modifications of First Embodiment

Figure 14:
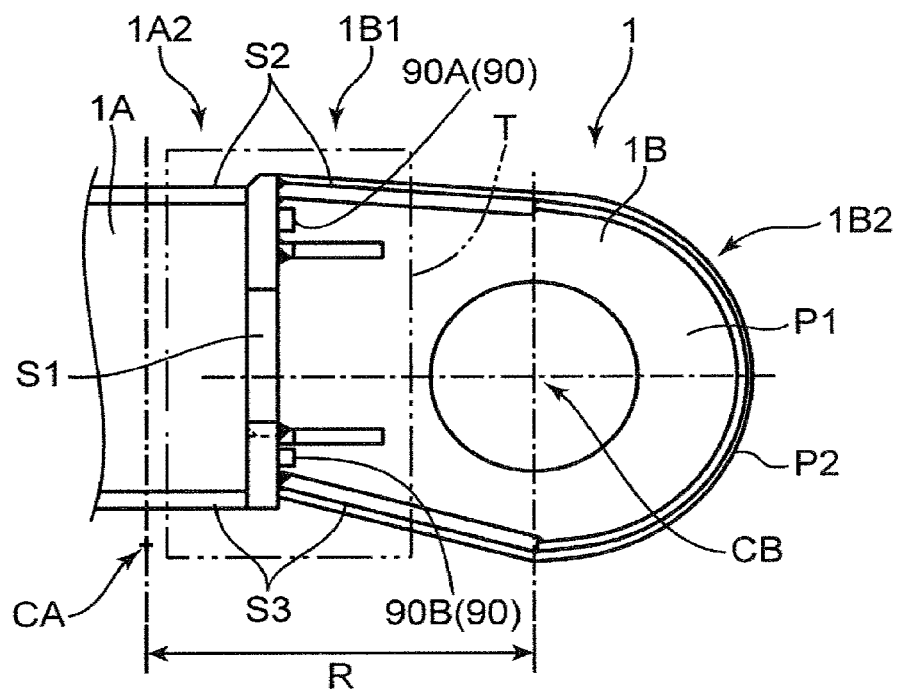
FIG. 14 is a sideview of a front end of a crawler frame seen in the direction of the arrow VI in FIG. 3 in a first modification of the first embodiment.
Figure 15:
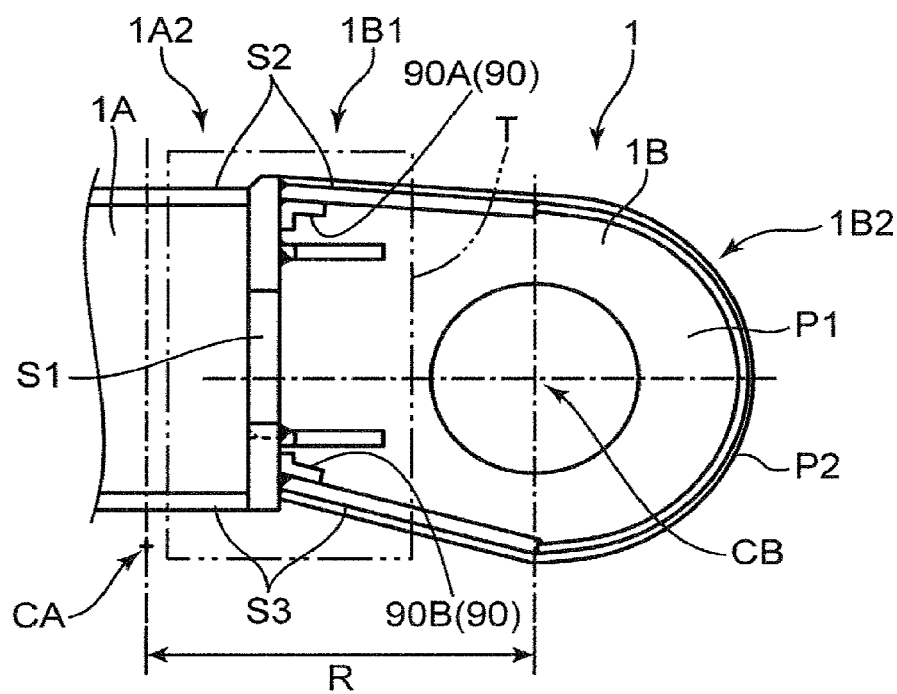
FIG. 15 is a sideview of a front end of a crawler frame seen in the direction of the arrow VI in FIG. 3 in a second modification of the first embodiment.
Figure 16:
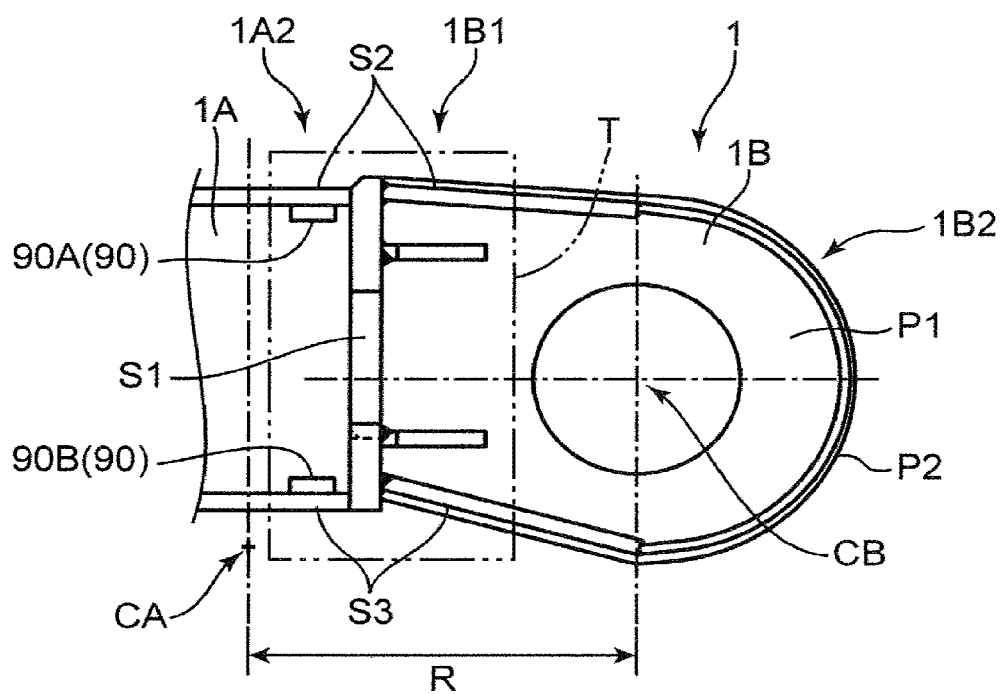
FIG. 16 is a sideview of a front end of a crawler frame seen in the direction of the arrow VI in FIG. 3 in a third modification of the first embodiment.

Each of FIGS. 14 to 16 is a sideview of a front end of a crawler frame 1 seen in the direction of the arrow VI in FIG. 3, FIG. 14 showing a first modification of the embodiment, FIG. 15 showing a second modification of the embodiment, and FIG. 16 showing a third modification of the embodiment.

The first to the third modifications shown in FIGS. 14 to 16 are equivalent to the embodiment shown in FIG. 6 in that a specific portion of the crawler frame 1 where a strain is to be detected by a physical quantity detector 90 in the forward and rearward directions is located at a position (a detection position) in a region R between a rotational axis CB of a drive tumbler 4a and a rotational axis CA of a first lower roller 6A. Further, the first to the third modifications are equivalent to the embodiment shown in FIG. 6 in that a first strain gauge 90A is provided in an upper portion of the crawler frame 1, and a second strain gauge 90B is provided in a lower portion of the crawler frame 1.

In contrast, the first to the third modifications differ from the embodiment shown in FIG. 6 in the location of the physical quantity detector 90 within the region R of the crawler frame 1. Details will be described below.

In the first modification shown in FIG. 14, the first strain gauge 90A and the second strain gauge 90B are provided at a plate-shaped web section S1 extending in the upward and downward directions. In the second modification shown in FIG. 15, the first strain gauge 90A extends along the web section S1 and an upper flange section S2, and the second strain gauge 90B extends along the web section S1 and a lower flange section S3.

In the third modification shown in FIG. 16, the first strain gauge 90A and the second strain gauge 90B are provided at a distal end 1A2 of a frame main body 1A. Specifically, in the third modification, the first strain gauge 90A is provided at the distal end 1A2 of the frame main body 1A defining an upper flange section S2. The second strain gauge 90B is provided at the distal end 1A2 of the frame main body 1A defining a lower flange section S3.

Figure 17:
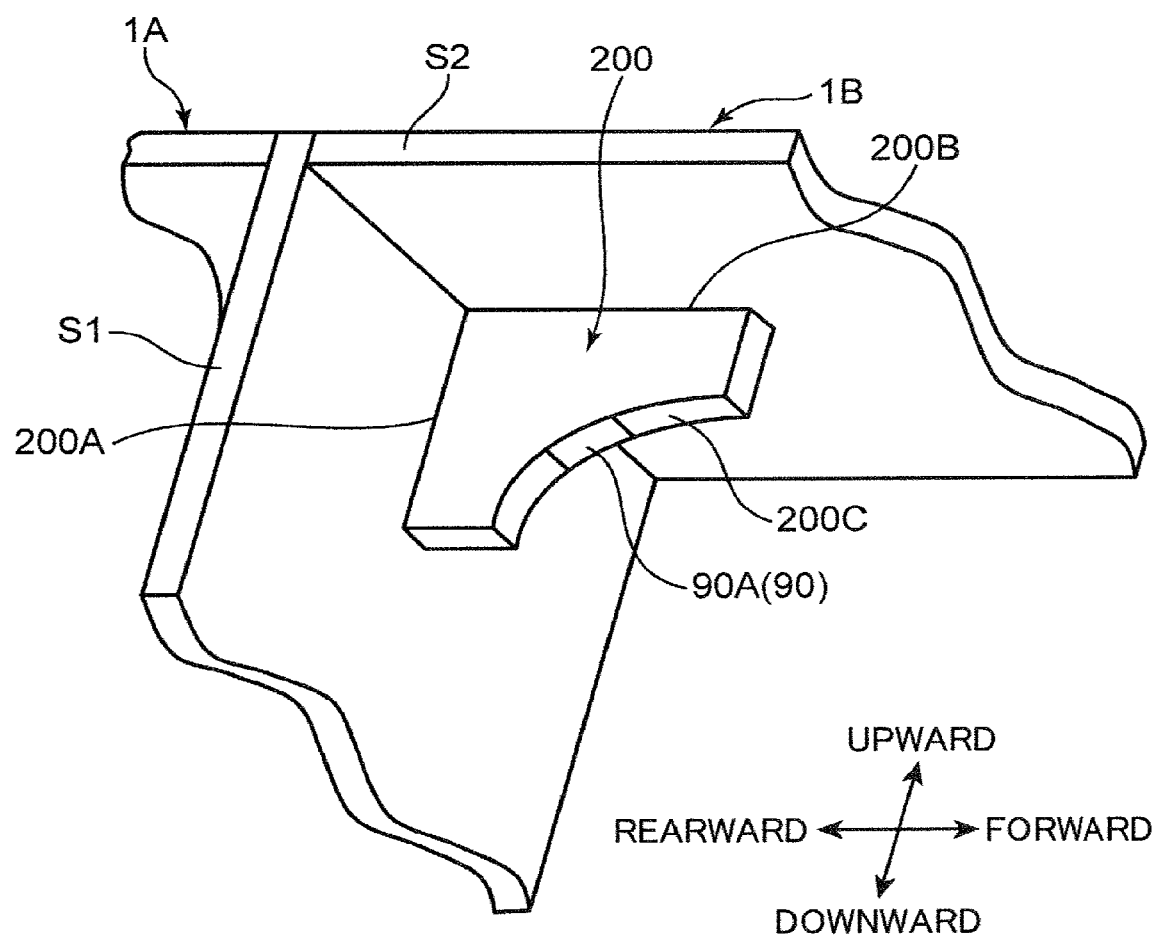
FIG. 17 is a perspective view schematically showing a fourth modification of the first embodiment.

FIG. 17 is a perspective view schematically showing a fourth modification of the first embodiment. In the fourth modification shown in FIG. 17, a crawler frame 1 further includes a measurement support base 200 (a deformation member) to which a strain gauge (a physical quantity detector) is attached. The measurement support base 200 is located at such a position as to sensitively detect a strain occurring in the crawler frame 1 in a state where a distal end 14B of a boom 14 is away in a boom direction D1 from a proximal end 14A of the boom 14 in the forward and rearward directions. Specifically, the measurement support base 200 is disposed in a specific portion of the crawler frame 1 where a detection position in the forward and rearward directions is within the region R (sec FIG. 4) between the rotational axis CB of the drive tumbler 4a and the rotational axis CA of the first lower roller 6A.

For instance, the measurement support base 200 may be disposed in a specific portion of the crawler frame 1 where each of the strain gauge 90A and the strain gauge 90B is provided as shown in FIGS. 6, 14, 15, and 16. However, the specific portion for disposing the measurement support base 200 should not be limited thereto. In the detailed example shown in FIG. 17, the measurement support base 200 is in the same portion as the portion where each of the strain gauges 90A and 90B is provided in the second modification shown in FIG. 15. Details will be described below.

As shown in FIG. 17, the measurement support base 200 extends along the web section S1 and the upper flange section S2. In other words, the measurement support base 200 is located at the corner between the web section S1 and the upper flange section S2.

The measurement support base 200 includes a first surface 200A, a second surface 200B, and a retaining surface 200C. The first surface 200A faces the web section S1 and is attached to the web section S1. The second surface 200B faces the upper flange section S2 and is attached to the upper flange section S2. The retaining surface 200C connects an end edge of the first surface 200A and an end edge of the second surface 200B with each other, and retains the strain gauge 90A. In the detailed example shown in FIG. 17, the retaining surface 200C has a slope inclined upward as advancing forward and retaining the strain gauge 90A thereon. In the detailed example shown in FIG. 17, the slope is formed of a curve surface (a concave) in an arc shape, but may be formed of a flat surface or a convex. Moreover, in the detailed example shown in FIG. 17, the measurement support base 200 has a substantially L-shape. However, the shape of the measurement support base 200 should not be limited to the substantially L-shape.

Another measurement support base 200 is arranged at another corner between the web section S1 and a lower flange section S3 in addition to the measurement support base at the corner between the web section S1 and the upper flange section S2 as described above. Here, a bending moment is applied to the crawler frame 1 and a bending deformation occurs in each of a tumbler bracket 1B and a frame main body 1A when the tiltable attachment is raised and lowered. As a result, a strain occurs on the retaining surface 200C of the upper measurement support base 200 in a direction of being pulled and stretched. Similarly, a strain occurs on the retaining surface 200C of the lower measurement base in a direction of being compressed and contracted. Under the circumstances, the strain gauge provided along each of the retaining surfaces 200C can detect the corresponding strain necessary to calculate the bending moment. In the case where the retaining surface 200C is a curve surface in an arc shape, it is possible to adjust the magnitude of the strain by changing the radius of curvature in the arc shape.

Hereinafter, the second to the seventh embodiments will be described. A mobile crane 10 according to each of the second to the seventh embodiments differs from the mobile crane according to the first embodiment in that a lower traveling body 11 includes at least one receiving member 80 (one support member 80). In the second to the seventh embodiments, the lower traveling body 11 has almost the same configuration as the configuration of the lower traveling body 11 in the first embodiment except the aforementioned difference. Accordingly, in the following descriptions of the second to the seventh embodiments, the same structural elements as those in the first embodiment are given with the same reference signs and numerals, and the descriptions therefor will be omitted.

Second Embodiment

Figure 22:
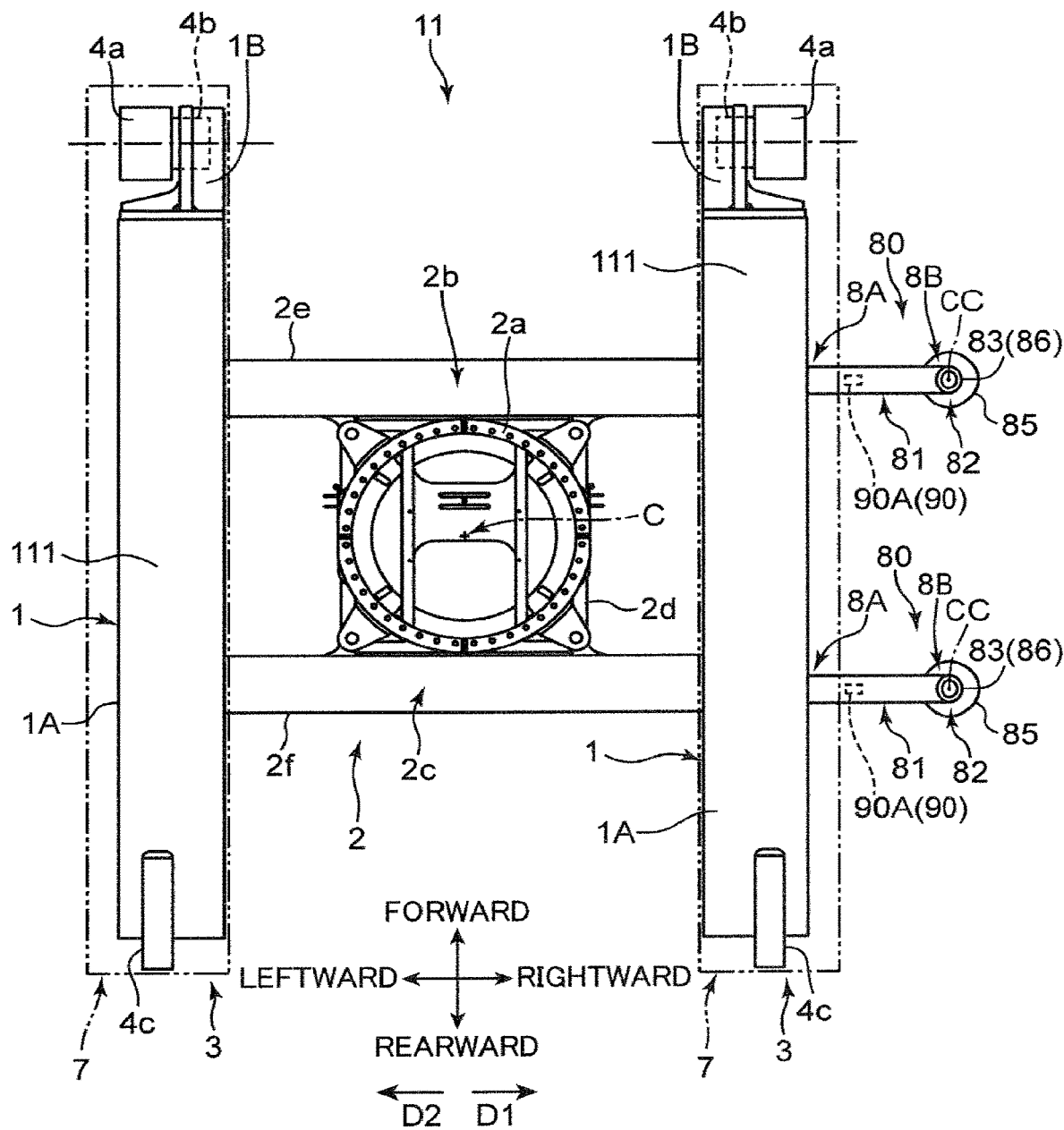
FIG. 22 is a plan view of a lower traveling body of a mobile crane according to second and third embodiments.
Figure 23:
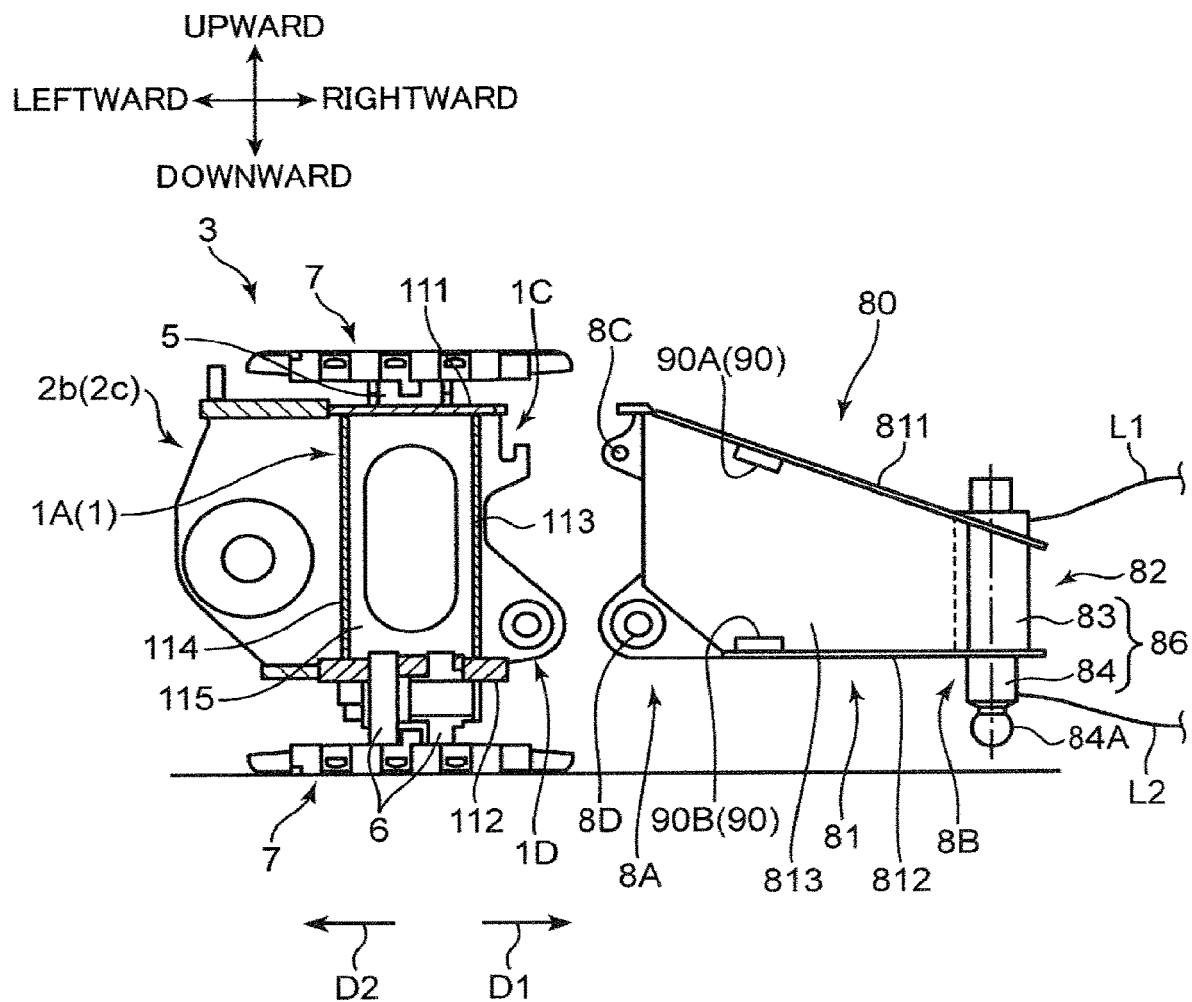
FIG. 23 is a sideview of a support member (a receiving member) to be attached to a crawler frame of the mobile crane in FIG. 22.
Figure 24:
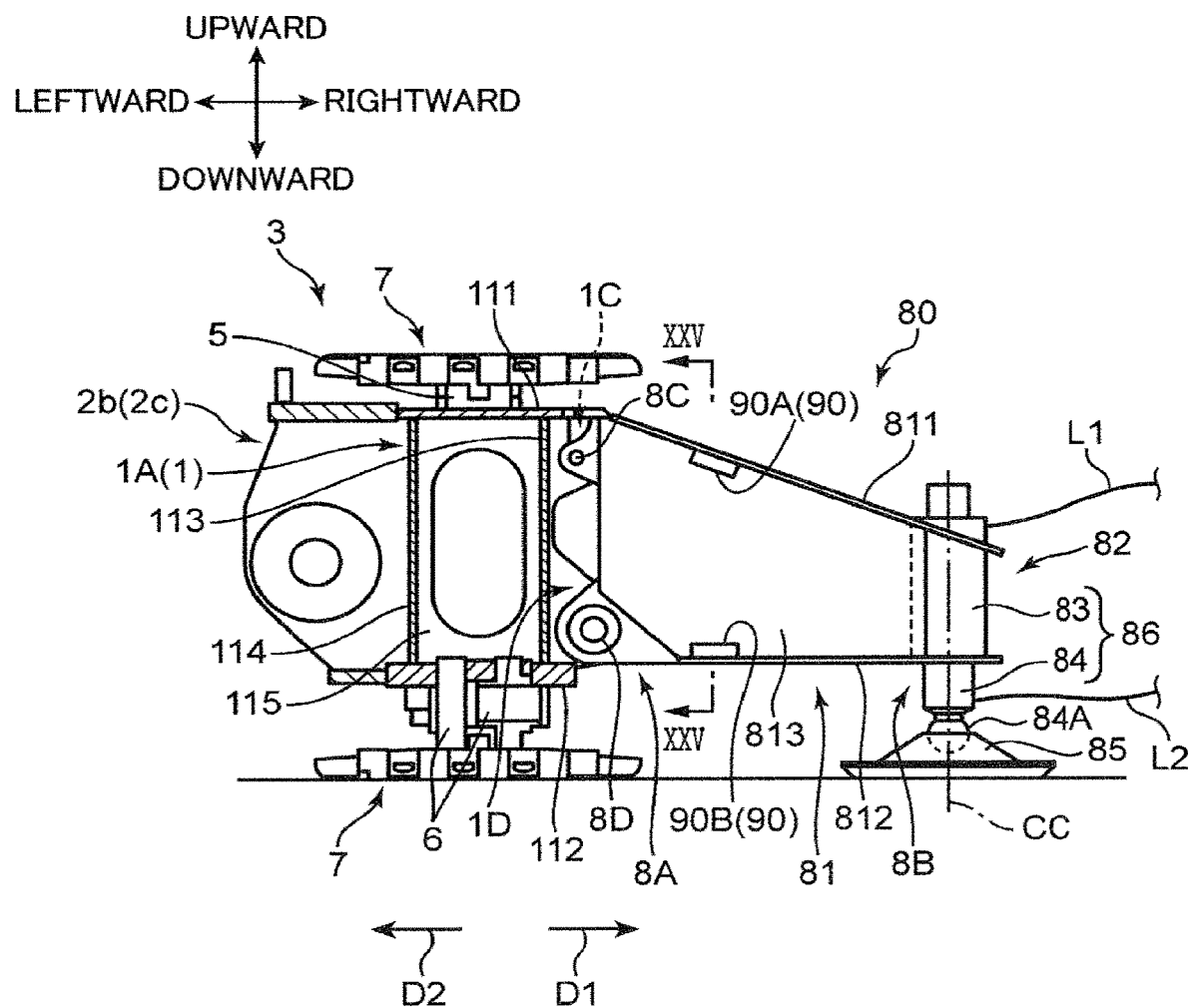
FIG. 24 is a sideview of the support member having been attached to the crawler frame in FIG. 22.
Figure 26:
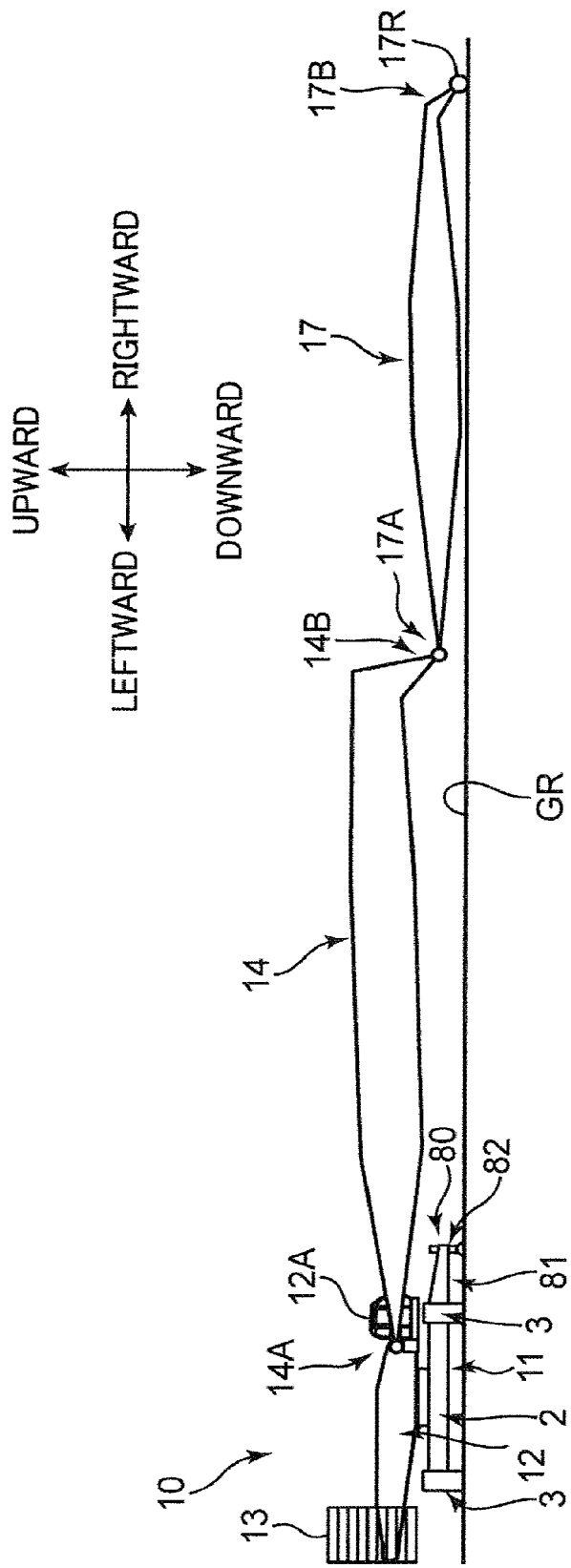
FIG. 26 is a schematic sideview of the mobile crane in FIG. 1 according to the second and the third embodiments having a specific posture that a tiltable attachment is in a lowered state in an assembly work or a disassembly work of the mobile crane.
Figure 27:
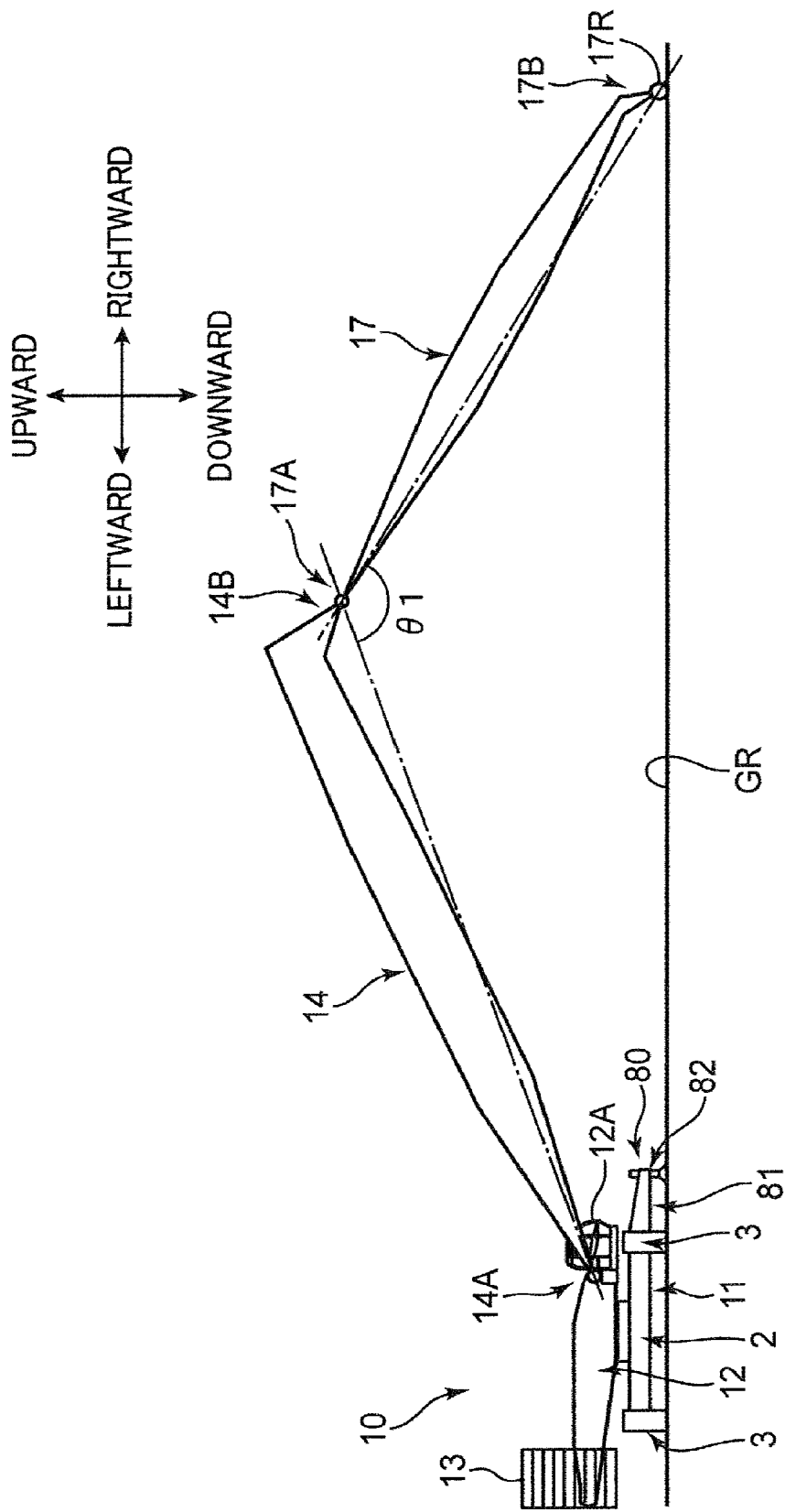
FIG. 27 is a schematic sideview of the mobile crane in FIG. 1 according to the second and the third embodiments having a specific posture that the tiltable attachment is being raised or lowered in the assembly work or the disassembly work.
Figure 28:
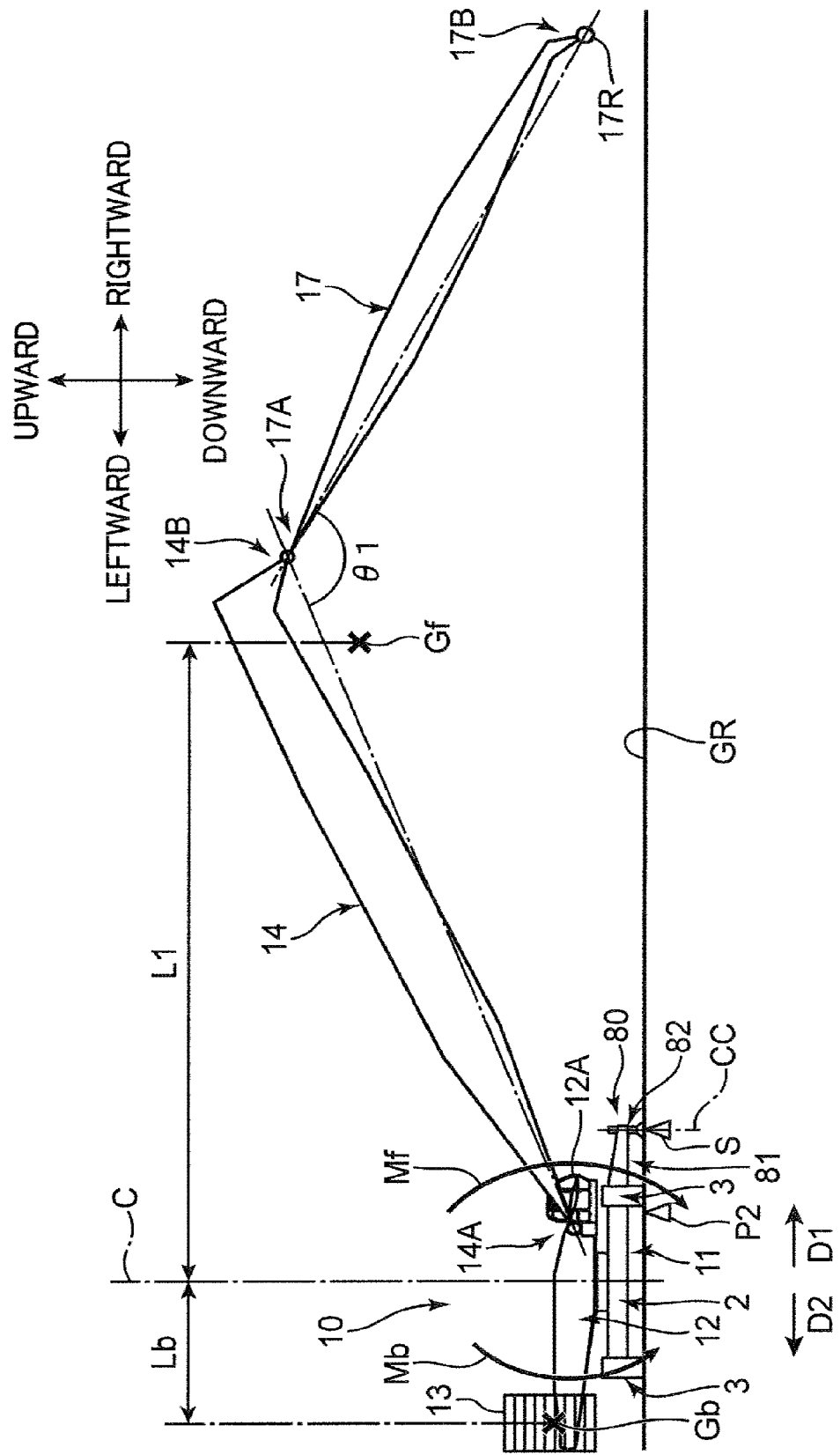
FIG. 28 is a schematic sideview of the mobile crane in FIG. 1 according to the second and the third embodiments having a specific posture that the tiltable attachment is being raised or lowered in the assembly work or the disassembly work.
Figure 29:
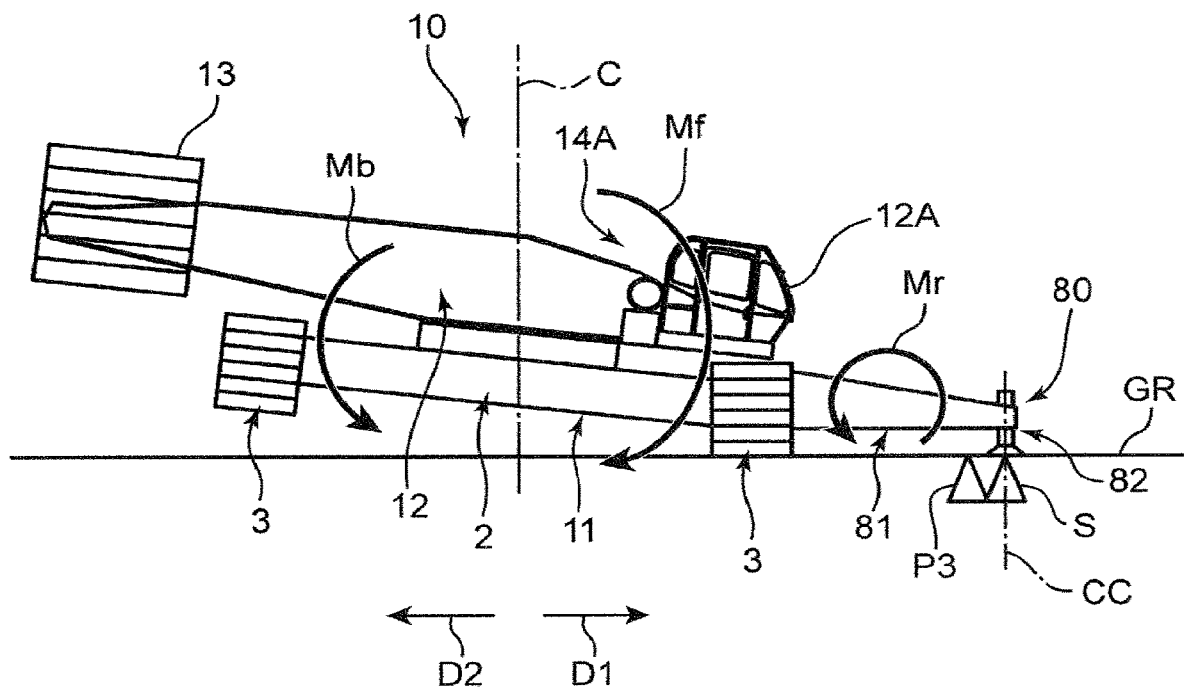
FIG. 29 is a schematic sideview of the mobile crane in FIG. 1 according to the second and the third embodiments having a specific posture with a moment balanced position close to a turning-over fulcrum in the assembly work or the disassembly work.
Figure 30:
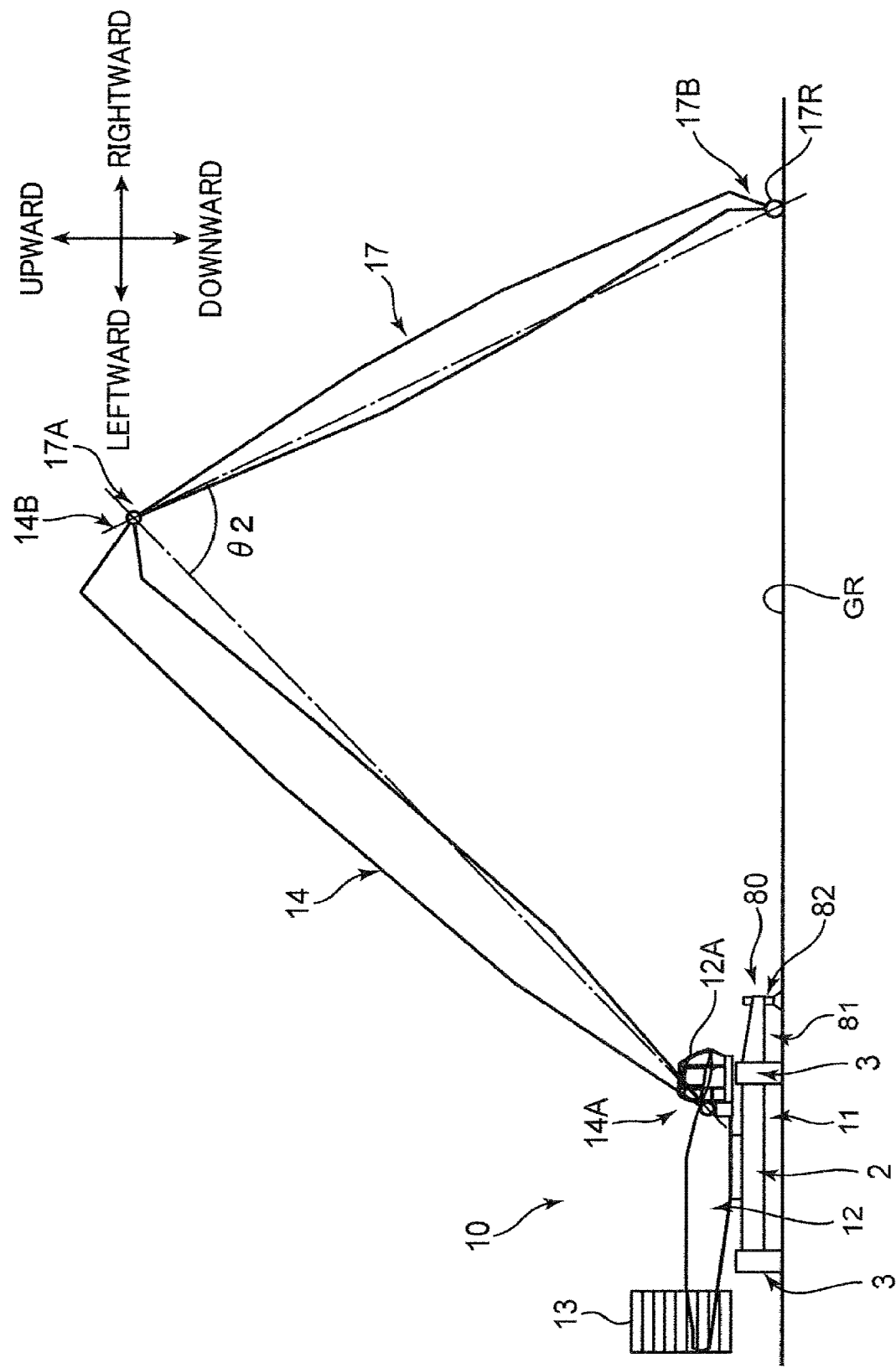
FIG. 30 is a schematic sideview of the mobile crane in FIG. 1 according to the second and the third embodiments having a specific posture that the tiltable attachment is being raised or lowered in the assembly work or the disassembly work.
Figure 31:
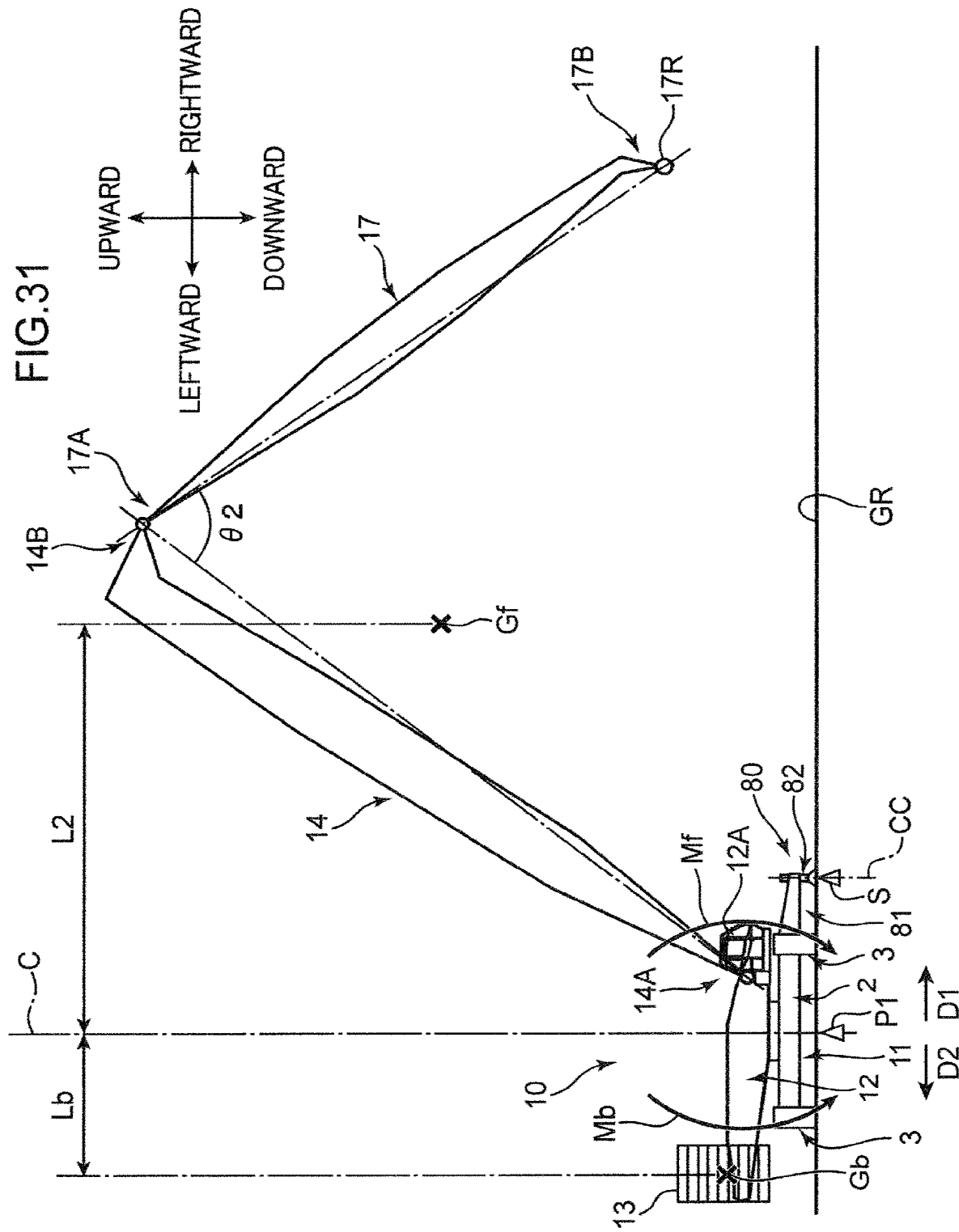
FIG. 31 is a schematic sideview of the mobile crane in FIG. 1 according to the second and the third embodiments having a specific posture that the tiltable attachment is being raised or lowered in the assembly work and the disassembly work.

FIG. 22 is a plan view of a lower traveling body 11 of a mobile crane 10 according to the second embodiment. FIG. 23 is a sideview of a support member 80 to be attached to a crawler frame 1 of the crane 10 in FIG. 22. FIG. 24 is a side view of the support member 80 having been attached to the crawler frame 1 in FIG. 22.

In the second embodiment shown in FIG. 22, the lower traveling body 11 has a plurality of support members 80 (specifically, a pair of support members 80). Each of the pair of support members 80 has a connection part connected with the crawler frame 1 in a frame unit, and a contact part being in contact with the ground. The connection part of the support member 80 is constituted by a proximal end 8A of a beam 81 to be described later, and the contact part of the support member 80 is constituted by a float 85 that is a lower end of a leg 82 to be described later.

A boom direction in the second embodiment coincides with a horizontal component of a direction in which a boom 14 extends from an upper slewing body 12 in the assembly work and the disassembly work. In the second embodiment, the boom direction D1 corresponds to a first direction D1 (the rightward direction) shown in FIG. 22. As shown in FIG. 22, the float 85 (the contact part) serves as a part (a reaction force receiving part) for receiving a reaction force from the ground at a position away from a slewing axis C in the boom direction D1. The float 85 (the contact part) is away from the proximal end 8A (the connection part) of the beam 81 in the boom direction D1.

Hereinafter, the second embodiment will be described in detail. As shown in FIGS. 22 and 23, the crawler frame 1 includes a frame main body 1A and a tumbler bracket 1B. The frame main body 1A has a shape extending in the forward and rearward directions. The frame main body 1A has a top plate 111 extending in a longitudinal direction of the frame main body 1A, a bottom plate 112 spaced downward from the top plate 111 and extending in the longitudinal direction, and a pair of side plates 113, 114 each extending in the longitudinal direction. The one side plate 113 connects right ends of the top plate 111 and the bottom plate 112 with each other. The other side plate 114 connects left ends of the top plate 111 and the bottom plate 112 with each other.

As shown in FIG. 23, the frame main body 1A has a closed cross section defined by the top plate 111, the bottom plate 112, and the pair of side plates 113, 114. The closed cross section is specifically defined by the top plate 111 and the bottom plate 112 each extending in the leftward and rightward directions, and the pair of side plates 113, 114 each extending in the upward and downward directions. For instance, a flat plate 115 (a reinforcing plate) having a posture perpendicularly intersecting the longitudinal direction may be arranged in the inside of the closed cross section. In the embodiment, the flat plate 115 is provided in a specific portion of the frame main body 1A to which the corresponding support member 80 is attached or in the vicinity thereof. The specific portion of the frame main body 1A receives a bending moment caused in the support member 80 by a turning-over moment of the crane 10. Therefore, the flat plate 115 provided in the specific portion of the frame main body 1A or in the vicinity thereof can reinforce the specific portion. The rigidity of the crawler frame 1 is consequently enhanced.

[Support Member (Receiving Member)]

As shown in FIG. 22, in the embodiment, the pair of support members 80 is supported by the crawler frame 1 (a first crawler frame 1) of a first crawler 3 of a pair of crawlers 3. The pair of support members 80 is arranged at a distance between the support members in the forward and rearward directions. The pair of support members 80 includes a first support member 80 and a second support member 80 located in the rear of the first support member 80. The support members 80 have the same configuration except their different attachment positions to the first crawler frame 1.

As shown in FIG. 22, the pair of support members 80 is preferably attached to the first crawler frame 1 so that at least a part of the proximal end 8A of the first support member 80 and at least a part of the proximal end 8A of the second support member 80 are located in a region between a position of the first crawler frame 1 corresponding to a front edge 2e of a front axle 2b and another position of the first crawler frame 1 corresponding to a rear edge 2f of a rear axle 2c in the forward and rearward directions.

The pair of support members 80 is more preferably attached to the first crawler frame 1 so that at least a part of the proximal end 8A of the first support member 80 is located in a region of the first crawler frame 1 corresponding to the front axle 2b in the forward and rearward directions, and at least a part of the proximal end 8A of the second support member 80 is located in another region of the first crawler frame 1 corresponding to the rear axle 2c in the forward and rearward directions.

A first distance from the attachment position of the proximal end 8A of the first support member 80 to the first crawler frame 1 to the slewing axis C of the upper slewing body 12, and a second distance from the attachment position of the proximal end 8A of the second support member 80 to the first crawler frame 1 to the slewing axis C of the upper slewing body 12 are preferably equivalent to each other, and are more preferably the same. An excessively large difference between the first distance and the second distance is likely to cause a large difference between deflection and torsion occurring in the beam 81 of the first support member 80, and deflection and torsion occurring in the beam 81 of the second support member 80.

Each of the support members 80 includes the beam 81 and the leg 82. The beam 81 extends outward from the first crawler frame 1 in the leftward and rightward directions. The beam 81 has the proximal end 8A and a distal end 8B. The proximal end 8A of the beam 81 is attached to the first crawler frame 1. The distal end 8B of the beam 81 is away from the first crawler frame 1 in the boom direction D1 (the rightward direction in FIG. 3) corresponding to one of the leftward and rightward directions.

In the embodiment, the beam 81 linearly extends in a plan view shown in FIG. 22. The beam 81 extends in a direction parallel to the leftward and rightward directions in the plan view, but should not be limited thereto and may extend in a direction oblique to the leftward and rightward directions. Specifically, the configuration in the embodiment where the beam 81 extends outward from the crawler frame 1 in the leftward and rightward directions involves a case where the beam 81 extends in a direction oblique to the leftward and rightward directions as well as the case where the beam 81 extends in the direction parallel to the leftward and rightward directions, in the plan view of the beam 81. For instance, the front beam 81 of the pair of beams 81 may extend diagonally forward, and the rear beam 81 thereof may extend diagonally rearward.

The leg 82 is supported on the distal end 8B of the beam 81 and extends downward from the distal end 8B so that the lower end 85 comes into contact with the ground. In the embodiment, the leg 82 includes a hydraulic cylinder. Specifically, the leg 82 includes a cylinder main body 83 supported on the distal end 8B of the beam 81 and extending downward from the distal end 8B, a rod 84 slidable along the cylinder main body 83 in the upward and downward directions, and the float 85 (see FIG. 5) attached to a lower end 84A of the rod 84 (see FIG. 4). The float 85 constitutes the lower end 85 (the contact part) of the leg 82.

The leg 82 of the support member 80 is away from the first crawler 3 in the boom direction D1. This position of the leg 82 away from the first crawler 3 in the boom direction D1 means that a central axis CC of the leg 82 is at a position away from the first crawler 3 in the boom direction D1. In the embodiment, the central axis CC of the leg 82 serves as a central axis CC of the hydraulic cylinder (i.e., the central axis CC of the rod 84) extending in the upward and downward directions.

FIG. 25A shows an exemplary cross-sectional view of the beam 81 of the support member 80 taken along the line XXV-XXV in FIG. 24. FIG. 25B shows another exemplary cross-sectional view of the beam 81 of the support member 80 taken along the line XXV-XXV in FIG. 24.

The beam 81 of the support member 80 may have an I-shaped cross section perpendicularly intersecting the longitudinal direction of the beam 81 as shown in FIG. 25A, or a closed cross section perpendicularly intersecting the longitudinal direction of the beam 81 as shown in FIG. 25B.

In the case of the cross section shown in FIG. 25A, the beam 81 has a top plate 811 extending in the longitudinal direction of the beam 81, a bottom plate 812 spaced downward from the top plate 811 and extending in the longitudinal direction, and a side plate 813 extending in the longitudinal direction. The side plate 813 connects the top plate 811 and the bottom plate 812 with each other. The I-shaped cross section shown in FIG. 25A is defined by the top plate 811 and the bottom plate 812 each extending in the leftward and rightward directions, and the side plate 813 extending in the upward and downward directions.

In the case of the cross section shown in FIG. 25B, the beam 81 has a top plate 811 extending in the longitudinal direction of the beam 81, a bottom plate 812 spaced downward from the top plate 811 and extending in the longitudinal direction, and a pair of side plates 813, 814 each extending in the longitudinal direction. The one side plate 813 connects rear ends of the top plate 811 and the bottom plate 812 with each other, and the other side plate 814 connects front ends of the top plate 811 and the bottom plate 812 with each other. The closed cross section shown in FIG. 25B is defined by the top plate 811 and the bottom plate 812 each extending in the leftward and rightward directions, and the pair of side plates 813, 814 each extending in the upward and downward directions.

Although the top plate 811 is inclined downward as advancing to the distal end 8B of the beam 81 in the detailed examples shown in FIGS. 25A, 25B, the arrangement should not be limited thereto. The top plate 811 may be horizontally arranged.

In the embodiment, each of the support members 80 is configured to be detachably attachable to the crawler frame 1. Details will be described below.

As shown in FIG. 23, the proximal end 8A of the beam 81 is formed with an engaged portion for attaching the beam 81 to the crawler frame 1. The engaged portion is engageable with an engaging portion provided in the frame main body 1A of the crawler frame 1. In the embodiment, the engaged portion includes a pair of upper through holes 8C, a pair of lower through holes 8D, and a pair of pins. The upper through holes 8C and the lower through holes 8D are spaced apart from each other in the upward and downward directions. One of the pair of pins is inserted in the pair of upper through holes 8C for fastening in advance.

In contrast, the engaging portion provided in the frame main body 1A of the crawler frame 1 includes a pair of hooks 1C and a pair of lower through holes 1D located below the hooks 1C. As shown in FIGS. 23 and 24, the pin extending in the upper through holes 8C of the engaged portion is hooked by the hooks 1C of the engaging portion. Further, the other of the pair of pins is inserted in the lower through holes 8D of the engaged portion and the lower through holes 1D of the engaging portion in a state where the through holes 8D and the through holes 1D face each other. Moreover, the lower end 84A of the rod 84 of the leg 82 shown in FIG. 23 fits in a recess on a top surface of the float 85 constituting the lower end 85 of the leg 82 shown in FIG. 24. Consequently, the support member 80 is attached to the crawler frame 1.

Each of the support members 80 is detachable from the crawler frame 1 in a reverse sequence of the above-described attachment work.

In the embodiment, the support members 80 (side jacks) detached from the crawler frame 1 can serve as members (a front jack and a rear jack) of a trans-lifter provided at each of the front axle 2b and the rear axle 2c of the lower traveling body 11. Details will be described below.

The trans-lifter includes a plurality of support members and is aimed at lifting a frame 2 from the ground for attaching the crawler 3 to the front axle 2b and the rear axle 2c of the frame 2, and detaching the crawler 3 therefrom. The front axle 2b is provided with two engaging portions each having the same configuration as the engaging portion provided in the crawler frame 1, and the rear axle 2c is also provided with two engaging portions each having the same configuration as the engaging portion provided in the crawler frame 1. In the embodiment, at least a part of the plurality of (typically, four) support members of the trans-lifter serves as the pair of support members 80 provided in the crawler frame 1 shown in FIG. 22. However, the support members 80 (the side jacks) may not serve as the support members (the front jack and the rear jack) of the trans-lifter.

[Physical Quantity Detector]

A physical quantity detector 90 is configured to detect information necessary to safely raise and lower the boom 14 in the assembly work and the disassembly work of the crane 10. Specifically, the physical quantity detector 90 detects a strain occurring in the beam 81 of the support member 80. The physical quantity detector 90 is configured to detect a strain occurring in the beam 81 of the support member 80 and corresponding to a moment in a direction of causing the crane 10 to turn over in one of the leftward and rightward directions.

In the embodiment, the crane 10 includes a plurality of physical quantity detectors 90 as shown in FIG. 22. Specifically, the support members 80 are provided with their respective physical quantity detectors 90. With this configuration, a strain occurring in the beam 81 of each of the support members 80 is detectable. In the embodiment, the two physical quantity detectors 90 have the same configuration, and each of the detectors is provided at the same position in the corresponding crawler frame 1 as shown in FIG. 22. Therefore, one of the physical quantity detectors 90 is mainly focused below.

As shown in FIGS. 23 and 24, the physical quantity detector 90 in the embodiment is closer to the proximal end 8A than the distal end 8B of the beam 81 in the beam 81. However, the physical quantity detector 90 may be closer to the distal end 8B than the proximal end 8A of the beam 81 in the beam 81, or may be at the longitudinal center of the beam 81.

The physical quantity detector 90 is preferably arranged in a portion of the beam 81 where a strain is likely to occur. In the arrangement, a strain caused in the beam 81 by the moment is sensitively detectable. Such a portion where the strain is likely to occur may be, for example, a connection portion between the beam 81 and the crawler frame 1 or an adjacent portion that is adjacent to the connection portion, or a connection portion between the beam 81 and the leg 82 or an adjacent portion that is adjacent to the connection portion.

The physical quantity detector 90 includes at least one device for detecting the strain in the beam 81. Adoptable for this device is the exemplary device described in the first embodiment.

As shown in FIG. 24, the physical quantity detector 90 in the embodiment includes a plurality of strain gauges (a first strain gauge 90A and a second strain gauge 90B in the illustrated example). The first strain gauge 90A is provided in an upper portion of the beam 81, and the second strain gauge 90B is provided in a lower portion of the beam 81. The strain gauge 90A can detect a strain occurring in the upper portion of the beam 81, and the strain gauge 90B can detect a strain occurring in the lower portion of the beam 81.

In the exemplary arrangements of the strain gauges shown in FIGS. 25A and 25B, the first strain gauge 90A is provided on the top plate 811, and the second strain gauge 90B is provided on the bottom plate 812. This leads to an increased distance from a neutral plane of the beam 81 to each of the strain gauges. Thus, a strain occurring in the beam is sensitively detectable. The first strain gauge 90A may be provided in an upper portion of the side plate 813, and the second strain gauge 90B may be provided in a lower portion of the side plate 813.

As shown in FIG. 25A, in the I-shaped cross section of the beam 81, the first strain gauge 90A is located, for example, around a boundary between the top plate 811 and the side plate 813, and the second strain gauge 90B is located, for example, around a boundary between the bottom plate 812 and the side plate 813. However, their locations should not be limited thereto. Each of the strain gauges may be located at a position away from the boundary.

As shown in FIG. 25B, in the closed cross section of the beam 81, the first strain gauge 90A is located at the width-center of the top plate 811 of the beam 81, and the second strain gauge 90B is located at the width-center of the bottom plate 812 of the beam 81. However, their locations should not be limited thereto. Each of the strain gauges may be located at a position away from the width-center.

The physical quantity detector 90 detects a strain occurring in the beam 81 of the support member 80 in the raising operation and the lowering operation by the crane 10. A detection signal output from the physical quantity detector 90 is input to the controller 100 shown in FIG. 2. Arithmetic processing to be executed by the controller 100 is the same as that executed in the first embodiment, and thus the description therefor is omitted.

[Assembly Work and Disassembly Work]

Next, the assembly work and the disassembly work of the crane 10 according to the second embodiment will be described. Each of FIGS. 26 to 31 is a schematic side view of the crane 10 according to the second embodiment having a specific posture in the assembly work or the disassembly work thereof. As shown in FIGS. 26 to 31, the second embodiment differs from the first embodiment in that the boom direction corresponds to one of the leftward and rightward directions (the rightward direction in the detailed example), that the float 85 constituting the lower end of a beam 82 of a support member 80 serves as a reaction force receiving part, and the physical quantity detector 90 is provided in the support member 80. In contrast, a basic sequence of each of the assembly work and the disassembly work in the second embodiment is the same as the sequence described with reference to FIGS. 8 to 13, and hence detailed description therefor is omitted.

Modifications of Second Embodiment

In the crane 10 according to the second embodiment, the physical quantity detector 90 (a strain detector) is sufficiently configured to detect a strain occurring in the beam 81 of the support member 80, and hence the location of the physical quantity detector 90 should not be limited to those described above.

Figure 32:
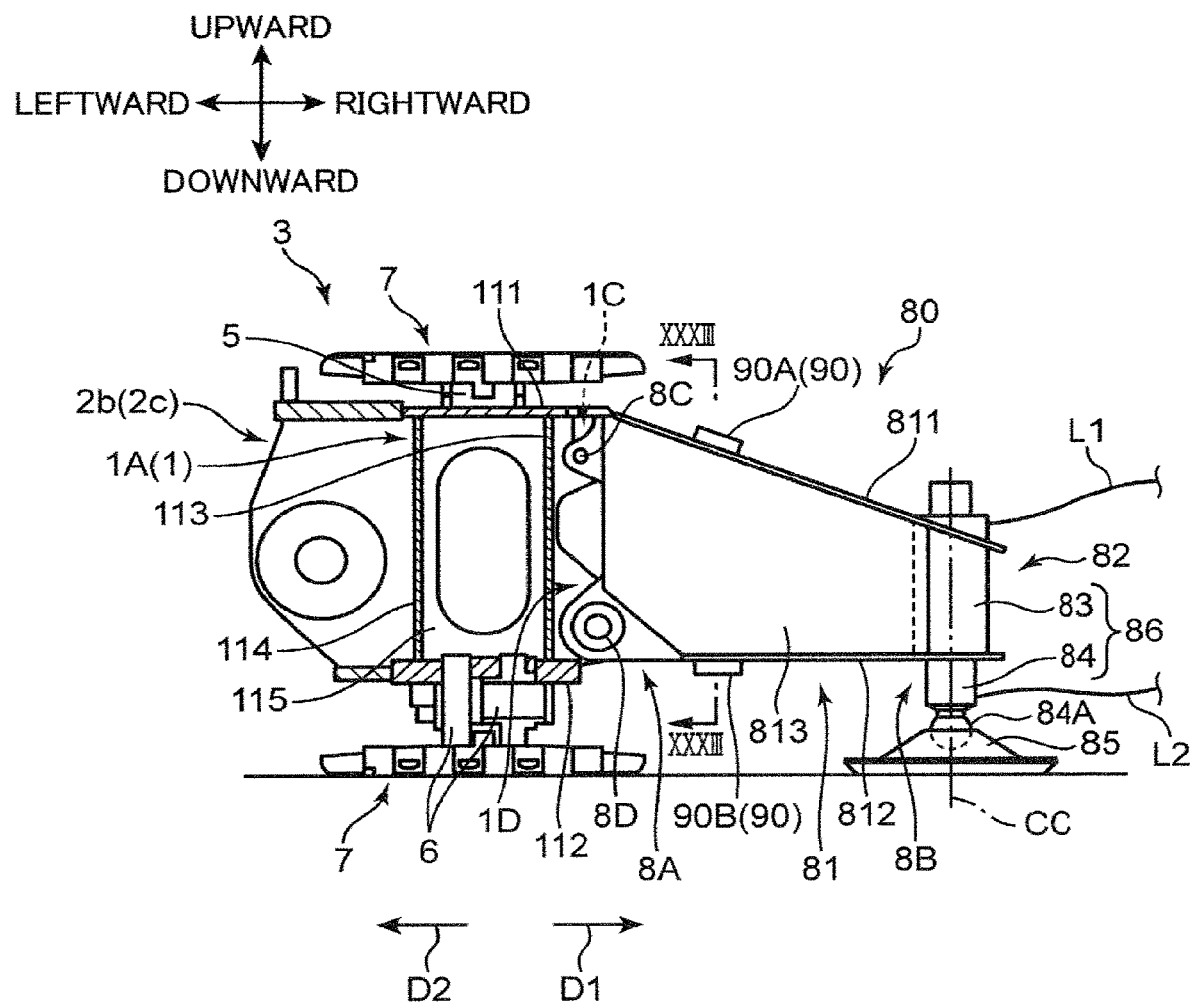
FIG. 32 is a sideview of a lower traveling body of a mobile crane according to a first modification of the embodiments.

For example, as shown in FIGS. 32, 33A, and 33B, the physical quantity detector 90 may be provided on an outer surface (an upper surface) of the top plate 811 and an outer surface (a lower surface) of the bottom plate 812 of the beam 81.

Moreover, the physical quantity detector 90 may not be necessarily provided in the beam 81, and may be provided, for example, in a specific portion of the leg 82 that is adjacent to the distal end 8B of the beam 81.

Figure 34:
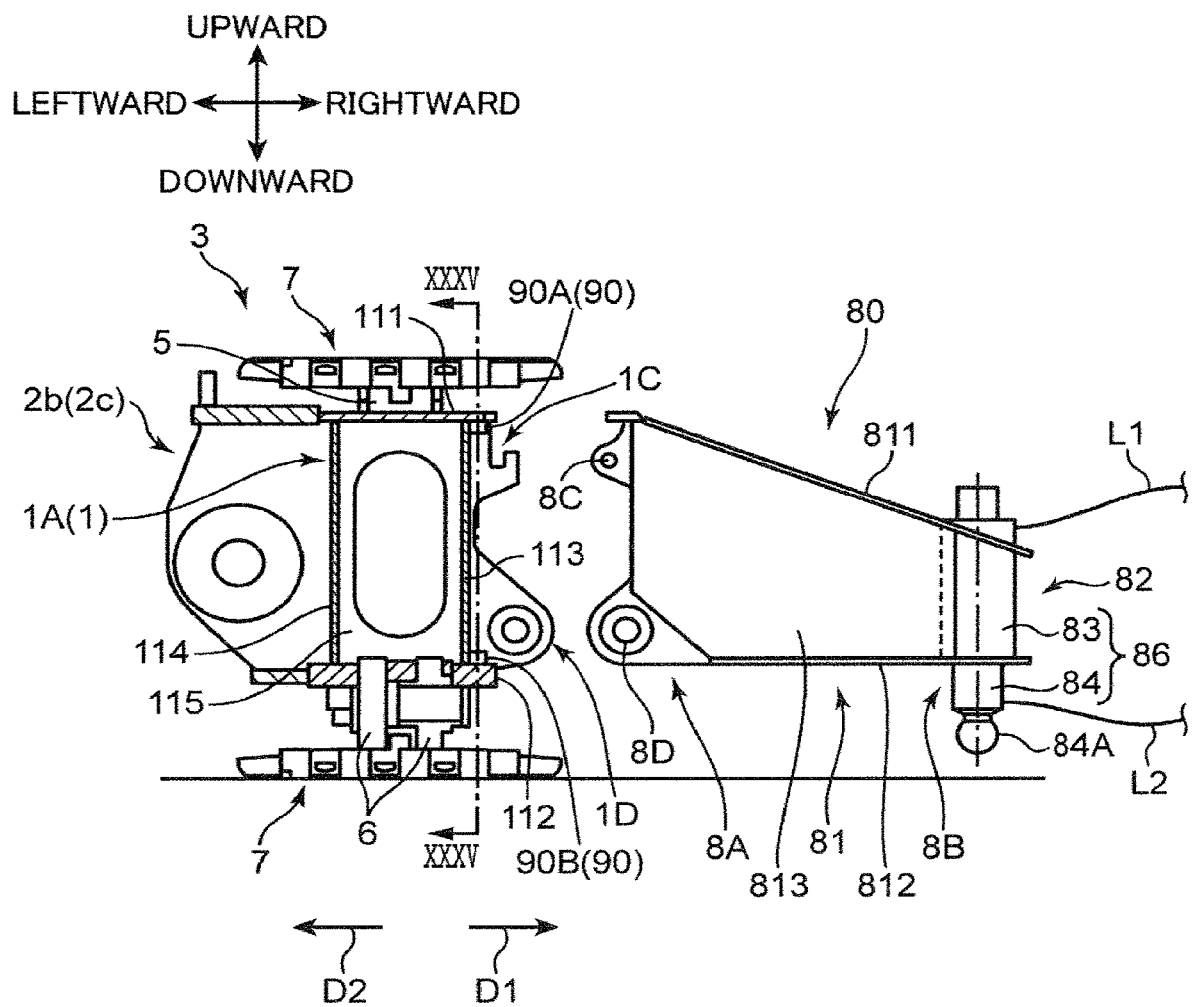
FIG. 34 is a sideview of a lower traveling body of a mobile crane according to a second modification of the second embodiment.
Figure 35:
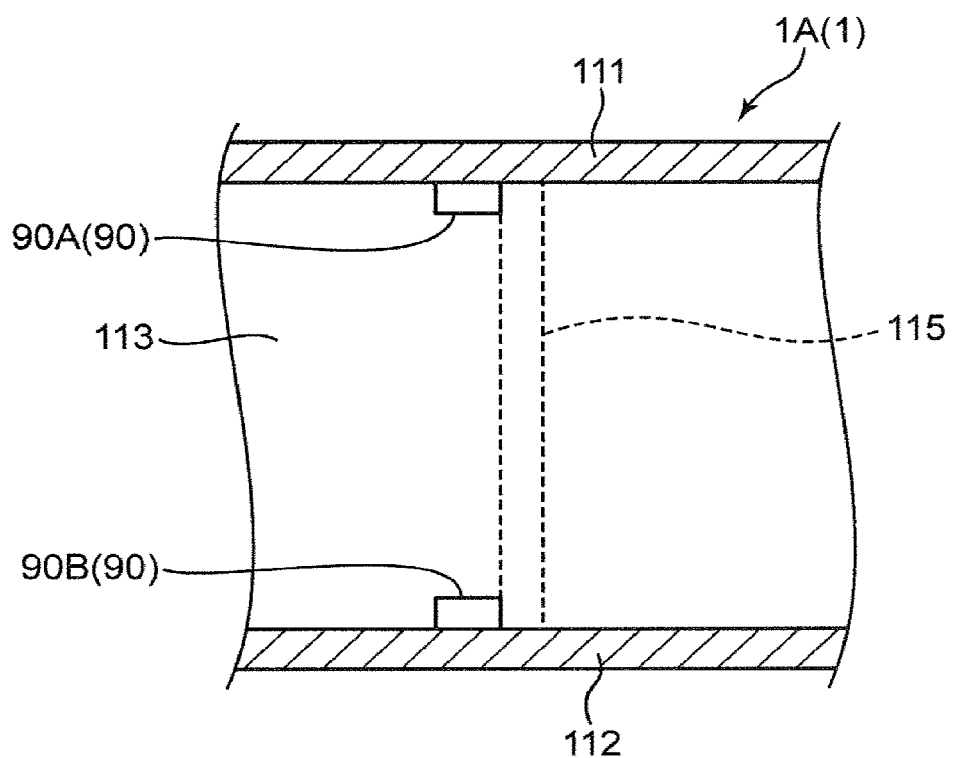
FIG. 35 is a cross-sectional view of a beam of a support member taken along the line XXXV-XXXV in FIG. 34.

Furthermore, the physical quantity detector 90 may not be necessarily provided in the support member 80, and may be provided, for example, in a specific portion of the frame main body 1A of the crawler frame 1 that is adjacent to the proximal end 8A of the beam 81 as shown in FIGS. 34 and 35. In the modifications shown in FIGS. 34 and 35, a first strain gauge 90A is provided on a top plate 111 of the frame main body 1A, and a second strain gauge 90B is provided on a bottom plate 112 of the frame main body 1A. The portions where the strain gauges 90A, 90B are provided are adjacent to an engaging portion including hooks 1C and through holes 1D as described above.

In the crane 10 according to the second embodiment, two or more support members are preferably provided to maintain the posture of the crane 10 stable when a moment in a direction of causing the crane 10 to turn over in one of the leftward and rightward directions occurs. The number of support members 80 should not be limited to those described in the embodiment.

Figure 36:
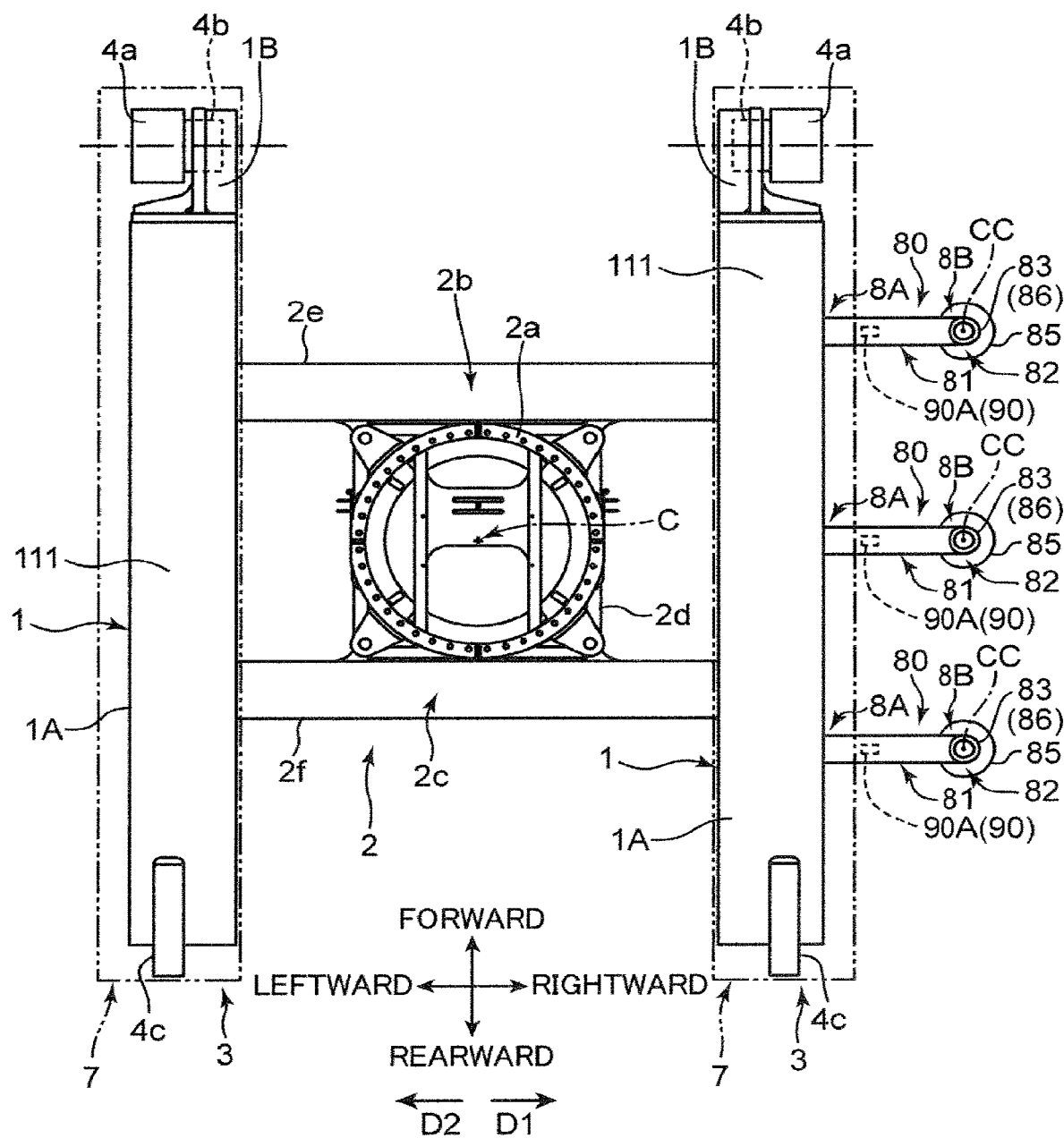
FIG. 36 is a plan view of a lower traveling body of a mobile crane according to a third modification of the second embodiment.
Figure 37:
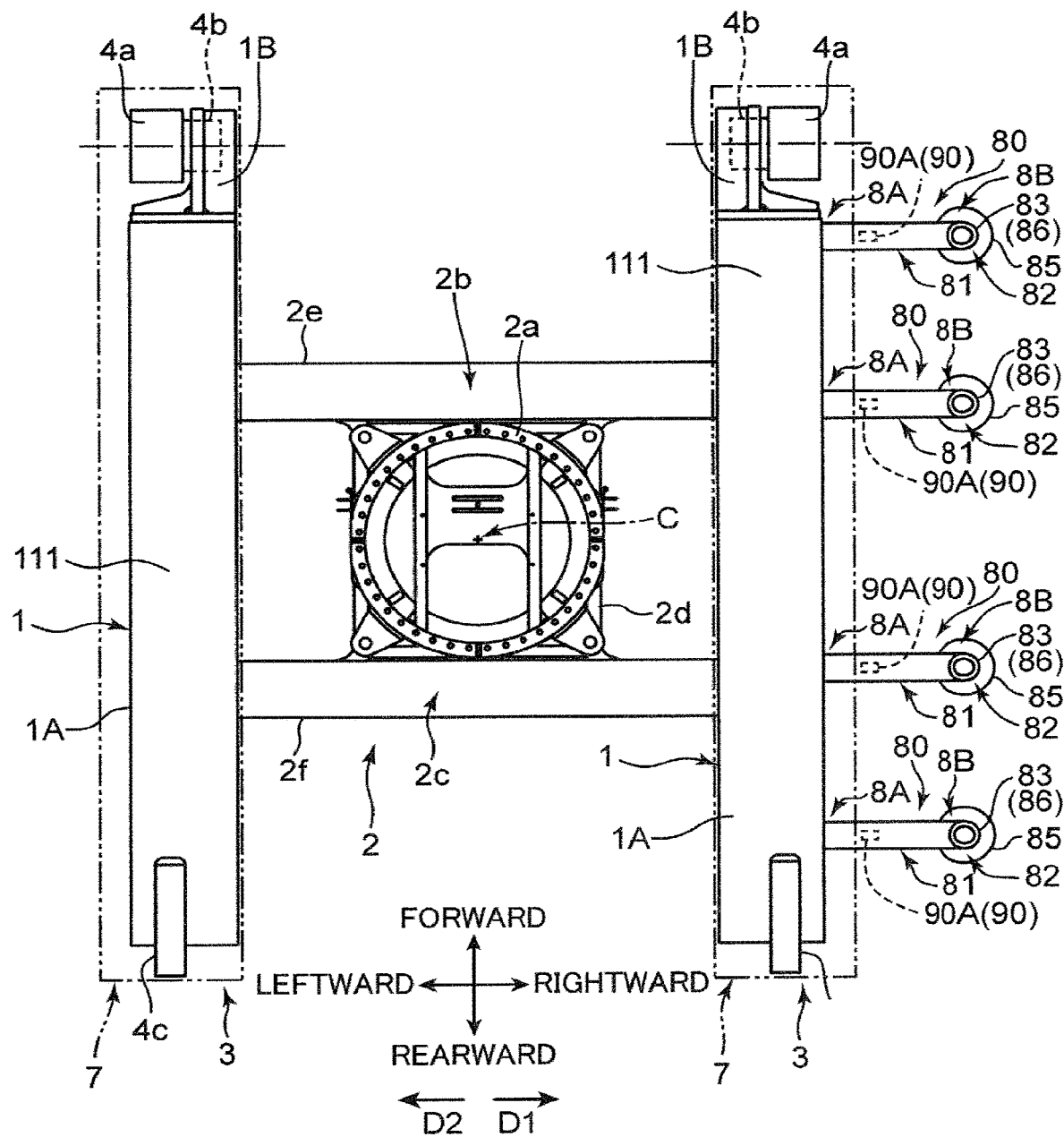
FIG. 37 is a plan view of a lower traveling body of a mobile crane according to a fourth modification of the second embodiment.

The lower traveling body 11 of the crane 10 may include three support members 80 as shown in FIG. 36, may include four support members 80 as shown in FIG. 37, or may include five or more support members 80. In any of the modifications, the support members 80 are arranged at intervals in the frame main body 1A of the crawler frame 1 in the forward and rearward directions.

Figure 38:
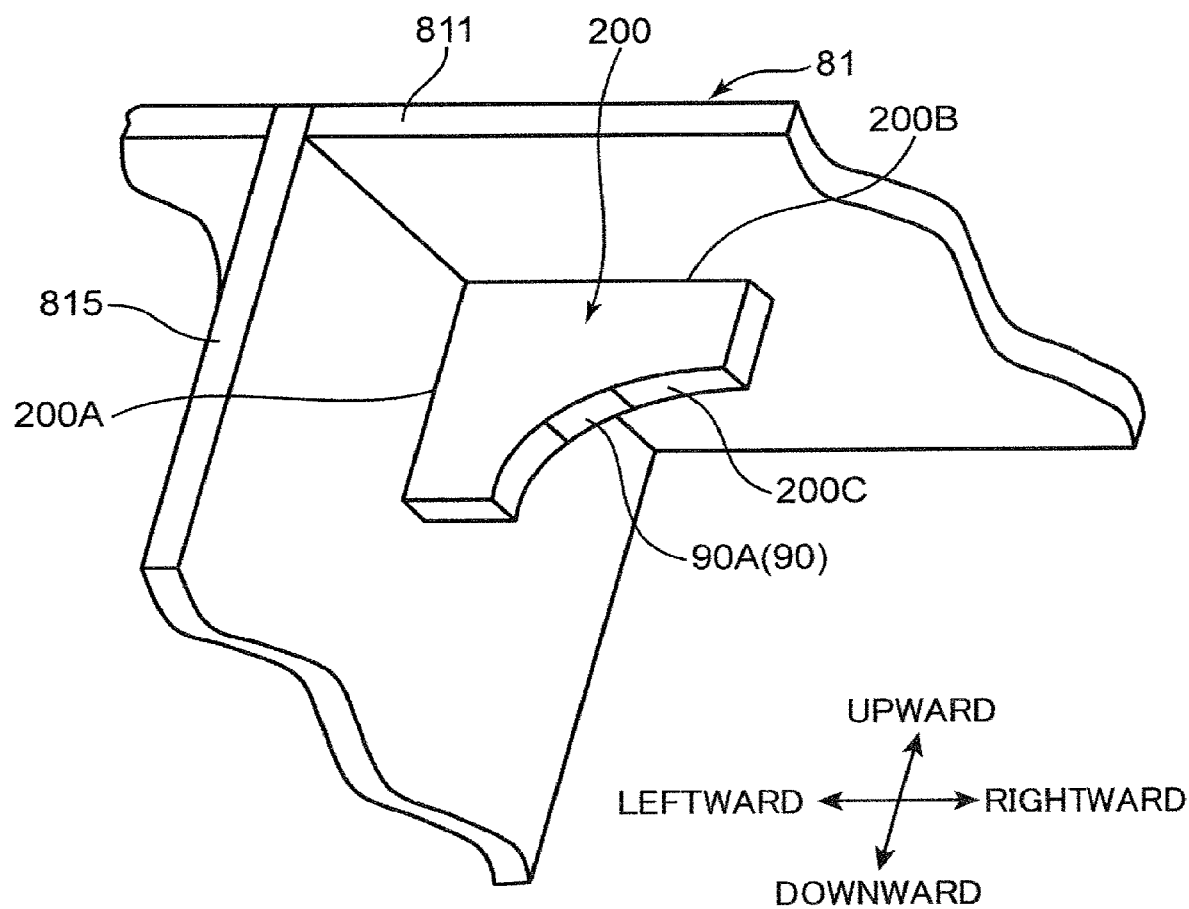
FIG. 38 is a perspective view schematically showing a fifth modification of the second embodiment.

FIG. 38 is a perspective view schematically showing a fifth modification of the second embodiment. In the fifth modification shown in FIG. 38, the beam 81 further includes a measurement support base 200 (a deformation member) to which a strain gauge (a physical quantity detector 90) is attached. The measurement support base 200 is located at such a position as to detect a strain occurring in a beam 81 in a state where a distal end 14B of a boom 14 is away leftward or rightward from the proximal end 14A of the boom 14 in the leftward and rightward directions. The measurement support base 200 is preferably arranged in this manner, and thus the location of the measurement support base 200 is not particularly limited.

Moreover, as shown in FIG. 38, the beam 81 in the fifth modification includes a reinforcing plate 815 extending in a direction perpendicularly intersecting a longitudinal direction of the beam 81 and having a surface oriented in the longitudinal direction (the leftward direction or the rightward direction). The measurement support base 200 in the fifth modification shown in FIG. 38 extends along the reinforcing plate 815 and atop plate 811. In other words, the measurement support base 200 is located at the corner between the reinforcing plate 815 and the top plate 811.

The measurement support base 200 includes a first surface 200A, a second surface 200B, and a retaining surface 200C. The first surface 200A faces the reinforcing plate 815 and attached to the reinforcing plate 815. The second surface 200B faces the top plate 811 and attached to the top plate 811. The retaining surface 200C connects an end edge of the first surface 200A and an end edge of the second surface 200B with each other, and retains the strain gauge 90A. In the detailed example shown in FIG. 38, the retaining surface 200C has a slope inclined upward as advancing rightward and retaining the strain gauge 90A thereon. In the detailed example shown in FIG. 38, the slope is formed of a curve surface (a concave) in an arc shape, but may be formed of a flat surface or a convex. Moreover, in the detailed example shown in FIG. 38, the measurement support base 200 has a substantially L-shape. However, the shape of the measurement support base 200 should not be limited to the substantially L-shape.

Another measurement support base 200 is arranged at another corner between the reinforcing plate 815 and a bottom plate 812 in addition to the measurement support base at the corner between the reinforcing plate 815 and the top plate 811 as described above. Here, a bending moment is applied to the beam 81 and a bending deformation occurs in the beam 81 when the tiltable attachment is raised and lowered. As a result, a strain occurs on the retaining surface 200C of the upper measurement support base 200 in a direction of being pulled and stretched. Similarly, a strain occurs on the retaining surface of the lower measurement base in a direction of being compressed and contracted. Under the circumstances, the strain gauge provided along each of the retaining surfaces 200C can detect the corresponding strain necessary to calculate the bending moment. In the case where the retaining surface 200C is a curve surface in an arc shape, it is possible to adjust the magnitude of the strain by changing the radius of curvature in the arc shape.

Third Embodiment

A crane 10 according to the third embodiment has a configuration equivalent to that according to the second embodiment described above with reference to FIGS. 22 to 31. The third embodiment differs from the second embodiment in that a physical quantity detector is constituted by a reaction force detector 93 in place of the strain detector 90 in the second embodiment. With this configuration in the third embodiment, the strain detector 90 shown in FIGS. 22 to 25 may be excluded.

Hereinafter, the difference of the third embodiment from the second embodiment will be mainly described.

A lower traveling body 11 of the crane 10 according to the third embodiment shown in FIG. 22 includes a pair of support members 80 (a pair of receiving members 80) in the same manner as the second embodiment. The pair of receiving members 80 includes a first support member 80 and a second support member 80 located in the rear of the first support member 80 in the same manner as the second embodiment. Each of the pair of support members 80 has a connection part connected with the crawler frame 1 in a frame unit, and a contact part being in contact with the ground. The connection part of the support member 80 is constituted by a proximal end 8A of a beam 81 to be described later, and the contact part of the support member 80 is constituted by a float 85 that is a lower end of a leg 82 to be described later.

In the third embodiment, a boom direction D1 corresponds to a first direction D1 (the rightward direction) shown in FIG. 22 in the same manner as the second embodiment. As shown in FIG. 22, the float 85 (the contact part) serves as a part (a reaction force receiving part) for receiving a reaction force from the ground at a position away from a slewing axis C in the boom direction D1. The float 85 (the contact part) is away from the proximal end 8A (the connection part) of the beam 81 in the boom direction D1.
[Physical Quantity Detector]

In the third embodiment, the physical quantity detector 93 serves as the reaction force detector 93 (FIG. 6) for detecting information necessary to safely raise and lower the boom 14 in the assembly work and the disassembly work of the crane 10. Specifically, the physical quantity detector 93 detects a physical quantity which changes in accordance with a change in a reaction force received from the ground by the support member 80. The physical quantity detector 93 is configured to detect a pressure corresponding to a moment in a direction of causing the crane 10 to turn over in one of the leftward and rightward direction. In the third embodiment, the support member 80 is arranged so that the float 85 (the contact part) that is the lower end of the leg 82 is at a position away from the proximal end 8A (the connection part) of the beam 81 in the boom direction D1 in the assembly work and the disassembly work in the same manner as the second embodiment.

Figure 39:
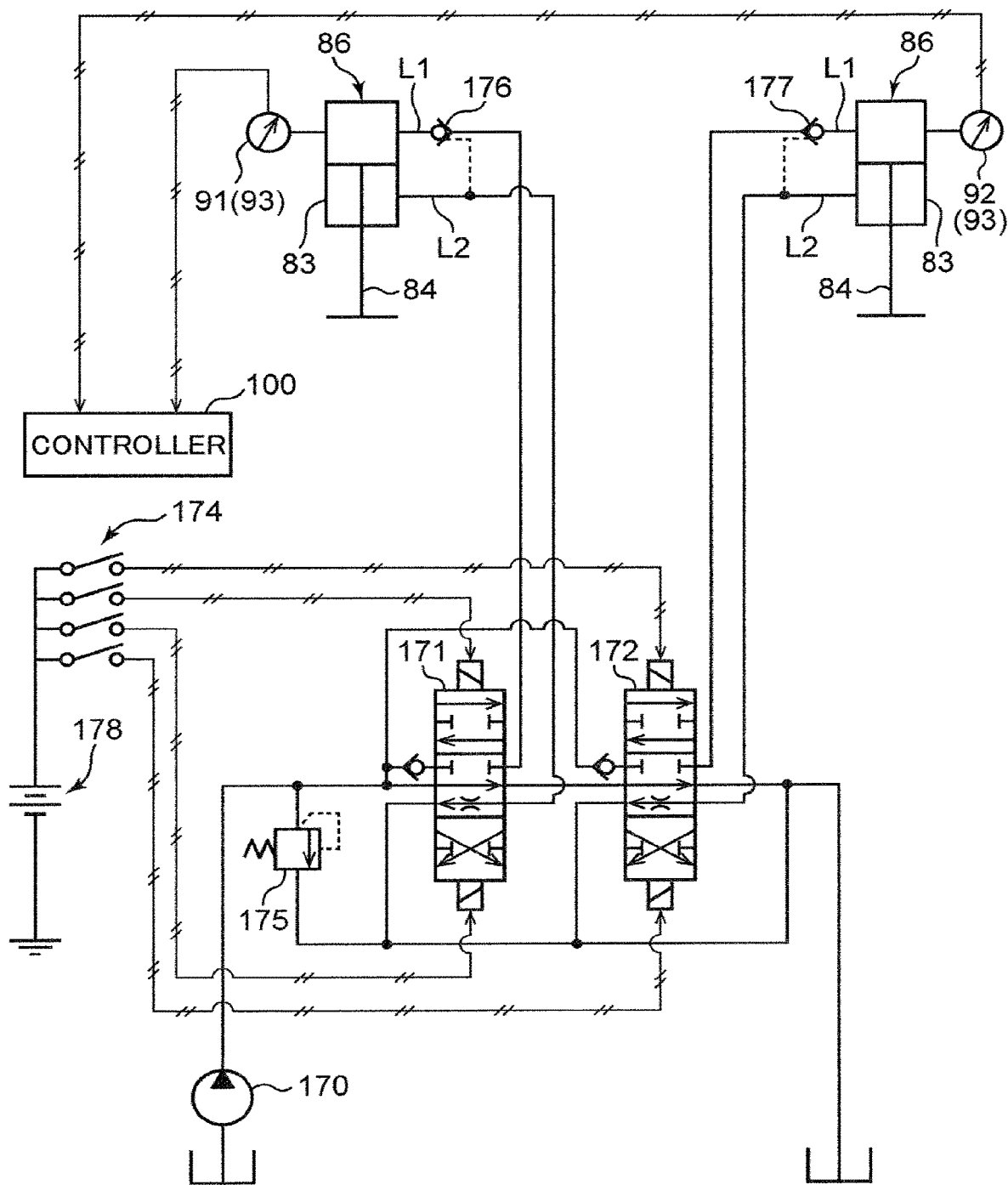
FIG. 39 shows an exemplary hydraulic circuit of the mobile crane according to the third embodiment.

FIG. 39 shows an exemplary hydraulic circuit in the crane 10. As shown in FIG. 39, the physical quantity detector 93 in the embodiment includes a first pressure sensor 91 for detecting a physical quantity which changes in accordance with a change in a reaction force received from the ground by the first support member 80, and a second pressure sensor 92 for detecting a physical quantity which changes in accordance with a reaction force received from the ground by the second support member 80. Specifically, the first pressure sensor 91 detects, as the physical quantity, a pressure on a head side of the hydraulic cylinder 86 of the first support member 80. The second pressure sensor 92 detects, as the physical quantity, a pressure on a head side of the hydraulic cylinder 86 of the second support member 80. Each of the first pressure sensor 91 and the second pressure sensor 92 may be configured to detect a pressure in a head chamber of the corresponding hydraulic cylinder 86, or may be configured to detect a pressure in a hydraulic pipe L connected with the head chamber to be described later. Hereinafter, the hydraulic circuit shown in FIG. 39 will be described.

As shown in FIG. 39, the crane 10 includes a hydraulic pump 170, a pair of control valves 171, 172, an instruction device 174, the pair of hydraulic cylinders 86, 86, and the physical quantity detector 93.

The hydraulic pump 170 discharges hydraulic fluid. The hydraulic pump 170 is driven by an unillustrated drive source (e.g., an engine).

Each of the pair of control valves 171, 172 is disposed between the hydraulic pump 170 and the corresponding hydraulic cylinder 86. A pipe leading to a tank and provided with relief valves is connected with a pipe connecting the hydraulic pump 170 and the control valves 171, 172 with each other. Each of the pair of the control valves 171, 172 is shiftable between a supply position (an upper position or a lower position in FIG. 39) for supplying the hydraulic fluid discharged from the hydraulic pump 170 to the corresponding hydraulic cylinder 86 through a hydraulic path and a suspension position (a middle position in FIG. 39) for suspending the supply of the hydraulic fluid discharged from the hydraulic pump 170 to the hydraulic cylinder 86.

The instruction device 174 instructs each of the control valves 171, 172 to shift between the supply position and the suspension position. The instruction device 174 may be configured to be operable by, for example, an operator, or may be configured to be operable in response to an instruction from a controller 100. The instruction device 174 supplies an instruction current from a power source 178 to a solenoid of the corresponding control valve in response to an operation for setting the control valve at the supply position. In this way, the control valve is shifted to the supply position.

Specifically, upon shifting of the control valve to the upper position shown in FIG. 39, the hydraulic fluid discharged from the hydraulic pump 170 flows into the head chamber of the corresponding hydraulic cylinder 86 through the hydraulic pipe L1, and the hydraulic fluid in the rod chamber of the hydraulic cylinder 86 flows out to a hydraulic pipe L2. As a result, the leg 82 of the support member 80 extends. Conversely, upon shifting of the control valve to the lower position shown in FIG. 39, the hydraulic fluid discharged from the hydraulic pump 170 flows into the rod chamber of the corresponding hydraulic cylinder 86 through the hydraulic pipe L2, and the hydraulic fluid in the head chamber of the hydraulic cylinder 86 flows out to the hydraulic pipe L1. As a result, the leg 82 of the support member 80 retracts.

The hydraulic pipe L1 connected with the head chamber of one hydraulic cylinder 86 is provided with a check valve 176. Similarly, the hydraulic pipe L1 connected with the head chamber of the other hydraulic cylinder 86 is provided with a check valve 177. Each of the check valves 176, 177 suspends the hydraulic fluid in the head chamber from flowing out in a direction of outflowing from the head chamber while the support member 80 receives a reaction force of the load applied to the ground by the crane 10. In this manner, the hydraulic cylinder 86 is prevented from retracting. In contrast, upon shifting of each of the control valves to the lower position shown in FIG. 39, each of the check valves 176, 177 permits the hydraulic fluid in the head chamber to flow out from the head chamber in a direction of outflowing from the head chamber under a pressure of the hydraulic fluid serving as a pilot pressure (a pilot source) in the hydraulic pipe L2 connected with the rod chamber. Here, each of the pair of control valves 171, 172 at the center position (a neutral position) suspends the supply of the hydraulic fluid discharged from the hydraulic pump 170 to the head chamber of the hydraulic cylinder 86. In contrast, each of the control valves at the center position (the neutral position) permits the hydraulic fluid in the hydraulic pipe L2 connected with the rod chamber to flow into the tank so as to inhibit the corresponding check valve from being in an open state under the pressure of the hydraulic fluid in the hydraulic pipe L2.

A signal representing the pressure detected by the physical quantity detector 93 is input to the controller 100 shown in FIG. 2.

[Way of Calculating Counterforce]

The reaction force received from the ground by the float 85 (the reaction force receiving part) of the support member 80 is calculated by, for example, the following Formula (5):

$$\text{reaction force } RF = \text{pressure on head side} \times Ah - \text{pressure on rod side} \times (Ah - Ar) \quad (5),$$

where "Ah" denotes a cross-sectional area (a bore cross-sectional area) of the head chamber of the hydraulic cylinder 86, "Ar" denotes a cross-sectional area of a cylinder rod of the hydraulic cylinder 86. Accordingly, the expression (Ah−Ar) in the formula represents a substantial cross-sectional area of the rod chamber.

The rod chamber of the hydraulic cylinder 86 is connected with the tank via the hydraulic pipe L2, and hence the pressure on the rod side can be regarded as indicating substantially zero. In this case, the reaction force RF may be calculated by the following Formula (6):

$$\text{reaction force RF} = \text{pressure on head side} \times Ah \quad (6)$$

As shown in FIG. 22, the lower traveling body 11 includes the pair of support members 80. Thus, a supportive reaction force RFt that represents a sum of supportive reaction forces of supporting the crane 10 is calculated by the following formula (7):

$$RFt = RF1 + RF2 \quad (7),$$

where "RF1" denotes a reaction force received from the ground by the float 85 of the first support member 80, and "RF2" denotes a reaction force received from the ground by the float 85 of the second support member 80.

[Operations]

In the third embodiment, the controller 100 stores in advance a maximal value RFmax (a maximally permissible reaction force) of the reaction force RFt received from the ground by the floats 85 (the contact parts) of the pair of support members 80 on the premise that the pair of support members 80 in the crane 10 undertakes the weight (corresponding to the turning-over moment Mt) of the crane 10.

The calculation section 101 shown in FIG. 2 calculates the supportive reaction force RFt based on the pressures detected by the physical quantity detector 93 by using Formulas (5) and (7), or Formulas (6) and (7).

The stability determination section 102 compares the supportive reaction force RFt with the maximally permissible reaction force RFmax. The stability determination section 102 determines that the supportive reaction force RFt falls within a safe range and thus the crane 10 is in a stable state when the supportive reaction force RFt is smaller than the maximally permissible reaction force RFmax (supportive reaction force RFt<maximally permissible reaction force RFmax). Conversely, the stability determination section 102 determines that the supportive reaction force RFt falls within a risky range and thus the crane 10 is in an unstable state when the supportive reaction force RFt is larger than the maximally permissible reaction force RFmax (supportive reaction force RFt>maximally permissible reaction force RFmax).

When the stability determination section 102 determines that the crane 10 is in the unstable state, the notification control section 103 outputs a notification instruction of notifying in the notification device 110 the operator of the stability information concerning the stability determined by the stability determination section 102.

The operation control section 104 outputs an operation instruction directing an operation required to avoid a decrease in the stability of the crane 10 based on the stability determined by the stability determination section 102. Specifically, the boom raising and lowering winch 30 suspends or decelerates, for example, the operation of winding the rope 38 in accordance with the operation instruction. In a case where the jib raising and lowering winch 32 is operating, the jib raising and lowering winch 32 suspends or decelerates, for example, the operation of winding (or unwinding) the rope 44 in accordance with the operation instruction.

Fourth Embodiment

Figure 40:
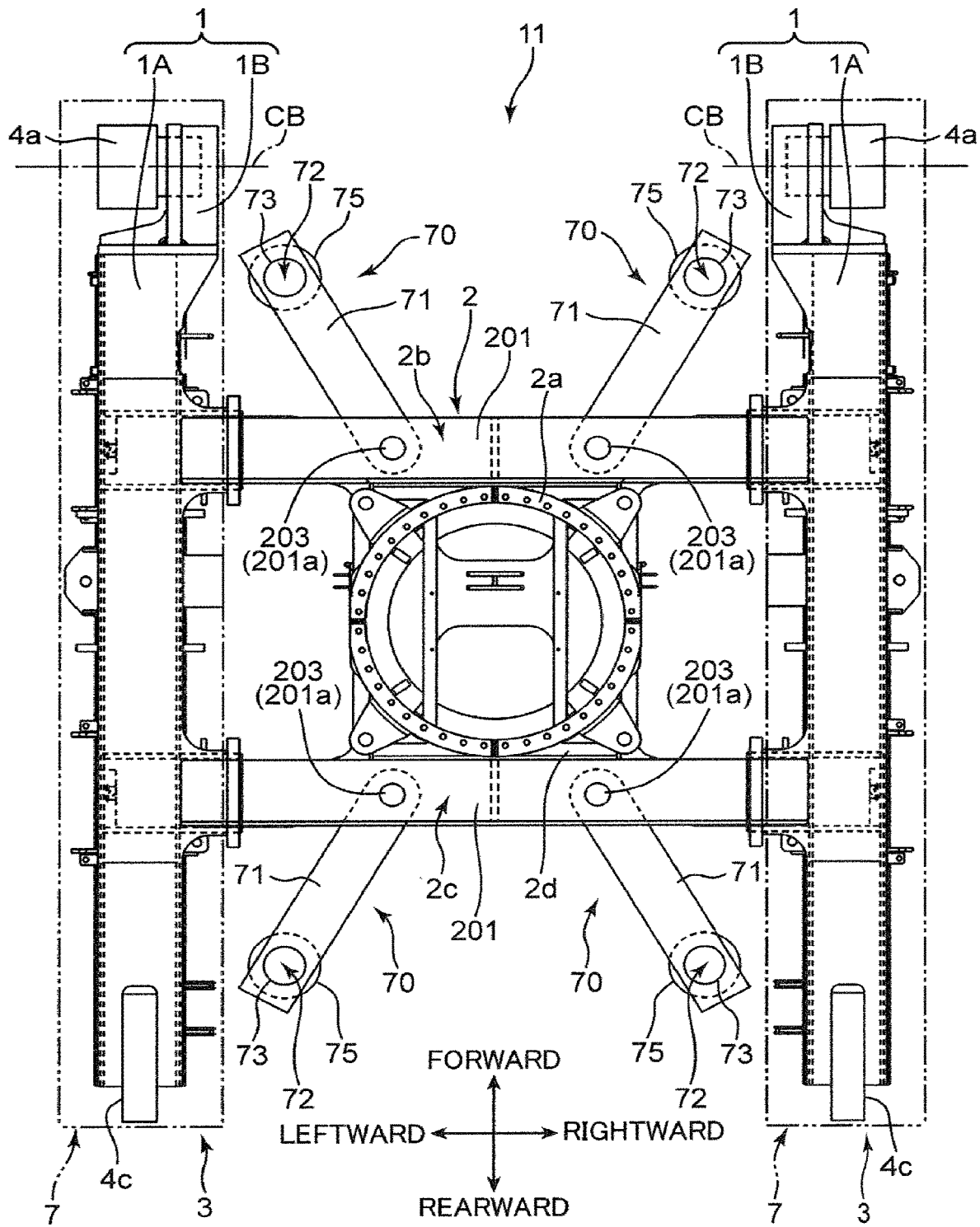
FIG. 40 is a plan view of a lower traveling body of a mobile crane according to fourth and fifth embodiments, and shows a state where a trans-lifter is engaged with an engaging portion of a frame.
Figure 41:
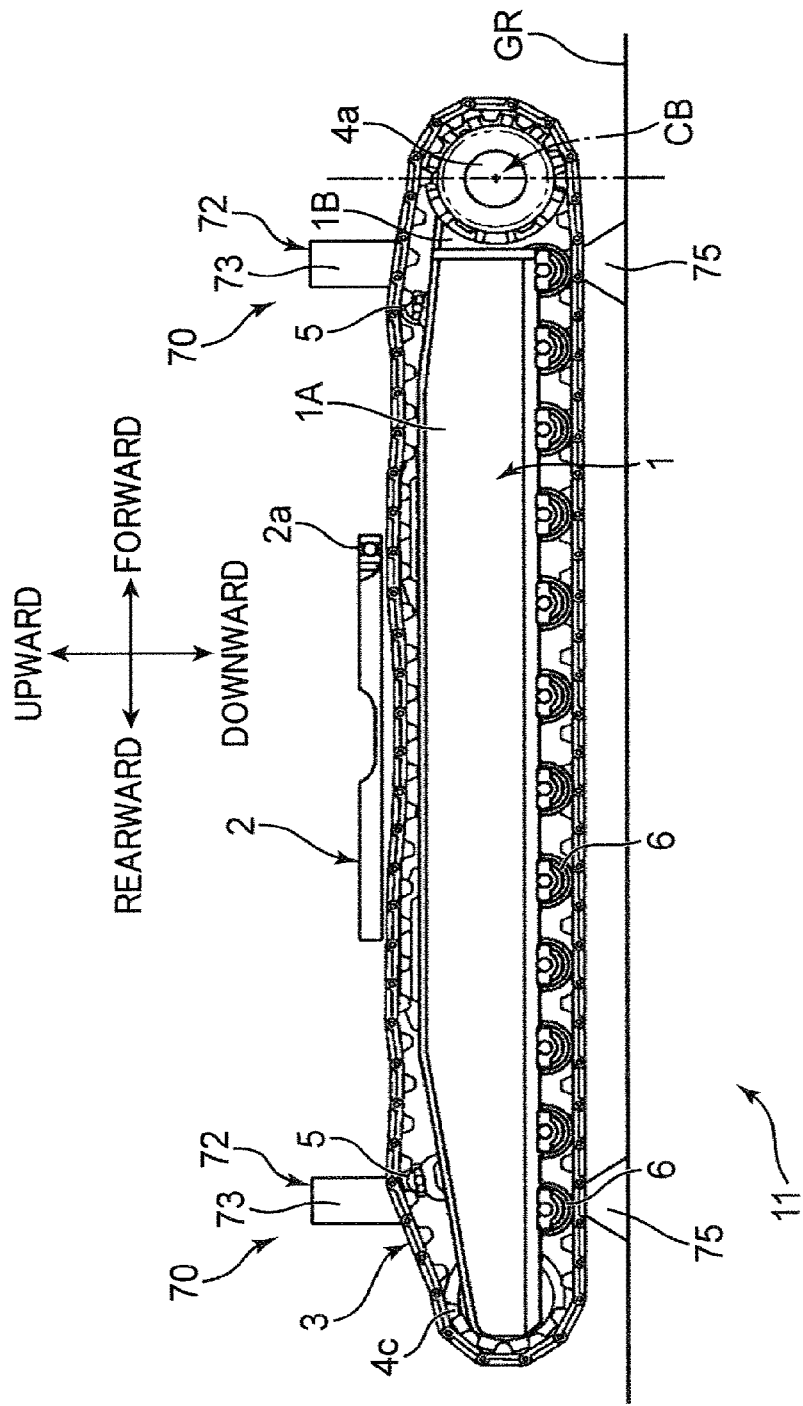
FIG. 41 is a sideview of the lower traveling body of the mobile crane in FIG. 40, and shows a state where the trans-lifter is engaged with the engaging portion of the frame.
Figure 42:
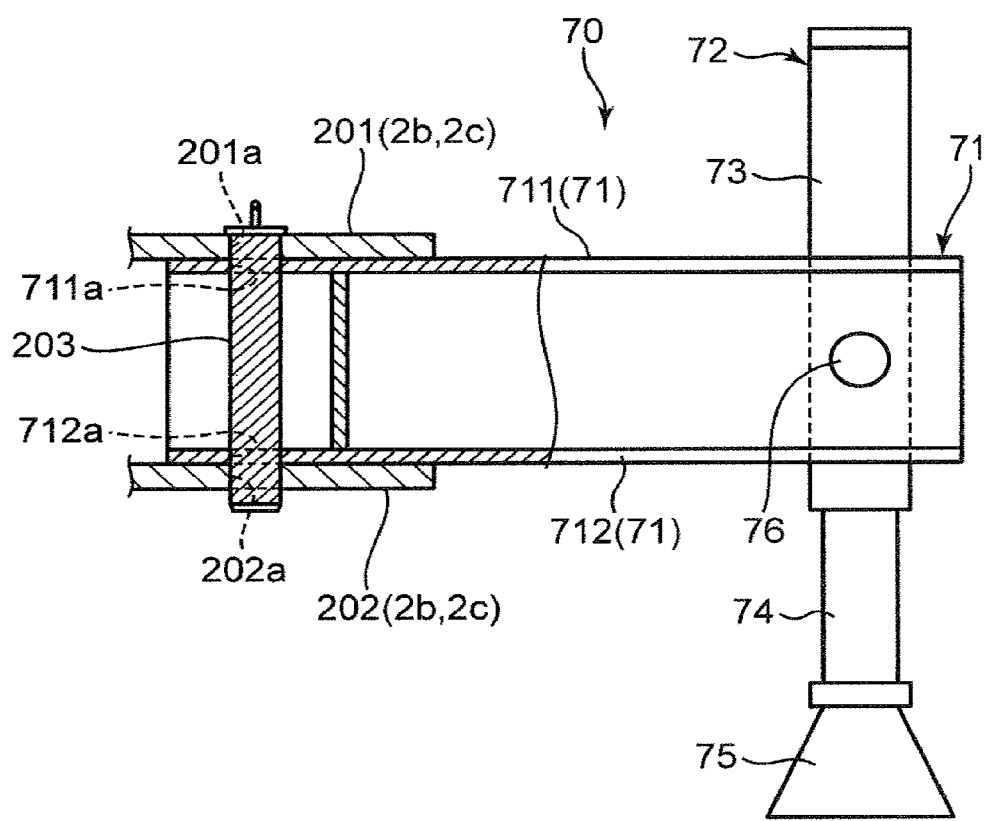
FIG. 42 is a partially broken sideview of the engaging portion of the frame of the mobile crane in FIG. 40 and the trans-lifter engaged with the engaging portion.

FIG. 40 is a plan view of a lower traveling body 11 of a mobile crane 10 according to the fourth embodiment, and shows a state where a trans-lifter is engaged with an engaging portion of a center frame 2. FIG. 41 is a sideview of the lower traveling body 11 of the crane 10 in FIG. 40, and shows a state where the trans-lifter is engaged with the engaging portion of the center frame 2. FIG. 42 is a partially broken sideview of the engaging portion of the center frame 2 of the crane 10 in FIG. 40 and the trans-lifter engaged with the engaging portion.

Figure 43:
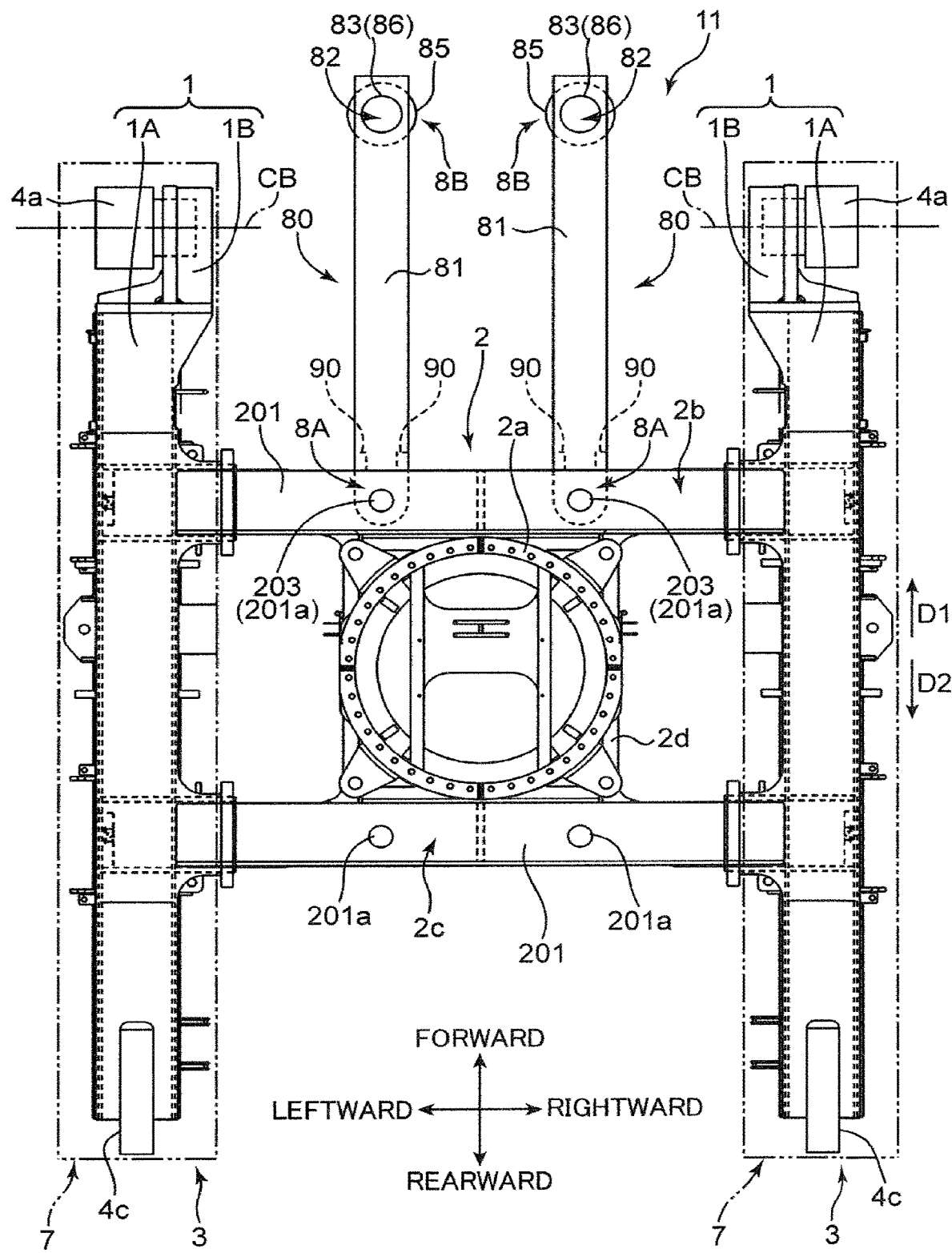
FIG. 43 is a plan view of the lower traveling body of the mobile crane in FIG. 40, and shows a state where a support member (a receiving member) is engaged with the engaging portion of the frame.
Figure 44:
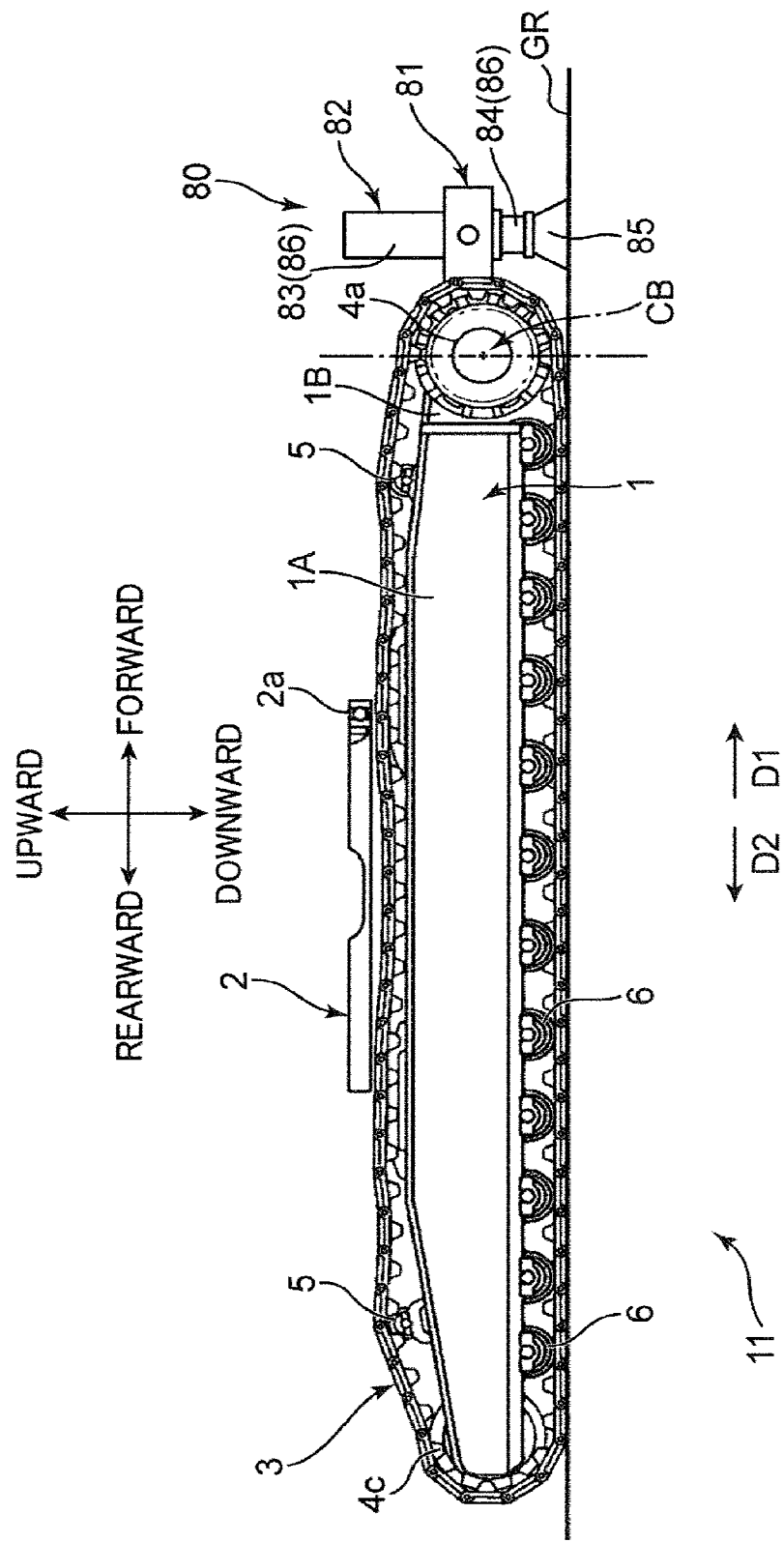
FIG. 44 is a sideview of the lower traveling body of the mobile crane in FIG. 40, and shows a state where the support member (the receiving member) is engaged with the engaging portion of the frame.
Figure 45:
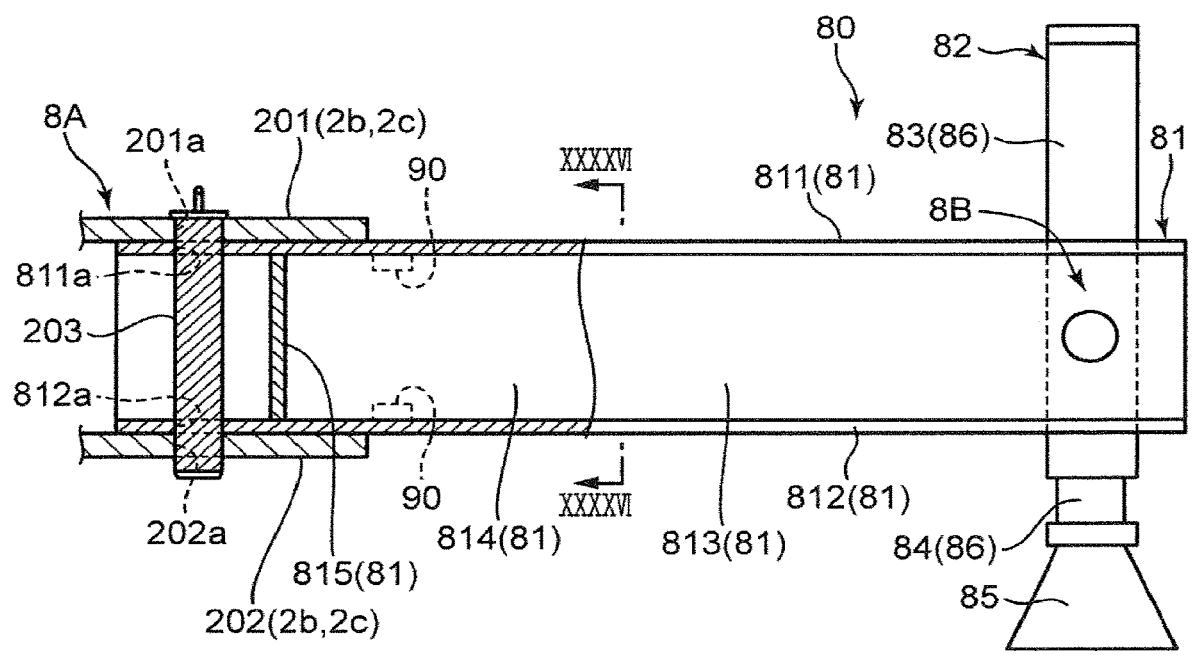
FIG. 45 is a partially broken sideview of the engaging portion of the frame of the mobile crane in FIG. 40 and the support member (the receiving member) engaged with the engaging portion.
Figure 46:
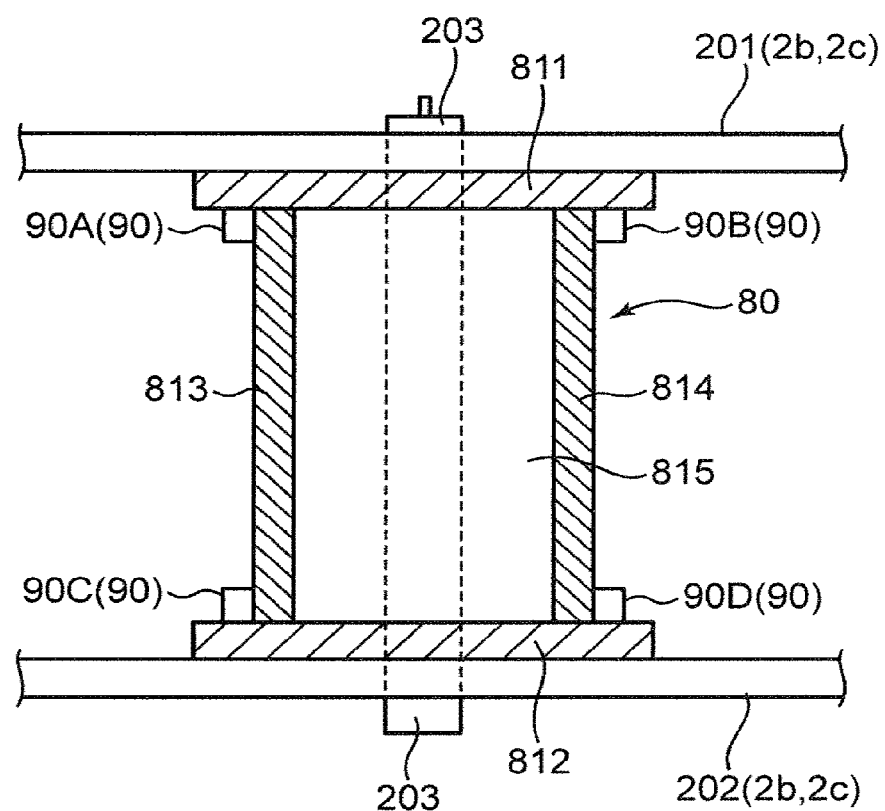
FIG. 46 is a cross-sectional view taken along the line XXXXVI-XXXXVI in FIG. 45.

FIG. 43 is a plan view of the lower traveling body 11 of the crane 10 in FIG. 40, and shows a state where a support member 80 (a receiving member 80) is engaged with the engaging portion 201a of the center frame 2. FIG. 44 is a sideview of the lower traveling body 11 of the crane 10 in FIG. 40, and shows a state where the support member 80 is engaged with the engaging portion of the center frame 2. FIG. 45 is a partially broken sideview of the engaging portion 201a of the center frame 2 of the crane 10 in FIG. 40 and the support member 80 engaged with the engaging portion 201a. FIG. 46 is a cross-sectional view taken along the line XXXXVI-XXXXVI in FIG. 45.

In the fourth embodiment shown in FIGS. 40 to 46, the lower traveling body 11 includes a plurality of trans-lifters 70, and a plurality of support members 80 (a plurality of receiving members 80). In the detailed example shown in FIG. 43, the plurality of support members 80 includes a pair of support members 80.

As shown in FIGS. 40 and 43, each of the support members 80 is configured to be replaceable with a corresponding trans-lifter 70. Specifically, the crane 10 according to the fourth embodiment is configured such that its use is changeable between a trans-lifter use that the trans-lifters 70 are attached to the center frame 2, and a support member use that the support members 80 (the receiving members 80) are attached to the center frame 2.

Each of the pair of support members 80 has a connection part connected with the center frame 2 in a frame unit, and a contact part being in contact with the ground. The connection part of the support member 80 is constituted by a proximal end 8A of a beam 81, and the contact part of the support member 80 is constituted by a float 85 that is a lower end 85 of a leg 82.

A boom direction in the fourth embodiment coincides with a horizontal component of a direction in which a boom 14 extends from an upper slewing body 12 in the assembly work and the disassembly work. In the fourth embodiment, the boom direction D1 corresponds to a first direction D1 (the forward direction) shown in FIG. 43. As shown in FIGS. 43 and 44, the float 85 (the contact part) serves as a part (a reaction force receiving part) for receiving a reaction force from the ground at a position away from a slewing axis C in the boom direction D1. The float 85 (the contact part) is away from the proximal end 8A (the connection part) of the beam 81 in the boom direction D1.

Hereinafter, the fourth embodiment will be described in detail. First, the trans-lifter use shown in FIGS. 40 to 42 will be described.

As shown in FIGS. 40 to 42, in the fourth embodiment, the crane 10 includes four trans-lifters 70. The trans-lifters 70 are aimed at lifting the center frame 2 from the ground when a pair of crawlers 3, 3 is attached to the center frame 2 and detached from the center frame 2. Two trans-lifters 70 among the four trans-lifters 70 are attached to a front axle 2b, and the remaining two trans-lifters 70 are attached to a rear axle 2c.

Each of the trans-lifters 70 includes a beam 71 and a leg 72. The beam 71 has a proximal end supported by the front axle 2b or the rear axle 2c of the frame 2. The proximal end of the beam 71 is engaged with the engaging portions 201a, 202a provided at the front axle 2b or the rear axle 2c of the frame 2.

In the embodiment, the engaging portions 201a, 202a are respectively constituted by through holes 201a, 202 formed in the front axle 2b and the rear axle 2c. Specifically, each of the axles of the frame 2 includes a top plate 201 extending in the leftward and rightward directions, a bottom plate 202 spaced downward from the top plate 201 and extending in the leftward and rightward directions. The through hole 201a is formed in the top plate 201 of the axle, and the through hole 202a is formed in the bottom plate 202 thereof. The through hole 201a and the through hole 202a are spaced apart from each other in the leftward and rightward directions.

The proximal end of the beam 71 is also formed with through holes 711a, 712a. A pin 203 is inserted in the through holes in a state where the holes face each other. Consequently, the beam 71 is attached to the frame 2.

The beam 71 of the trans-lifter 70 attached to the front axle 2b extends in a boom direction D1 that is the first direction D1 corresponding to one of the forward and rearward directions, or in a direction oblique to the boom direction D1. The beam 71 of the trans-lifter 70 attached to the rear axle 2c extends in a second direction D2 opposite to the boom direction D1 or a direction oblique to the second direction D2. Since the trans-lifters 70 are used to lift the frame 2 from the ground for the attachment or detachment of the pair of crawlers 3, 3, a distal end of the beam 71 is located between the frame 2 and a distal end of each of the crawlers 3 in the forward and rearward directions (on an inner side) as shown in FIG. 3.

The leg 72 includes a hydraulic cylinder, the hydraulic cylinder including a cylinder main body 73 supported on the distal end of the beam 71 by an attachment member 76 and extending downward from the distal end, and a rod 74 slidable along the cylinder main body 73 in the upward and downward directions.

[Support Member (Receiving Member)]

Next, the support member use will be described.

In the embodiment, the lower traveling body 11 of the crane 10 includes a first support member 80 and a second support member 80. Each of the support members 80 includes the beam 81 and the leg 82. The beam 81 has a proximal end 8A (a connection part) supported by the center frame 2 between the pair of crawlers 3, 3, and extends from the frame 2 in the boom direction D1. The beam 81 of the first support member 80 and the beam 81 of the second support member 80 are spaced apart from each other in the leftward and rightward directions.

The leg 82 is supported on the distal end 8B of the beam 81 by an attachment member 186 and extends downward from the distal end 8B. The float 85 that is the lower end 85 of the leg 82 is configured to come into contact with the ground GR at a position away from the pair of crawlers 3, 3 in the boom direction D1. The leg 82 is located at a position away from a rotational axis CB of a drive tumbler 4a in the boom direction D1. In the embodiment, the leg 82 includes a hydraulic cylinder. Specifically, the leg 82 includes a cylinder main body 83 supported on the distal end of the beam 81 and extending downward from the distal end, and a rod 84 slidable along the cylinder main body 83 in the upward and downward directions.

As shown in FIG. 46, the beam 81 of the support member 80 has a closed cross section perpendicularly intersecting a longitudinal direction of the beam 81. Specifically, the beam 81 has a top plate 811 extending in the longitudinal direction of the beam 81, a bottom plate 812 spaced downward from the top plate 811 and extending in the longitudinal direction, and a pair of side plates 813, 814 each extending in the longitudinal direction, as shown in FIGS. 45 and 46. The one side plate 813 connects right ends of the top plate 811 and the bottom plate 812 with each other, and the other side plate 814 connects right ends of the top plate 811 and the bottom plate 812 with each other.

The proximal end of the beam 81 is formed with through holes 811a, 812a serving as an engaged portion for attaching the beam 81 to the center frame 2. Specifically, the through hole 811a is formed in the proximal end of the top plate 811, and the through hole 812a is formed in the proximal end of the bottom plate 812. In a state where each of the through holes 811a, 812a and the corresponding one of the through holes 201a, 202a respectively formed in the top plate 201 and the bottom plate 202 of the front axle 2b face each other, a pin 203 is inserted in the through holes. Consequently, the beam 81 is attached to the frame 2.

As described above, in the embodiment, the support member 80 is detachably attachable to the center frame 2. The beam 81 of the support member 80 is further configured to be engageable with the engaging portions 201a, 202a in place of the trans-lifter 70 having been disengaged from the engaging portions 201a, 202a. In other words, the engaging portions of the frame 2 are available for both the attachment of the beam 71 of the trans-lifter 70 and the attachment of the beam 81 of the support member 80.

[Physical Quantity Detector]

A physical quantity detector 90 is configured to detect information necessary to safely raise and lower the boom 14 in the assembly work and the disassembly work of the crane 10. Specifically, the physical quantity detector 90 detects a strain occurring in the beam 81 of the support member 80 in the raising operation and the lowering operation. The physical quantity detector 90 is configured to detect a strain occurring in the beam 81 of the support member 80 and changing in accordance with a change in a moment in a direction of causing the crane 10 to turn over in the boom direction D1.

In the embodiment, the lower traveling body 11 of the crane 10 includes a first physical quantity detector 90 for detecting a strain occurring in the first support member 80, and a second physical quantity detector 90 for detecting a strain occurring in the second support member 80. The first physical quantity detector 90 and the second physical quantity detector 90 have the same configuration, and each of the detectors is provided at the same position in the corresponding support member 80. Therefore, one of the physical quantity detectors 90 is mainly focused below.

In the embodiment, as shown in FIGS. 43 to 45, the physical quantity detector 90 is provided in the beam 81 of the corresponding support member 80. The physical quantity detector 90 includes at least one device for detecting the strain in the beam 81 of the support member 80. Adoptable for this device is the exemplary device described in the first embodiment.

Specifically, as shown in FIGS. 43 and 45, the physical quantity detector 90 in the embodiment is provided at the proximal end of the beam 81 of the corresponding support member 80. More specifically, the physical quantity detector 90 is provided in a portion of the proximal end of the beam 81 that is adjacent to a front end of the axle 2b of the center frame 2 in the forward and rearward directions. Here, the proximal end of the beam 81 is closer to the engaging portion 201a of the center frame 2 than the longitudinal center of the beam 81. The distal end of the beam 81 is closer to the leg 82 than the longitudinal center of the beam 81 in the beam 81.

As shown in FIG. 46, the physical quantity detector 90 includes a plurality of strain gauges (four strain gauge 90A, 90B, 90C, 90D in the illustrated example). The strain gauges 90A, 90B (serving as a first device) are provided in an upper portion of the proximal end of the beam 81. The strain gauges 90C, 90D (serving as a second device) are provided in a lower portion of the proximal end of the beam 81.

More specifically, the strain gauge 90A is located in a boundary portion between the top plate 811 and the one side plate 813 of the beam 81. The strain gauge 90B is located in a boundary portion between the top plate 811 and the other side plate 814 of the beam 81. The strain gauge 90C is located in a boundary portion between the bottom plate 812 and the one side plate 813 of the beam 81. The strain gauge 90D is located in a boundary portion between the bottom plate 812 and the other side plate 814 of the beam 81. In the embodiment, each of the strain gauges is attached to an outer surface of the beam 81, but may be attached to an inner surface of the beam 81.

The physical quantity detector 90 detects a strain occurring in the beam 81 of the support member 80 in the raising operation and the lowering operation by the crane 10. A detection signal representing the strain detected as the physical quantity from the physical quantity detector 90 is input to the controller 100 shown in FIG. 2. Arithmetic processing to be executed by the controller 100 is the same as that executed in the first embodiment, and thus the description therefor is omitted.

[Assembly Work and Disassembly Work]

Next, the assembly work and the disassembly work of the crane 10 according to the fourth embodiment will be described. As shown in FIGS. 43 and 44, the fourth embodiment is equivalent to the first embodiment in that the boom direction D1 corresponds to one of the forward and rearward directions (the forward direction in the detailed example). Furthermore, the fourth embodiment is equivalent to the second embodiment in that the float 85 constituting the lower end of the beam 82 of the support member 80 serves as a reaction force receiving part, and that the physical quantity detector 90 is provided in the support member 80. From these perspectives, a basic sequence of each of the assembly work and the disassembly work in the fourth embodiment is the same as the sequence described with reference to FIGS. 8 to 13, and 26 to 31, and hence detailed description therefor is omitted.

Modifications of Fourth Embodiment

Figure 47:
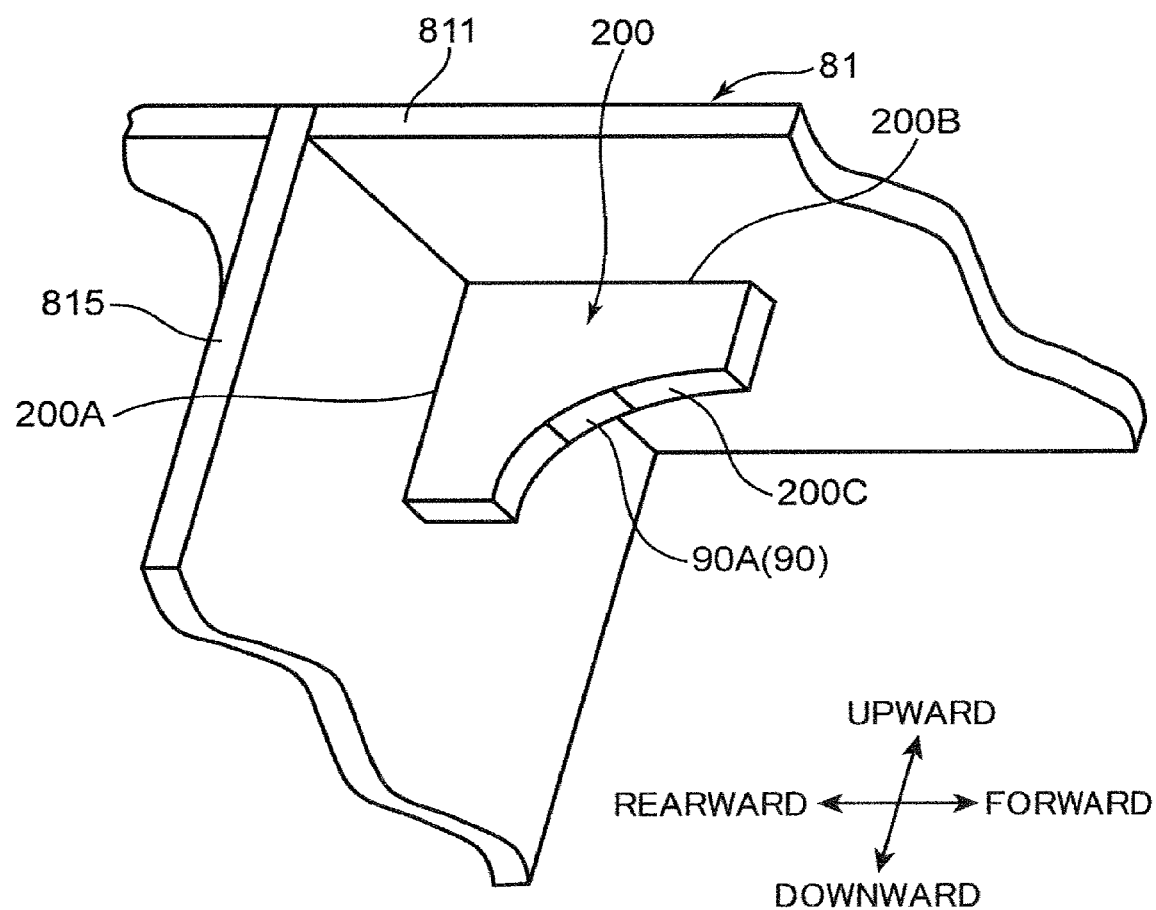
FIG. 47 is a perspective view schematically showing a modification of the fourth embodiment.

FIG. 47 is a perspective view schematically showing a modification of the fourth embodiment. In the modification shown in FIG. 47, a beam 81 further includes a measurement support base 200 (a deformation member) to which a strain gauge (a strain detector) is attached. The measurement support base 200 is located at such a position as to detect a strain occurring in the beam 81 in a state where a distal end 14B of a boom 14 is away in a boom direction D1 from a proximal end 14A of the boom 14 in the forward and rearward directions. The measurement support base 200 is preferably arranged in this manner, and thus the location of the measurement support base 200 is not particularly limited. The details of the configuration of the measurement support base 200 is the same as those in the fifth modification of the second embodiment shown in FIG. 38, and thus the detailed description therefor is omitted.

Fifth Embodiment

A crane 10 according to the fifth embodiment has a configuration equivalent to that according to the fourth embodiment described above with reference to FIGS. 43 to 47. The fifth embodiment differs from the fourth embodiment in that the physical quantity detector is constituted by a reaction force detector 93 (see FIG. 6) in place of the strain detector 90 in the fourth embodiment. With this configuration in the fifth embodiment, the strain detector 90 shown in FIGS. 43 to 47 may be excluded.

Hereinafter, the difference of the fifth embodiment from the fourth embodiment will be mainly described.

A lower traveling body 11 of the crane 10 according to the fifth embodiment shown in FIG. 43 includes a pair of support members 80 (a pair of receiving members 80) in the same manner as the fourth embodiment. The pair of receiving members 80 includes a first support member 80 and a second support member 80 located at a distance from the first support member 80 in the leftward and rightward directions in the same manner as the fourth embodiment. Each of the pair of support members 80 has a connection part connected with a center frame 2 in a frame unit, and a contact part being in contact with the ground. The connection part of the support member 80 is constituted by a proximal end 8A of a beam 81, and the contact part of the support member 80 is constituted by a float 85 that is a lower end of a leg 82.

In the fifth embodiment, a boom direction D1 corresponds to a first direction D1 (the forward direction) shown in FIG. 43 in the same manner as the fourth embodiment. As shown in FIG. 22, the float 85 (the contact part) serves as a part (a reaction force receiving part) for receiving a reaction force from the ground at a position away from a slewing axis C in the boom direction D1. The float 85 (the contact part) is away from the proximal end 8A (the connection part) of the beam 81 in the boom direction D1.

[Physical Quantity Detector]

In the fifth embodiment, the physical quantity detector 90 serves as a reaction force detector 93 (see FIG. 6) for detecting information necessary to safely raise and lower the boom 14 in the assembly work and the disassembly work of the crane 10. Specifically, the physical quantity detector 90 detects a physical quantity which changes in accordance with a change in a reaction force received from the ground by the support member 80. The physical quantity detector 93 is configured to detect a pressure corresponding to a moment in a direction of causing the crane 10 to turn over in one of the forward and rearward directions. In the fifth embodiment, the support member 80 is arranged so that the float 85 (the contact part) that is the lower end of the leg 82 is away from the proximal end 8A (the connection part) of the beam 81 in the boom direction D1 in the assembly work and the disassembly work in the same manner as the fourth embodiment.

A hydraulic circuit included in the crane 10 according to the fifth embodiment is the same as that in the crane according to the third embodiment described with reference to FIG. 39. Accordingly, the physical quantity detector 93 in the fifth embodiment includes a first pressure sensor 91 for detecting a physical quantity which changes in accordance with a change in a reaction force received from the ground by the first support member 80, and a second pressure sensor 92 for detecting a physical quantity which changes in accordance with a change in a reaction force received from the ground by the second support member 80. In the fifth embodiment, a physical quantity detected by each of the first pressure sensor 91 and the second pressure sensor 92 is a pressure on a head side of a corresponding hydraulic cylinder 86 in the same manner as the third embodiment.

A signal representing the pressure detected by the physical quantity detector 93 is input to the controller 100 shown in FIG. 2.

In the fifth embodiment, a way of calculating the reaction force is the same as the way described in the third embodiment.

Besides, in the fifth embodiment, the controller 100 stores in advance a maximal value RFmax (a maximally permissible reaction force) of the reaction force RFt received from the ground by the floats 85 (the contact parts) of the pair of support members 80 in the same manner as the third embodiment. The calculation section 101 shown in FIG. 2 calculates the supportive reaction force RFt based on the pressures detected by the physical quantity detector 93 using Formulas (5) and (7), or Formulas (6) and (7).

The stability determination section 102 compares the supportive reaction force RFt with the maximally permissible reaction force RFmax, and determines whether the crane 10 is in a stable state or an unstable state in the same manner as the third embodiment.

When the stability determination section 102 determines that the crane 10 is in the unstable state, the notification control section 103 outputs a notification instruction of notifying in the notification device 110 the operator of the stability information concerning the stability determined by the stability determination section 102.

The operation control section 104 outputs an operation instruction directing an operation required to avoid a decrease in the stability of the crane 10 based on the stability determined by the stability determination section 102 in the same manner as the third embodiment.

Sixth Embodiment

Figure 48:
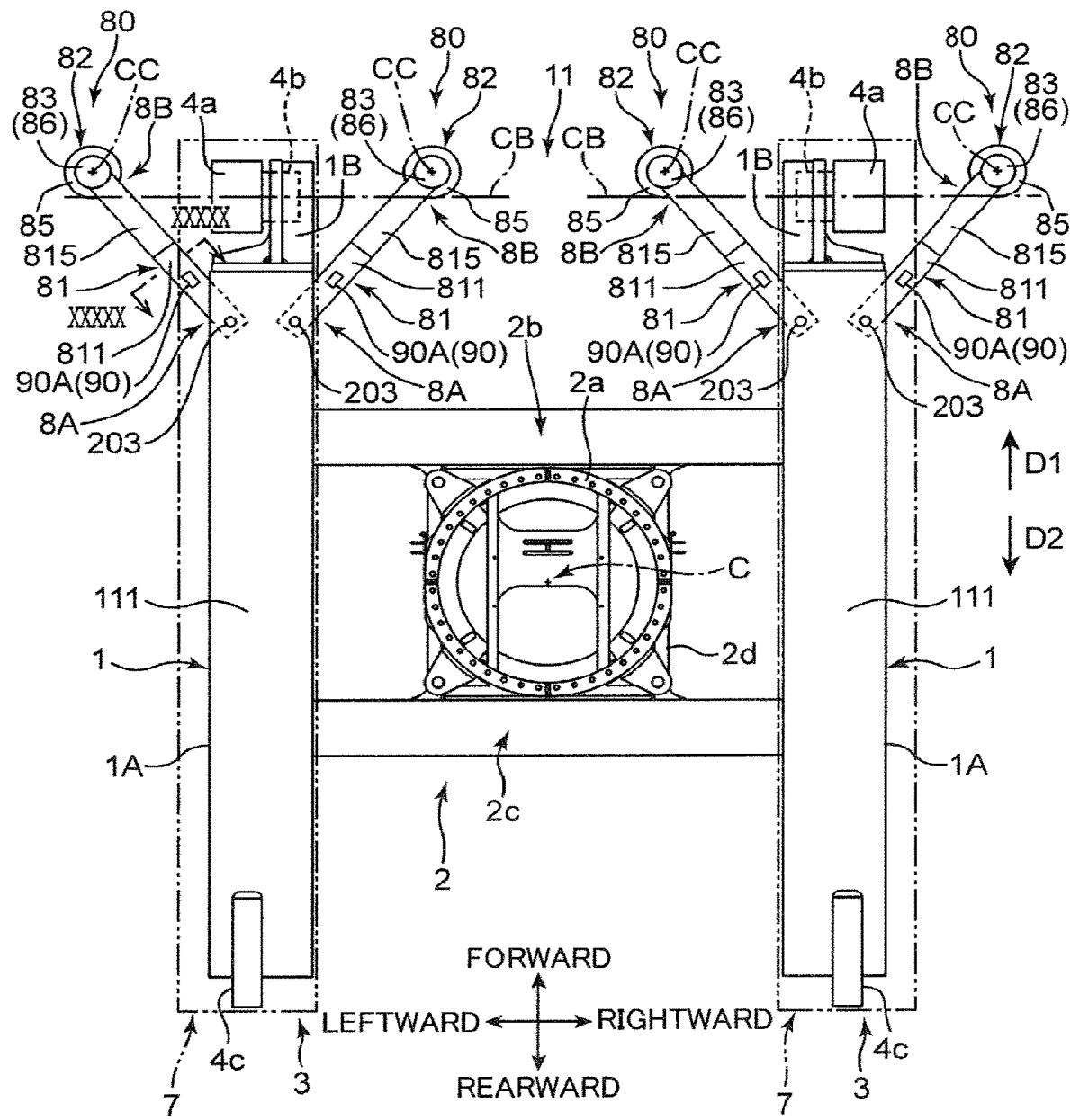
FIG. 48 is a plan view of a lower traveling body of a mobile crane according to sixth and seventh embodiments.
Figure 49:
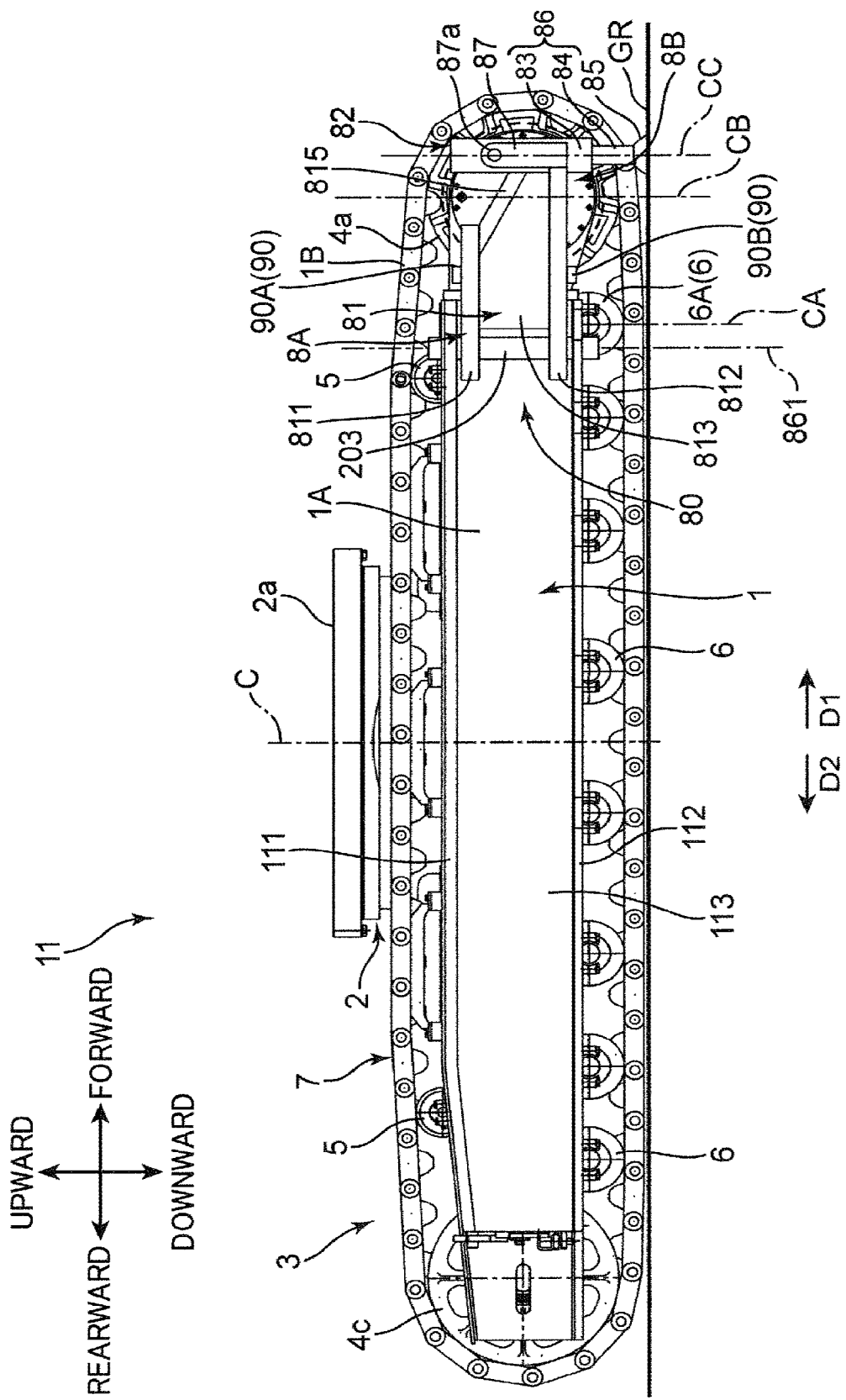
FIG. 49 is a sideview of the lower traveling body of the mobile crane in FIG. 48.
Figure 50:
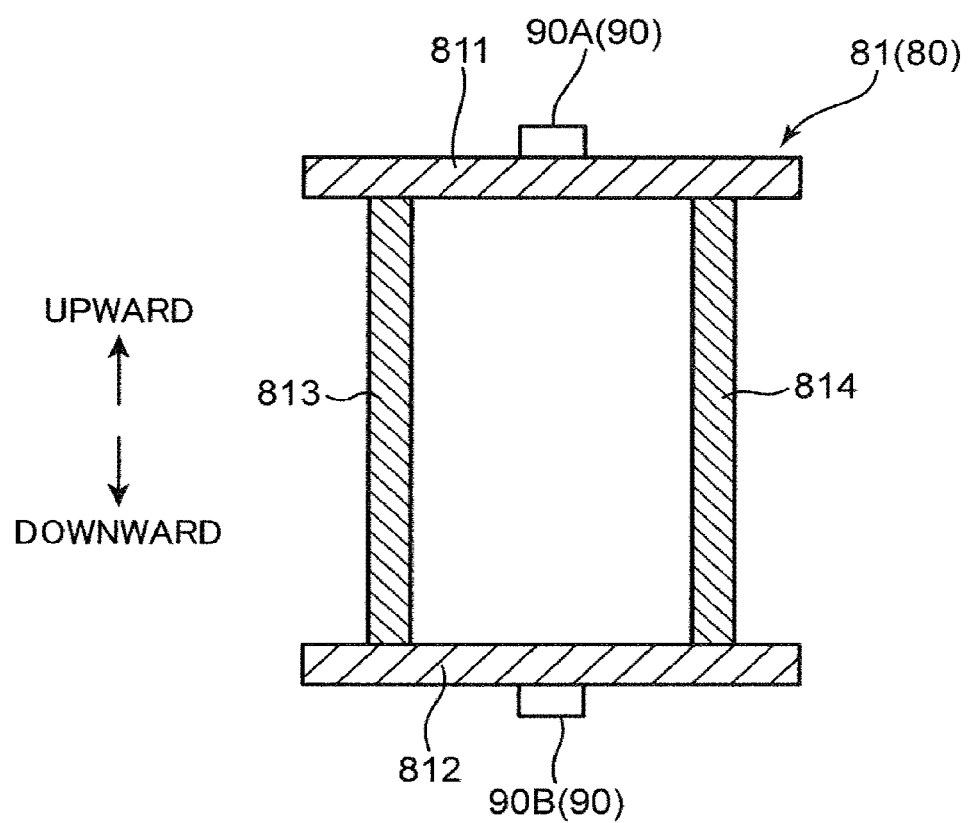
FIG. 50 is a cross-sectional view of a beam of a support member (a receiving member), taken along the line XXXXX-XXXXX in FIG. 48, in a crawler of the lower traveling body in FIG. 48.

FIG. 48 is a plan view of a lower traveling body 11 of a mobile crane 10 according to the sixth embodiment. FIG. 49 is a sideview of the lower traveling body 11 of the crane 10 in FIG. 48. FIG. 50 is across-sectional view of abeam 81 of a support member 80, taken along the line XXXXX-XXXXX in FIG. 48, in a crawler 3 of the lower traveling body 11 in FIG. 48.

In the sixth embodiment shown in FIGS. 48 to 50, the lower traveling body 11 has a plurality of support members 80 (a plurality of receiving members 80). In the detailed example shown in FIG. 48, the plurality of support members 80 includes a first right support member 80 (a first right receiving member 80), a first left support member 80 (a first left receiving member 80), a second right support member 80 (a second right receiving member 80), and a second left support member 80 (a second left receiving member 80). The first right support member 80 and the first left support member 80 are attached to a first crawler frame 1 that is the crawler frame 1 of the first crawler 3. The second right support member 80 and the second left support member 80 are attached to a second crawler frame 1 that is the crawler frame 1 of the second crawler 3.

Each of the support members 80 has a connection part connected with the crawler frame 1 in a frame unit, and a contact part being in contact with the ground. The connection part of the support member 80 is constituted by a proximal end 8A of the beam 81, and the contact part of the support member 80 is constituted by a float 85 that is a lower end 85 of a leg 82.

A boom direction in the sixth embodiment coincides with a horizontal component of a direction in which a boom 14 extends from an upper slewing body 12 in the assembly work and the disassembly work. In the sixth embodiment, the boom direction D1 corresponds to a first direction D1 (the forward direction) shown in FIG. 48. As shown in FIG. 48, the float 85 (the contact part) serves as a part (a reaction force receiving part) for receiving a reaction force from the ground at a position away from a slewing axis C in the boom direction D1. The float 85 (the contact part) is away from the proximal end 8A (the connection part) of the beam 81 in the boom direction D1.

As shown in FIG. 48, the first right support member 80 is arranged so that the float 85 (the contact part) of the first right support member 80 is away rightward from the first crawler frame 1 and is away from the proximal end 8A (the connection part) of the beam 81 of the first right support member 80 in the boom direction D1.

The first left support member 80 is arranged so that the float 85 (the contact part) of the first left support member 80 is away leftward from the first crawler frame 1, and is away from the proximal end 8A (the connection part) of the beam 81 of the first left support member 80 in the boom direction D1.

The second right support member 80 is arranged so that the float 85 (the contact part) of the second right support member 80 is away rightward from the second crawler frame 1, and is away from the proximal end 8A (the connection part) of the beam 81 of the second right support member 80 in the boom direction D1.

The second left support member 80 is arranged so that the float 85 (the contact part) of the second left support member 80 is away leftward from the second crawler frame 1, and is away from the proximal end 8A (the connection part) of the beam 81 of the second left support member 80 in the boom direction D1.

Hereinafter, the sixth embodiment will be described in detail. As shown in FIGS. 48 and 49, the crawler frame 1 includes a frame main body 1A and a tumbler bracket 1B. The frame main body 1A has a shape extending in the forward and rearward directions. The frame main body 1A includes a top plate 111 extending in a longitudinal direction of the frame main body 1A, a bottom plate 112 spaced downward from the top plate 111 and extending in the longitudinal direction, and a side plate 113 connecting the top plate 11 and the bottom plate 112 with each other.

[Support Member (Receiving Member)]

As shown in FIGS. 48 and 49, each of the support members 80 includes the beam 81 and the leg 82. The beam 81 includes the proximal end RA supported by the crawler frame 1, and a distal end 8B away in the boom direction D1 from the proximal end 8A in the forward and rearward directions. In the embodiment, the beam 81 linearly extends in a plan view shown in FIG. 48.

The proximal end 8A of the beam 81 is attached to the crawler frame 1, and the beam 81 extends in a direction oblique to the boom direction D1. Specifically, the proximal end 8A of the beam 81 is attached to a portion of the frame main body 1A of the crawler frame 1 away from a front axle 2b in the boom direction D1.

Specifically, the proximal end 8A of the beam 81 of the right support member 80 is attached to a right portion of the frame main body 1A of the crawler frame 1, and the beam 81 extends from the right portion in a direction obliquely rightward to the boom direction D1 (extends diagonally forward to the right). The proximal end 8A of the beam 81 of the left support member 80 is attached to a left portion of the frame main body 1A of the crawler frame 1, and the beam 81 extends from the left portion in a direction obliquely leftward to the boom direction D1 (extends diagonally forward to the left).

The leg 82 is supported on the distal end 8B of the beam 81 and extends downward from the distal end 8B so that the lower end 85 comes into contact with the ground. In the embodiment, the leg 82 includes a hydraulic cylinder. Specifically, the leg 82 includes a cylinder main body 83 supported on the distal end 8B of the beam 81 and extending downward from the distal end 8B, and a rod 84 slidable along the cylinder main body 83 in the upward and downward directions.

The leg 82 of the support member 80 is located at a position away from a rotational axis CB of a drive tumbler 4a in the first direction D1. Here, the arrangement that "the leg 82 is located at a position away from a rotational axis CB of a drive tumbler 4a (a first wheel) in the first direction D1" means that a central axis CC of the leg 82 is away in the boom direction D1 from the rotational axis CB of the drive tumbler 4a (the first wheel). In the embodiment, the central axis CC of the leg 82 serves as a central axis CC of the hydraulic cylinder (i.e., the central axis CC of the rod 84) extending in the upward and downward directions.

The leg 82 of the right support member 80 (specifically, the central axis CC of the leg 82) is located on the right of the crawler frame 1, and the leg 82 of the left support member 80 (specifically, the central axis CC of the leg 82) is located on the left of the crawler frame 1.

FIG. 50 is a cross-sectional view of the beam 81 of the support member 80, taken along the line XXXXX-XXXXX in FIG. 48, in the crawler 3 of the lower traveling body 11 in FIG. 48. As shown in FIG. 50, the beam 81 of the support member has a closed cross section perpendicularly intersecting the longitudinal direction of the beam 81. The beam 81 has a top plate 811 extending in the longitudinal direction of the beam 81, a bottom plate 812 spaced downward from the top plate 811 and extending in the longitudinal direction, and a pair of side plates 813, 814 each extending in the longitudinal direction, as shown in FIGS. 48 to 50. The one side plate 813 connects right ends of the top plate 811 and the bottom plate 812 with each other, and the other side plate 814 connects right ends of the top plate 811 and the bottom plate 812 with each other. Specifically, the beam 81 further includes a second top plate 815. The second top plate 815 lies between the top plate 811 and the leg 82, and connects the top plate 811 and the leg 82 with each other. The second top plate 815 is inclined downward as advancing to the distal end 8B of the beam 81.

The proximal end 8A of the beam 81 is formed with an engaged portion for attaching the beam 81 to the crawler frame 1. In the embodiment, the engaged portion includes a through hole 811a formed in the proximal end of the top plate 811, and a through hole 812a formed in the proximal end of the bottom plate 812. In contrast, the frame main body 1A of the crawler frame 1 is provided with an engaging portion. The engaging portion includes a through hole 111a formed in the top plate 111 of the frame main body 1A, and a through hole 112a formed in the bottom plate 112. In a state where each of the through holes 811a, 812a constituting the engaged portion and the corresponding one of the through holes 111a, 112a constituting the engaging portion face each other, a pin 203 extending in the upward and downward directions is inserted in the through holes. Consequently, the beam 81 is attached to the crawler frame 1 rotatably about the pin 203.

In the embodiment, each of the support members 80 is configured to be detachably attachable to the crawler frame 1. Specifically, the support member 80 is detachable from the crawler frame 1 by removing the pin 203 from the through holes.

Figure 51:
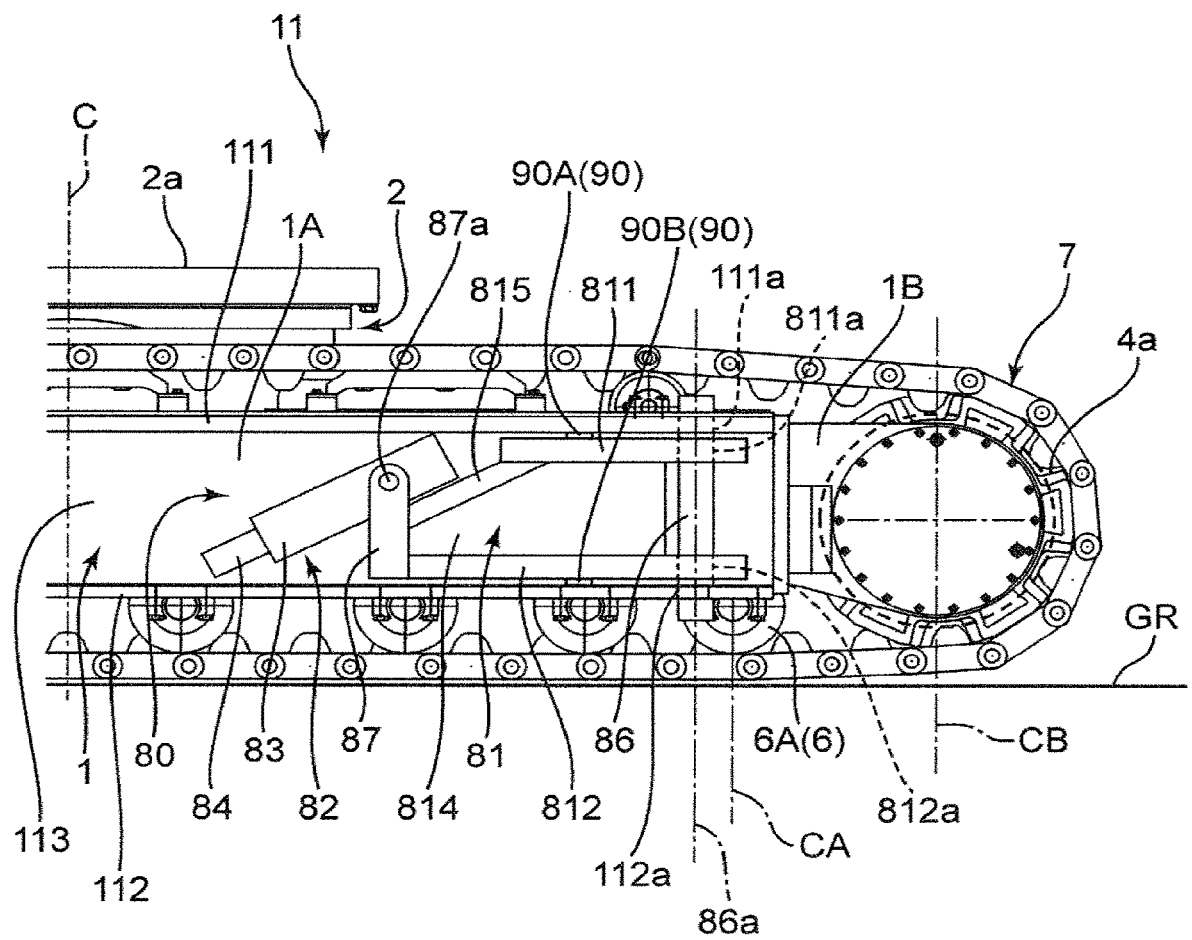
FIG. 51 is a sideview of a front portion of the lower traveling body of the mobile crane in FIG. 48.
Figure 52:
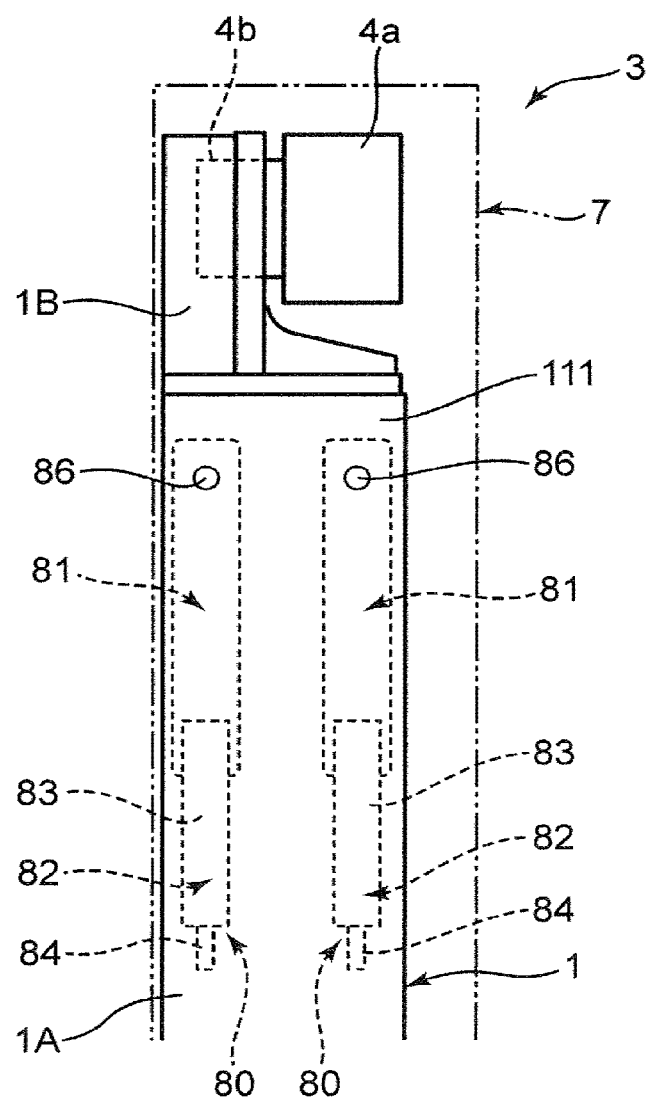
FIG. 52 is a plan view of the front portion of the lower traveling body of the mobile crane in FIG. 48.

FIG. 51 is a sideview of a front portion of the lower traveling body 11 of the mobile crane 10 in FIG. 48. FIG. 52 is a plan view of the front portion of the lower traveling body 11 of the crane 10 in FIG. 48. Each of FIGS. 51 and 52 shows a state of the support member 80 which is not in use.

In the embodiment, the support member 80 is arranged to extend diagonally forward from the frame main body 1A of the crawler frame 1 in use of the support member 80 in the assembly work and the disassembly work of the crane 10 as shown in FIGS. 48 and 49. Conversely, in no use of the support member 80, the support member 80 is accommodatable in an accommodation space provided in the frame main body 1A of the crawler frame 1 as shown in FIGS. 51 and 52.

Specifically, in the embodiment, the accommodation space is in the form of a recess defined by the top plate 811, the bottom plate 112, and the side plate 113. The leg 82 is coupled to the distal end 8B of the beam 81 via a coupling member 87. The coupling member 87 has a pin 87a. The leg 82 is attached to the coupling member 87 rotatably about the pin 87a. The lower end 85 of the leg 82 is detached from the rod 84, and the beam 81 is rotated about a pin 86A while the leg 82 is rotated about the pin 87a for accommodating the support member 80. Consequently, the beam 81 and the leg 82 are accommodated in the accommodation space.

[Physical Quantity Detector]

A physical quantity detector 90 is configured to detect information necessary to safely raise and lower the boom 14 in the assembly work and the disassembly work of the crane 10. Specifically, the physical quantity detector 90 detects a strain occurring in the beam 81 of the support member 80. The physical quantity detector 90 is configured to detect a strain occurring in the beam 81 of the support member 80 and corresponding to a moment in a direction of causing the crane 10 to turn over in the boom direction D1.

In the embodiment, the crane 10 includes a plurality of physical quantity detectors 90. Specifically, the crane 10 includes four physical quantity detectors 90 respectively provided in four support members 80. With this configuration, a strain occurring in the beam 81 of each of the support members 80 is detectable. In the embodiment, the four physical quantity detectors 90 have the same configuration, and each of the detectors is provided at the same position in the corresponding crawler frame 1 as shown in FIG. 3. Therefore, one of the physical quantity detectors 90 is mainly focused below.

In the embodiment, the physical quantity detector 90 is configured to detect a strain occurring in a portion of the beam 81 of the support member 80 between the proximal end 8A of the beam 81 supported by the crawler frame 1 and a longitudinal center of the beam 81. However, the physical quantity detector 90 may be configured to detect a strain occurring in a portion of the beam 81 of the support member 80 between the distal end 8B supporting the leg 82 and the longitudinal center of the beam 81, or may be configured to detect a strain occurring at the longitudinal center of the beam 81.

The physical quantity detector 90 is preferably arranged in a portion of the beam 81 where a strain is likely to occur.

In the arrangement, a strain caused in the beam 81 by the moment is sensitively detectable. Such a portion where the strain is likely to occur may be, for example, a connection portion between the beam 81 and the crawler frame 1 or an adjacent portion that is adjacent to the connection portion, or a connection portion between the beam 81 and the leg 82 or an adjacent portion that is adjacent to the connection portion.

The physical quantity detector 90 includes one or more devices for detecting the strain in the beam 81. Adoptable for this device is the exemplary device described in the first embodiment.

As shown in FIG. 50, the physical quantity detector 90 in the embodiment includes a plurality of strain gauges (a first strain gauge 90A and a second strain gauge 90B in the illustrated example). The first strain gauge 90A is provided on the top plate 811 defining an upper portion of the beam 81, and the second strain gauge 90B is provided on the bottom plate 812 defining a lower portion of the beam 81. The strain gauge 90A can detect a strain occurring in the upper portion of the beam 81, and the strain gauge 90B can detect a strain occurring in the lower portion of the beam 81.

In the embodiment, the first strain gauge 90A is located at the width-center of the top plate 811 of the beam 81, but the location should not be limited thereto, and may be at a position away in an either width direction from the width-center. Similarly, the second strain gauge 90B is located at the width-center of the bottom plate 812 of the beam 81, but the location should not be limited thereto, and may be at a position away in an either width direction from the width-center. In the embodiment, each of the strain gauges is attached to an outer surface of the beam 81, but may be attached to an inner surface of the beam 81.

The physical quantity detector 90 detects a strain occurring in the beam 81 of the support member 80 in the raising operation and the lowering operation by the crane 10. A detection signal representing the strain and detected by the physical quantity detector 90 is input to the controller 100 shown in FIG. 2. Arithmetic processing to be executed by the controller 100 is the same as that executed in the first embodiment, and thus the description therefor is omitted.

[Assembly Work and Disassembly Work]

Next, the assembly work and the disassembly work of the crane 10 according to the sixth embodiment will be described. As shown in FIGS. 48 and 49, the sixth embodiment is equivalent to the first embodiment in that the boom direction D1 corresponds to one of the forward and rearward directions (the forward direction in the detailed example). Furthermore, the sixth embodiment is equivalent to the second and the fourth embodiments in that the float 85 constituting the lower end of the beam 82 of the support member 80 serves as a reaction force receiving part, and that the physical quantity detector 90 is provided in the support member 80. From these perspectives, a basic sequence of each of the assembly work and the disassembly work in the sixth embodiment is the same as the sequence described with reference to FIGS. 8 to 13 and 26 to 31, and hence detailed description therefor is omitted.

Modifications of Sixth Embodiment

Figure 53:
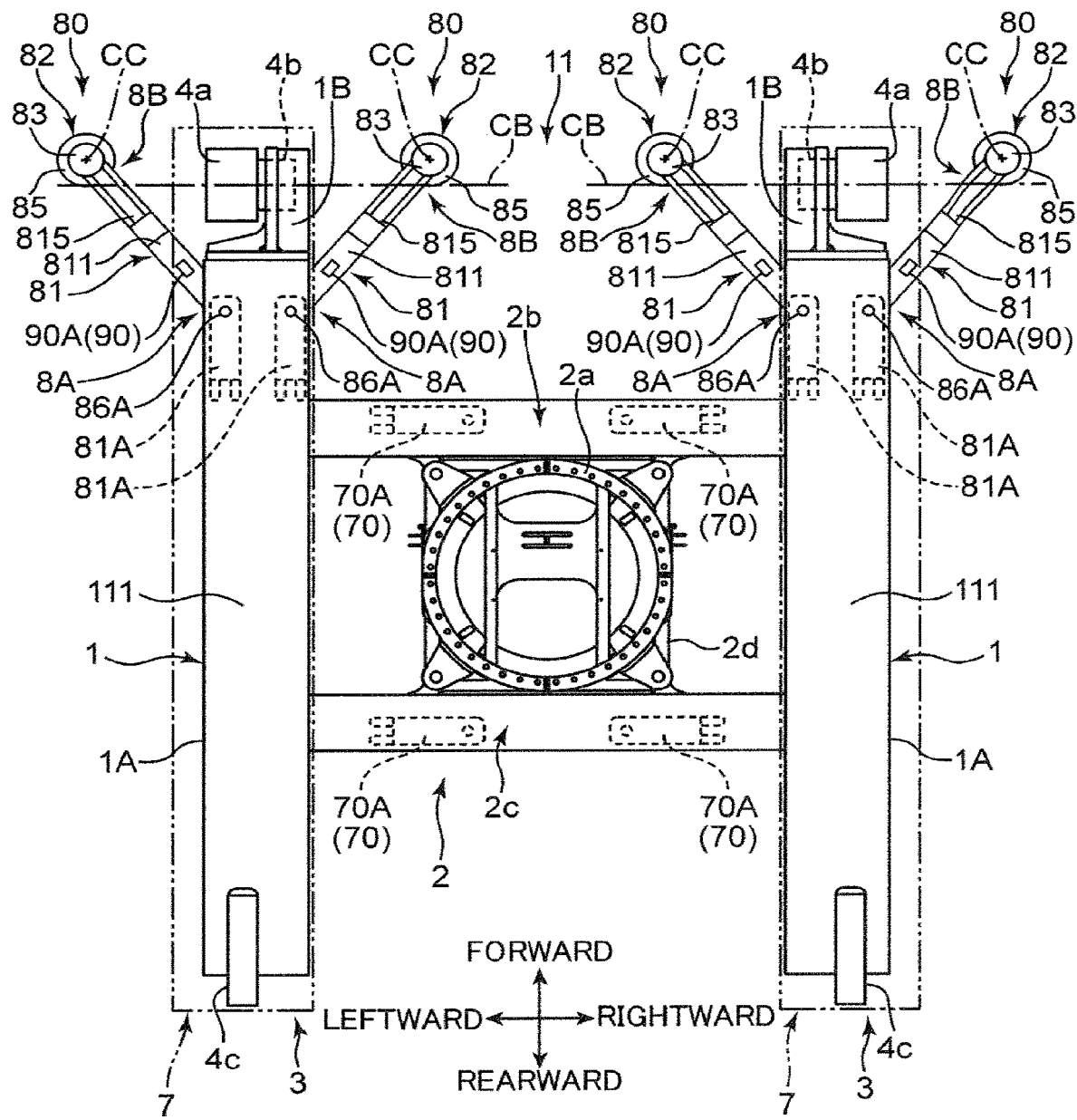
FIG. 53 is a plan view of a lower traveling body of a mobile crane according to a first modification of the sixth and the seventh embodiments.

FIG. 53 is a plan view of a lower traveling body 11 of a mobile crane 10 according to a first modification of the sixth embodiment. The first modification differs from the aspect shown in FIGS. 48 and 49 in that a beam 81 of a support member 80 includes a plurality of components attachable to and detachable from each other. It should be noted here that the crane 10 according to the first modification has the same configuration as that shown in FIGS. 48 and 49 except the aforementioned difference.

Figure 54:
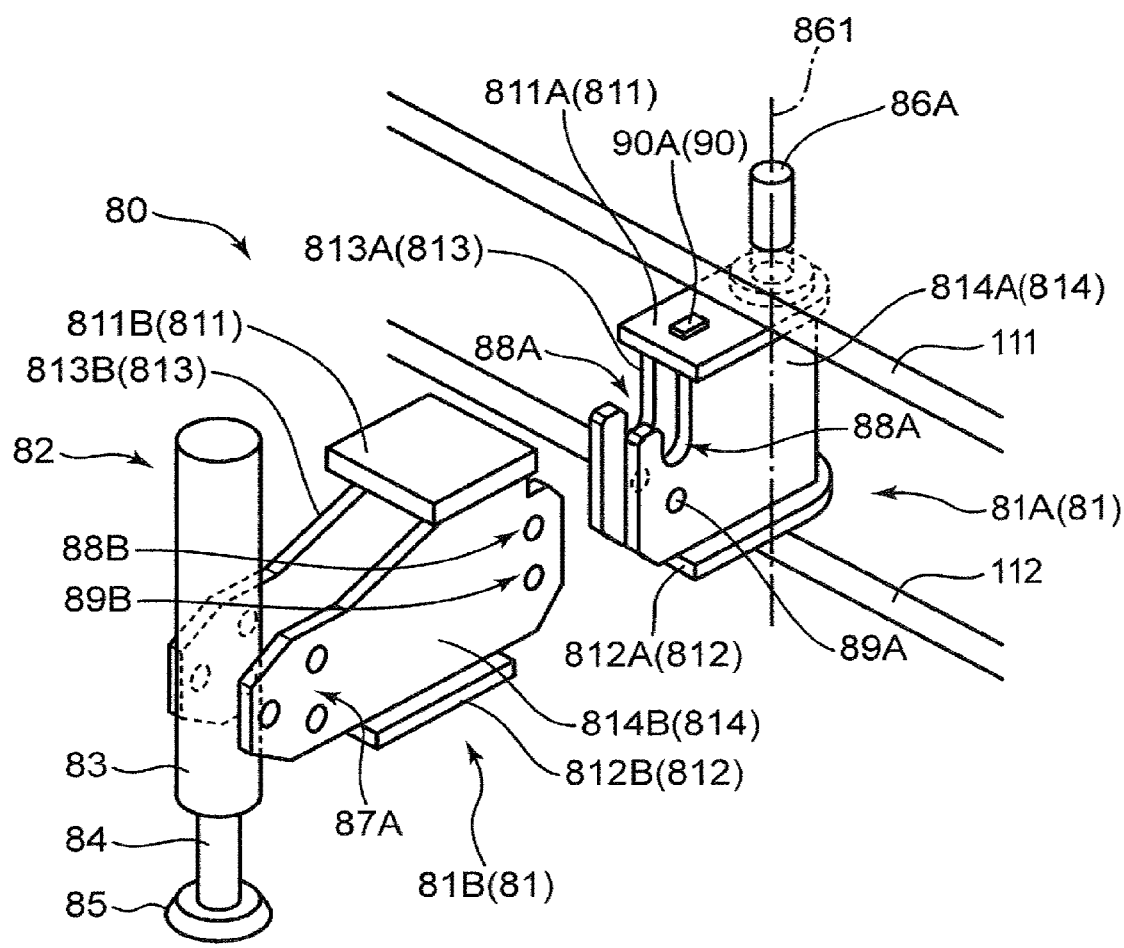
FIG. 54 is a perspective view of a crawler frame and a support member (a receiving member) attached to the crawler frame in the mobile crane according to the first modification of the sixth and the seventh embodiments, and shows a state where a part of a beam of the support member is disengaged from an engaging portion.
Figure 55:
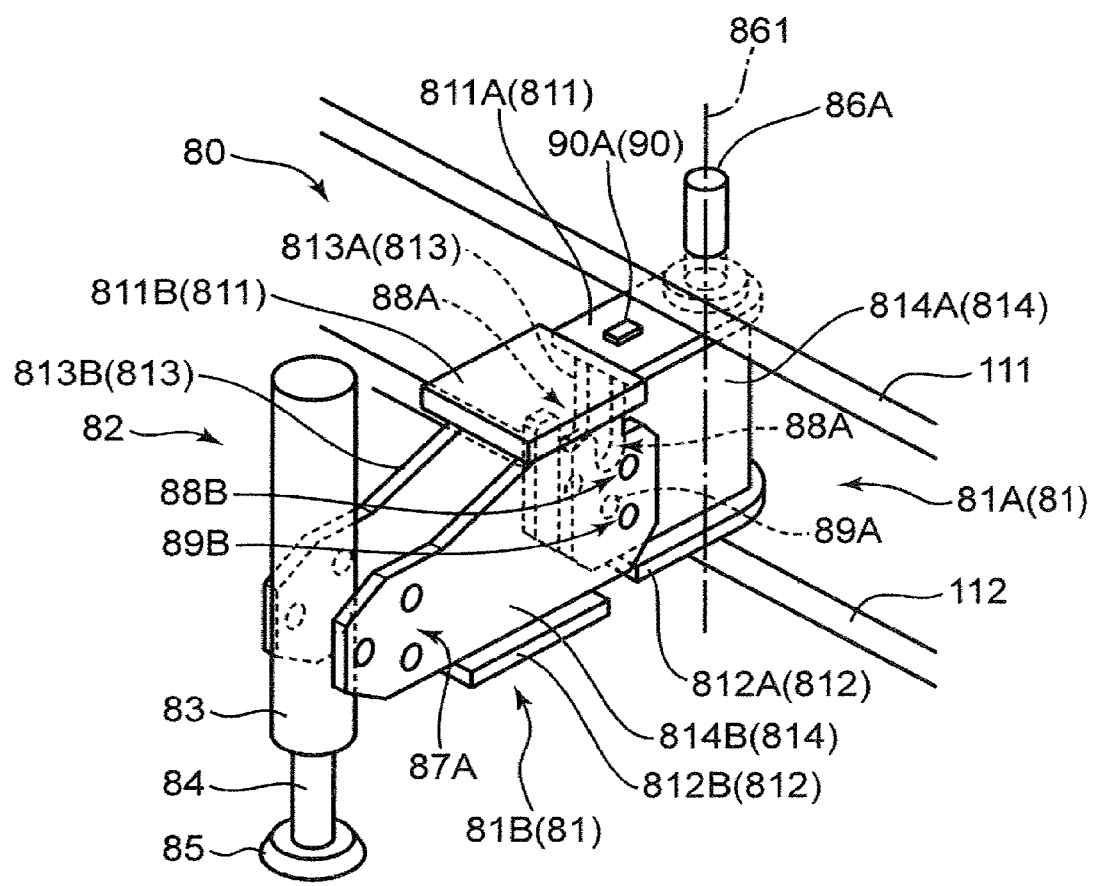
FIG. 55 is a perspective view of the crawler frame and the support member (the receiving member) in FIG. 48, and shows a state where a part of the beam of the support member is engaged with the engaging portion.
Figure 56:
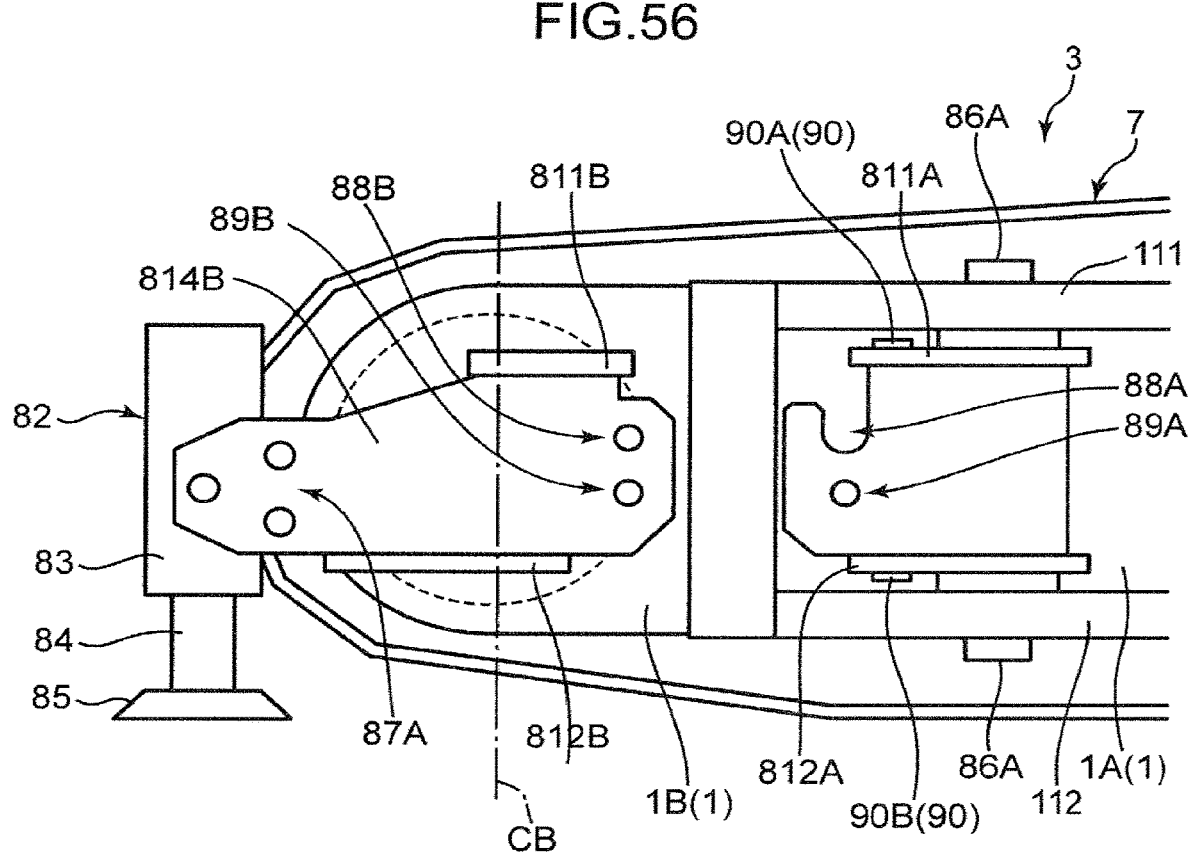
FIG. 56 is a sideview of the crawler frame and the support member (the receiving member) in FIG. 48, and shows a state where a part of the beam of the support member is disengaged from the engaging portion.
Figure 57:
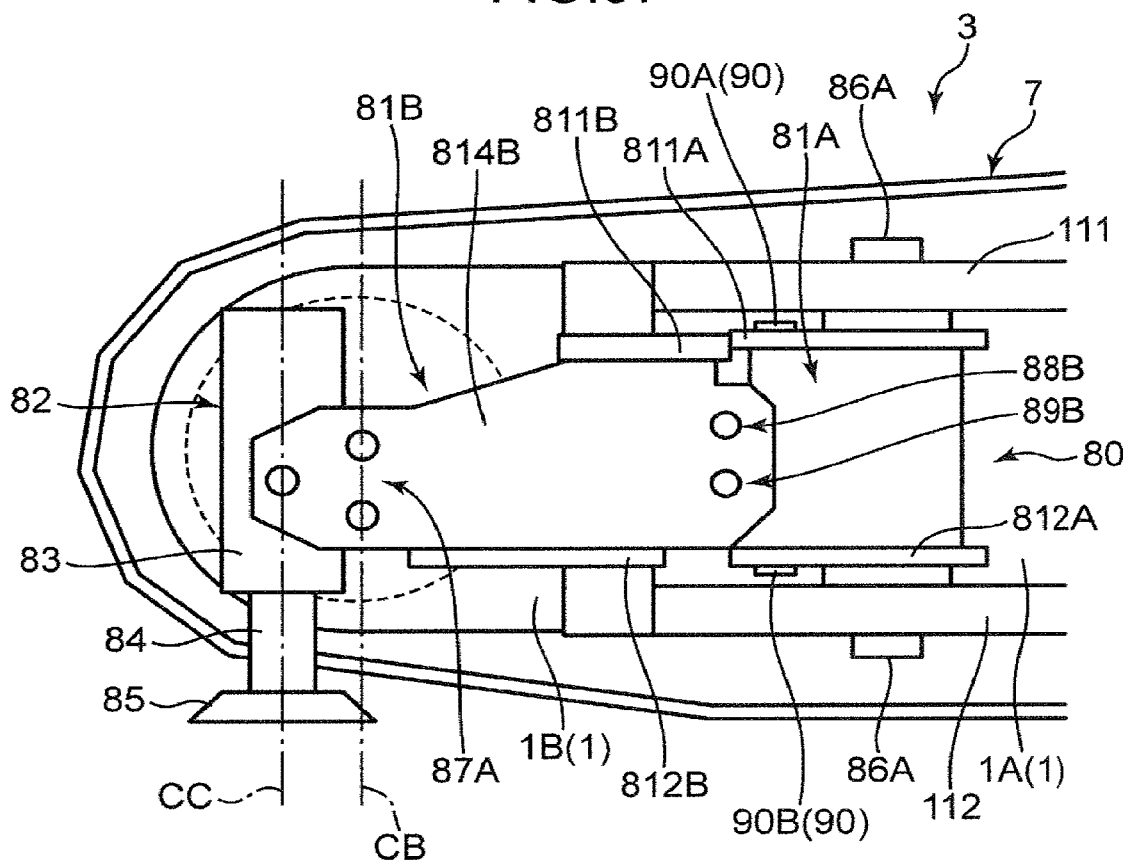
FIG. 57 is a sideview of the crawler frame and the support member (the receiving member) in FIG. 48, and shows a state where a part of the beam of the support member is engaged with the engaging portion.

FIG. 54 is a perspective view of a crawler frame 1 and the support member 80 attached to the crawler frame 1 in the crane 10 according to the first modification of the sixth embodiment, and shows a state where a part of the beam 81 of the support member 80 is disengaged from an engaging portion. FIG. 55 is a perspective view of the crawler frame 1 and the support member 80 in FIG. 54, and shows a state where the part of the beam 81 of the support member 80 is engaged with the engaging portion. FIG. 56 is a sideview of the crawler frame 1 and the support member 80 in FIG. 54, and shows a state where the part of the beam 81 of the support member 80 is disengaged from the engaging portion. FIG. 57 is a sideview of the crawler frame 1 and the support member 80 in FIG. 54, and shows a state where the part of the beam 81 of the support member 80 is engaged with the engaging portion.

As shown in FIG. 54, the beam 81 of the support member 80 in the crane 10 according to the first modification includes a first component 81A bearing a proximal end 8A of the beam 81, and a second component 81B bearing a distal end 8B of the beam 81. The first component 81A and the second component 81B are attachable to and detachable from each other. Further, in the first modification, the second component 81B detached from the first component 81A may serve as a component of a trans-lifter 70 provided at each of a front axle 2b and a rear axle 2c of the lower traveling body 11.

As shown in FIG. 54, the first component 81A is attached to the frame main body 1A of the crawler frame 1. The first component 81A has a top plate 811A, a bottom plate 812A spaced downward from the top plate 811A, and a pair of side plates 813A, 814A. The one side plate 813A connects right ends of the top plate 811A and the bottom plate 812A with each other, and the other side plate 814A connects right ends of the top plate 811A and the bottom plate 812A with each other.

As shown in FIGS. 54 and 56, the proximal end 8A of the first component 81A is formed with a connected portion for attaching the first component 81A to the crawler frame 1. The connected portion includes a through hole formed in a proximal end of the top plate 811A, and a through hole formed in a proximal end of the bottom plate 812A. In contrast, the frame main body 1A of the crawler frame 1 is provided with a connecting portion. The connecting portion includes a through hole formed in the top plate 111 of the frame main body 1A, and a through hole formed in the bottom plate 112. In a state where each of the through holes constituting the connected portion and the corresponding one of the through holes constituting the connecting portion face each other, a pin 86A extending in the upward and downward directions is inserted in the through holes. Consequently, the first component 81A is attached to the crawler frame 1 rotatably about the pin 86A.

The first component 81A is provided with a strain detector 90. Specifically, the first component 81A has, for example, a closed cross section shown in FIG. 50 in the same manner as the embodiment. A first strain gauge 90A is provided on the top plate 811A of the first component 81A, and a second strain gauge 90B is provided on the bottom plate 812A of the first component 81A, the top plate 811A and the bottom plate 812 defining the enclosed section. Here, the strain detector 90 may be provided in the second component 81B.

Each of the pair of side plates 813A, 814A of the first component 81A has an engaging portion at a position opposite to the connected portion. The engaging portion is aimed at attaching the second component 81B to the first component 81A. The engaging portion includes a pair of hooks 88A and a pair of lower through holes 89A located below the hooks 88A.

The second component 81B has a top plate SUB, a bottom plate 812B spaced downward from the top plate 811B, and a pair of side plates 813B, 814B. The one side plate 813B connects right ends of the top plate 811B and the bottom plate 812B with each other, and the other side plate 814B connects right ends of the top plate 811B and the bottom plate 812B with each other. The second component 81B has, for example, a closed cross section shown in FIG. 50 in the same manner as the embodiment.

The top plate 811A of the first component 81A and the top plate 811B of the second component 81B constitute the top plate 811 of the beam 81, and the bottom plate 812A of the first component 81A and the bottom plate 812B of the second component 81B constitute the bottom plate 812 of the beam 81. The one side plate 813A of the first component 81A and the one side plate 813B of the second component 81B constitute one side plate 813 of the beam 81, and the other side plate 814A of the first component 81A and the other side plate 814B of the second component 81B constitute the other side plate 814 of the beam 81.

A distal end of the second component 81B supports the leg 82. The leg 82 is coupled to the distal end of the second component 81B via a coupling member 87A.

Each of the pair of side plates 813B, 814B of the second component SIB has an engaged portion at a position opposite to the distal end of the second component 81B. The engaged portion is engageable with the engaging portion of the first component 81A, the engaged portion includes a pair of upper through holes 88B, a pair of lower through holes 89B located below the upper through holes 88B, and a pair of pins to be inserted in the through holes. One of the pins is inserted in the pair of upper through holes 88B for fastening in advance.

As shown in FIGS. 54 and 55, the pin extending in the upper through holes 88B of the second component 81B is hooked by the hooks 88A of the first component 81A. Further, the other of the pins is inserted in the lower through holes 89B of the second component 81B and the lower through holes 89A of the first component 81A in a state where the through holes 89B and the through holes 89A face each other. Consequently, the second component 81B can be attached to the first component 81A. The second component 81B is detachable from the first component 81A in a reverse sequence of the above-described attachment work.

When the second component 81B is detached from the first component 81A, the first component 81A is accommodated in the accommodation space provided in the frame main body 1A of the crawler frame 1 while being rotated about the pin 86A as shown by the broken line in FIG. 15.

The second component 81B detached from the first component 81A may serve as a component of the trans-lifter 70 provided at each of a front axle 2b and a rear axle 2c of the lower traveling body 11. Specifically, a pair of proximal end components 70A having the same configuration as that of the first component 81A of the support member 80 is rotatably provided at the front axle 2b, and another pair of proximal end components 70A having the same configuration as that of the first component 81A of the support member 80 is rotatably provided at the rear axle 2c. The second component 81B detached from the first component 81A and attached to each of the proximal end components 70A of the trans-lifter 70 can serve as a part of the trans-lifter 70.

In the detailed example shown in FIGS. 55 and 57, the top plate 811A of the first component 81A and the top plate 811B of the second component 81B are horizontally juxtaposed and in contact with each other in a state where the second component 81B is attached to the first component 81A. This arrangement makes it possible to effectively cause a strain in the first component 81A and the second component 81B when a moment in a direction of causing the crane 10 to turn over in a first direction D1 occurs and the leg of the support member 80 receives an upward reaction force caused by the moment from the ground.

Figure 58:
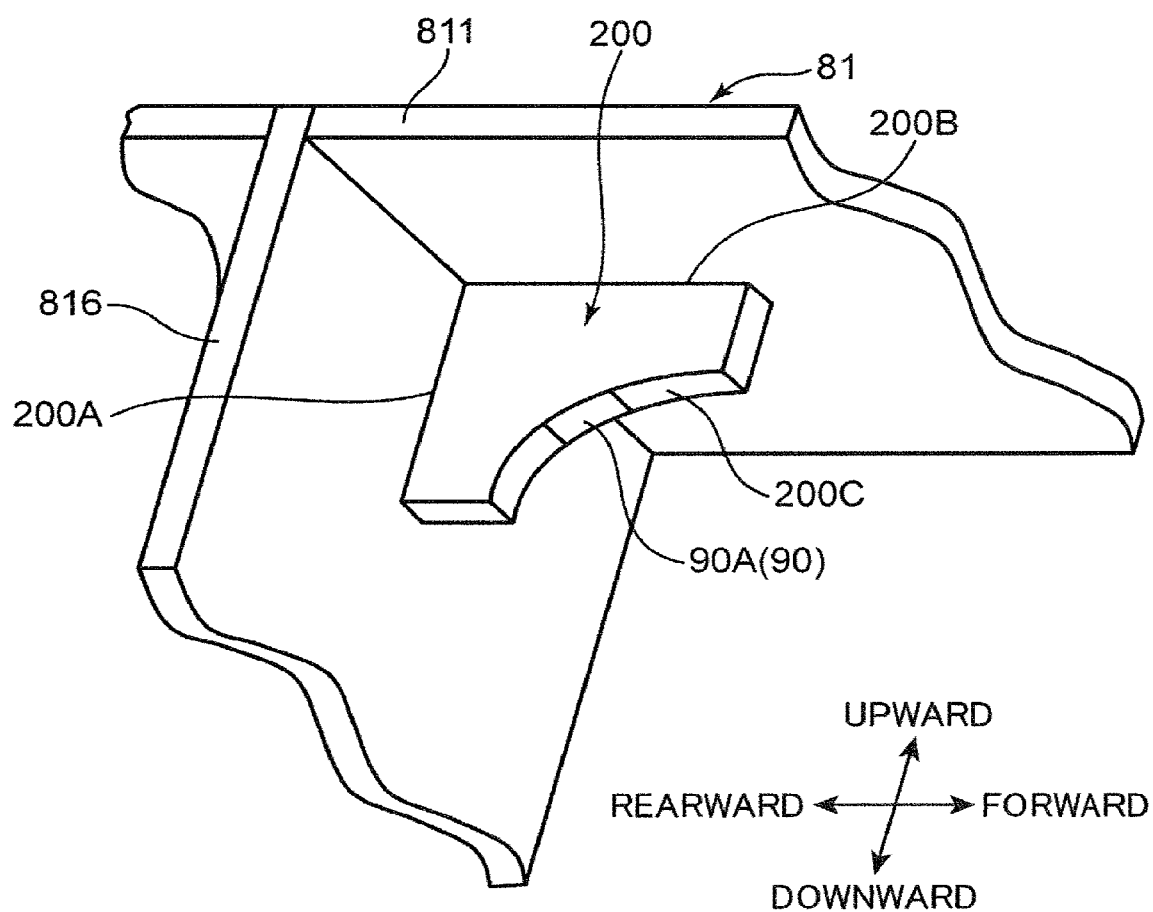
FIG. 58 is a perspective view schematically showing a second modification of the sixth embodiment.

FIG. 58 is a perspective view schematically showing a second modification of the sixth embodiment. In the second modification shown in FIG. 58, a beam 81 further includes a measurement support base 200 (a deformation member) to which a strain gauge (a strain detector) is attached. The measurement support base 200 is located at such a position as to detect a strain occurring in the beam 81 in a state where a distal end 14B of a boom 14 is away in a first direction D1 from a proximal end 14A of the boom 14 in the forward and rearward directions. The measurement support base 200 is preferably arranged in this manner, and thus the location of the measurement support base 200 is not particularly limited. The details of the configuration of the measurement support base 200 is the same as those in the fifth modification of the second embodiment shown in FIG. 38, and thus the description therefor is omitted.

Seventh Embodiment

A crane 10 according to the seventh embodiment has a configuration equivalent to that according to the sixth embodiment described above with reference to FIGS. 48 to 57. The seventh embodiment differs from the sixth embodiment in that the physical quantity detector is constituted by a reaction force detector 93 (see FIG. 6) in place of the strain detector 90 in the sixth embodiment. With this configuration in the seventh embodiment, the strain detector 90 shown in FIGS. 48 to 57 may be excluded.

Hereinafter, the difference of the seventh embodiment from the sixth embodiment will be mainly described.

A lower traveling body 11 of the crane 10 according to the seventh embodiment shown in FIG. 48 includes four support members 80 (four receiving members 80) in the same manner as the sixth embodiment. Each of the four support members 80 includes a first right support member 80 (a first right receiving member 80), a first left support member 80 (a first left receiving member 80), a second right support member 80 (a second right receiving member 80), and a second left support member 80 (a second left receiving member 80) in the same manner as the sixth embodiment.

Each of the four support members 80 has a connection part connected with the crawler frame 1 in a frame unit, and a contact part being in contact with the ground. The connection part of the support member 80 is constituted by a proximal end 8A of a beam 81, and the contact part of the support member 80 is constituted by a float 85 that is a lower end of a leg 92.

In the seventh embodiment, a boom direction D1 corresponds to a first direction D (the forward direction) shown in FIG. 48 in the same manner as the sixth embodiment. A location of the float 85 (the contact part) in the seventh embodiment is the same as the location in the sixth embodiment.

[Physical Quantity Detector]

In the seventh embodiment, the physical quantity detector 93 serves as the reaction force detector 93 (see FIG. 6) for detecting information necessary to safely raise and lower the boom 14 in the assembly work and the disassembly work of the crane 10. Specifically, the physical quantity detector 90 detects a physical quantity which changes in accordance with a change in a reaction force received from the ground by the support member 80. The physical quantity detector 93 is configured to detect a pressure corresponding to a moment in a direction of causing the crane 10 to turn over in one of the forward and rearward directions. In the seventh embodiment, the support member 80 is arranged so that the float 85 (the contact part) that is the lower end of the leg 82 is away from the proximal end 8A (the connection part) of the beam 81 in the boom direction D1 in the same manner as the sixth embodiment.

A hydraulic circuit included in the crane 10 according to the seventh embodiment is equivalent to that in the crane according to the third embodiment described with reference to FIG. 39, except that the lower traveling body 11 of the crane 10 according to the seventh embodiment includes the four support members 80 and each of the four support members 80 includes a hydraulic cylinder 86. With this configuration in the seventh embodiment, the physical quantity detector 93 further includes a third pressure sensor and a fourth pressure sensor which are unillustrated, in addition to the first pressure sensor 91 and the second pressure sensor 92 shown in FIG. 39.

A signal representing the pressure detected by the physical quantity detector 93 is input to the controller 100 shown in FIG. 2.

In the seventh embodiment, a way of calculating the reaction force is the same as the way described in the third embodiment.

Besides, in the seventh embodiment, the controller 100 stores in advance a maximal value RFmax (a maximally permissible reaction force) of the reaction force RFt received from the ground by the floats 85 (the contact parts) of the pair of support members 80 in the same manner as the third embodiment. The calculation section 101 shown in FIG. 2 calculates the supportive reaction force RFt based on the pressures detected by the physical quantity detector 93 using Formulas (5) and (7), or Formulas (6) and (7).

The stability determination section 102 compares the supportive reaction force RFt with the maximally permissible reaction force RFmax, and determines whether the crane 10 is in a stable state or an unstable state in the same manner as the third embodiment.

When the stability determination section 102 determines that the crane 10 is in the unstable state, the notification control section 103 outputs a notification instruction of notifying in the notification device 110 the operator of the stability information concerning the stability determined by the stability determination section 102.

The operation control section 104 outputs an operation instruction directing an operation required to avoid a decrease in the stability of the crane 10 based on the stability determined by the stability determination section 102 in the same manner as the third embodiment.

Other Modifications

Although the mobile crane 10 according to each of the embodiments are described heretofore, the present invention should not be limited to the described embodiments.

(A) For instance, although the physical quantity detector 90 includes the plurality of strain gauges in the first, the second, the fourth, and the sixth embodiments, the physical quantity detector 90 may include a single strain gauge.

(B) Although the tiltable attachment includes the jib 17 in the embodiments, the mobile crane may be adaptable to a crane including no jib.

(C) The boom direction corresponds to the forward direction in the first, and the fourth to the seventh embodiments, but should not be limited thereto, and may correspond to the rearward direction. Similarly, the boom direction corresponds to the rightward direction in the second and the third embodiments, but should not be limited thereto, and may correspond to the leftward direction.

(D) Although the physical quantity detector 90 in the first embodiment is arranged at one of the opposite ends of the crawler frame 1 where the tumbler bracket 1B is located, the physical quantity detector 90 may be arranged at the other end (to which the idler 4c is attached) opposite to the one end. Furthermore, the physical quantity detector 90 may be arranged at each of the opposite ends of the crawler frame 1. The physical quantity detector 90 arranged at each of the opposite ends of the crawler frame 1 in this manner can detect a strain caused in the crawler frame by the turning-over moment in either of the forward and rearward directions corresponding to the raising and lowering directions of the tiltable attachment.

(E) In the fourth to the seventh embodiments, the crawler frames 1 in the pair are provided with their respective physical quantity detectors 90. However, only one of the crawler frames 1 may be provided with a physical quantity detector 90.

(F) Although the crane 10 according to each of the first to the seventh embodiments is aimed at detecting information necessary to safely raise and lower the tiltable attachment in the assembly work and the disassembly work of the crane 10, the crane 10 may be further adoptable for detecting information necessary to safely operate the crane 10 in other works as well as the assembly work and the disassembly work. Such other works include, for example, a work for an overload test related to the mobile crane. The overload test is a test of confirming a hoisting work of hoisting a predetermined hanged load to apply a load exceeding a rated load to the mobile crane while the moment limiter is stopped or a limit of the moment limiter is released without stopping the moment limiter. The operation control section 104 outputs an operation instruction directing an operation required to avoid a decrease in the stability of the crane 10 based on the stability determined by the stability determination section 102 in the work for the overload test. Specifically, in the overload test, a main winch 34 or an auxiliary winch 36 may be configured to suspend or decelerate an operation of lifting the hanged load in accordance with an operation instruction particularly while the hanged load is hoisted and lifted away from the ground.

The other works further include an excavation work of excavating the ground by powerfully lowering an unillustrated leading end attachment such as a bucket attached to a leading end of the main rope 50 shown in FIG. 1 to the ground from a higher position than the ground. Additionally, the other works include an exemplary typical hoisting work of moving the hanged road with use of the crane 10. As a result, the safety during the hoisting work is improved.

(G) Location of Physical Quantity Detector

In the crane, the physical quantity detector is sufficiently configured to detect a strain occurring in the beam of the support member, and hence the location of the physical quantity detector is not limited to those described in the embodiments.

(H) Number of Support Members

Although the crane preferably includes two or more support members to make the posture of the crane stable when a moment in a direction of causing the crane to turn over in one of the leftward and rightward directions occurs, the number of support members should not be limited to those described in the embodiments.

(I) Number of Physical Quantity Detectors

The physical quantity detector in the crane is sufficiently configured to detect a strain occurring in the beam of at least one of the support members. Thus, the number of physical quantity detectors to be provided is not limited to those described in the embodiments. In other words, the support members 80 may be provided with their respective physical quantity detectors 90, or a part of the support members 80 may be provided with a corresponding physical quantity detector 90.

(J) Number of Devices Constituting Physical Quantity Detector

Each of the physical quantity detectors 90 includes the first strain gauge 90A (the first device) and the second strain gauge 90B (the second device) in the embodiments, but should not be limited thereto. The physical quantity detector 90 may include a single device (e.g., a single strain gauge), and may include three or more devices (e.g., three or more strain gauges).

(K) Location of Each of Support Members

In the crane, the support members are preferably attached to one of the pair of crawler frames. Therefore, the location of each of the support members is not limited to those described in the embodiments. In FIGS. 22, 36 and 37, the plurality of support members 80 may be supported by the crawler frame 1 (the second crawler frame 1) of the second crawler 3 (the left crawler 3 in the drawings) of the pair of crawlers 3.

(L) Calculation Section

The crane may not necessarily include the calculation section 101. In this case, the crane may include, for example, a storage for storing in advance balance information (a left and right balance of the crane) corresponding to various detection signals output from the physical quantity detector. The notification control section 103 controls the notification device 110, based on each of the detection signals output from the physical quantity detector, to notify the operator of the information corresponding to the detection signal concerning the left and right balance of the crane.

The calculation section in the mobile crane may calculate, based on the physical quantity detected by the physical quantity detector, a ratio between a reaction force which changes in accordance with a change in the physical quantity and the weight of the mobile crane. Consequently, the ratio resulting in a criterion of the stability of the mobile crane is obtainable. The calculated ratio is notified to the operator via the notification device, for example.

(M) Configuration of Leg of Support Member

The leg of the support member in the crane is sufficiently configured to receive a reaction fore caused by the turning-over moment and permit a strain to occur in the beam. Hence, the leg may not include a hydraulic cylinder having a cylinder main body 83 and a rod 84 unlike the embodiments, and may include another member instead.

(N) The physical quantity detector in the first embodiment may include a pressure sensor for detecting a pressure as the physical quantity in place of the strain detector for detecting a strain as the physical quantity.

(O) Location of Counterforce Receiving Part

The location of the contact part (the float 85) serving as the reaction force receiving part in the fourth to the seventh embodiments is preferably away from the rotational axis CB of the first wheel 4a in the boom direction D1. If the location of the contact part is away from the rotational axis CB of the first wheel 4a in the opposite direction (the second direction D2) to the boom direction D1, the first wheel 4a would undertake a large proportion of the weight of the crane 10. This would lead to a decrease in the reaction force received from the ground by the contact part, and a reduction in the detection sensitivity of the physical quantity by the physical quantity detector. Moreover, the location of the contact part serving as the reaction force receiving part is preferably visible by the operator. This is because, if the contact part is hidden by the upper slewing body 12, the car body, the crawler 3 or the like and thus invisible by the operator, the operator may find it difficult to adjust a position of the contact part so that the contact part comes into contact with the ground.

(P) The physical quantity detector in the third, the fifth, and the seventh embodiments may include, for example, a loadcell in place of the pressure sensor. The loadcell can detect a physical quantity which changes in accordance with a change in a reaction force received from the ground by the reaction force receiving part.

Conclusively, provided is a mobile crane which can detect information necessary to safely raise and lower the tiltable attachment without an overburdened input operation by an operator.

The mobile crane includes: a lower traveling body which includes a pair of crawlers each extending in forward and rearward directions and spaced apart from each other in leftward and rightward directions; an upper slewing body supported on the lower traveling body slewably about a slewing axis; a tiltable attachment including a boom tiltably supported on the upper slewing body; and a physical quantity detector, wherein the lower traveling body has a reaction force receiving part for receiving a reaction force from the ground at a position away from the slewing axis in a boom direction in a state where the pair of crawlers is in contact with the ground, the boom direction coinciding with a horizontal component of a direction in which the boom extends from the upper slewing body, and the physical quantity detector is configured to detect a physical quantity which changes in accordance with a change in the reaction force received from the ground by the reaction force receiving part.

The mobile crane is attained from the viewpoint of an increase and a decrease in the reaction force received from the ground by the mobile crane in accordance with an increase and a decrease in the moment in a direction of causing the mobile crane to turn over. Specifically, the mobile crane can achieve safe raising operation and lowering operation without an overburdened input operation by the operator owing to the detection of the physical quantity which changes in accordance with the change in the reaction force. Details will be described below.

In a specific work accompanied by an occurrence of a large moment in a direction of causing the mobile crane to turn over such as the assembly work, the disassembly work, and the work for the overload test, the moment in the direction of causing the mobile crane to turn over increases as the angle of the boom to the ground decreases. A downward load that the mobile crane applies to the ground increases and an upward reaction force that the mobile crane receives from the ground increases in accordance with the increase in the moment. Here, the reaction force that the mobile crane receives from the ground is not equally distributed over the entirety of the lower surface of the lower traveling body, but distributed biasedly in the boom direction. Accordingly, the reaction force receiving part in the mobile crane is configured to receive the reaction force from the ground at a position away from the slewing axis in the boom direction in the state where the pair of crawlers is in contact with the ground in the specific work. The reaction force receiving part having this configuration can receive a large reaction force from the ground, thereby enhancing the detection accuracy of the physical quantity. The reaction force received from the ground by the reaction force receiving part increases in accordance with the increase in the moment. The reaction force thus can result in a criterion for determining (presuming) whether the mobile crane is in a stable state where the mobile crane is stably balanced or in an unstable state where the mobile crane is unbalanced and is likely to turn over. Accordingly, there is no need of information concerning a combination of the boom length and the jib length for the determination. In this way, the mobile crane can detect the information necessary to safely raise and lower the tiltable attachment in the specific work without an overburdened input operation by the operator. The mobile crane then utilizes the detected information for the safe raising and lowering operations.

In the mobile crane, it is preferable that the boom direction corresponds to one of the forward and rearward directions of the lower traveling body, that each of the pair of crawlers includes: a crawler frame extending in the forward and rearward directions; and a first wheel supported on one of a front end and a rear end of the crawler frame and rotatable about a rotational axis, the one end being away from the slewing axis in the boom direction, and that the first wheel serves as the reaction force receiving part.

In this aspect, the physical quantity detector can detect the physical quantity which changes in accordance with a change in the reaction force received by the first wheel serving as the reaction force receiving part. In other words, no additional member is required to serve as the reaction force receiving part in this aspect. Besides, the first wheel supported on the one end of the crawler frame that is away from the slewing axis in the boom direction can receive an extremely large reaction force from the ground. Accordingly, the detection accuracy of the physical quantity is further enhanced.

In the mobile crane, it is preferable that each of the pair of crawlers includes: a second wheel supported on the other of the front end and the rear end of the crawler frame and rotatable about a rotational axis; and a crawling member endlessly supported by the first wheel and the second wheel and cyclically movable, and that the physical quantity detector is configured to detect, as the physical quantity, a strain that is caused in the crawler frame of at least one of the pair of crawlers by the reaction force which the first wheel receives from the ground via the crawling member.

In this aspect, the strain to be detected by the physical quantity detector is the one actually caused in the crawler frame as a result of the raising operation or the lowering operation for the tiltable attachment in the specific work. The strain increases and decreases in correlation with an increase and a decrease in the moment. That is to say, the strain increases as the reaction force increases, and decreases as the reaction force decreases in the specific work. The strain results in a criterion for determining the situation of the mobile crane whether the crane is in the stable state or in the unstable state.

In the mobile crane, each of the pair of crawlers may further include a plurality of lower rollers rotatably supported on a lower portion of the crawler frame and arranged at intervals between the first wheel and the second wheel in the forward and rearward directions for guiding the crawling member, and the physical quantity detector is configured to detect the strain on a specific portion of the crawler frame in the forward and rearward directions, the specific portion being away in the boom direction from a rotational axis of a lower roller closest to the first wheel among the plurality of lower rollers.

In this aspect, the strain is accurately detected. Specifically, the strain caused in the crawler frame by the gravity acting on the tiltable attachment lowered in the boom direction particularly increases at a position closer to the first wheel serving as the reaction force receiving part in the specific work. In this aspect, the portion of the crawler frame where the strain is to be detected in the forward and rearward directions is away in the boom direction from the rotational axis of a lower roller (a first lower roller) closest to the first wheel. Accordingly, the strain occurring in the crawler frame can be accurately detected.

In the mobile crane, it is preferable that each of the pair of crawlers further includes a plurality of lower rollers rotatably supported on a lower portion of the crawler frame and arranged at intervals between the first wheel and the second wheel in the forward and rearward directions for guiding the crawling member, and that the physical quantity detector is configured to detect the strain on a specific portion of the crawler frame in the forward and rearward directions, the specific portion being located in a region between a rotational axis of a lower roller (the first lower roller) closest to the first wheel among the plurality of lower rollers and the rotational axis of the first wheel.

In this aspect, the strain is further accurately detected. As described above, the strain particularly increases at a position closer to the first wheel serving as the reaction force receiving part. Specifically, the strain notably occurs in the region between the rotational axis of the first lower roller and the rotational axis of the first wheel. In this aspect, the portion of the crawler frame where the strain is to be detected in the forward and rearward directions is in the aforementioned region. Accordingly, the strain occurring in the crawler frame can be further accurately detected.

In the mobile crane, the physical quantity detector may be configured to detect the strain occurring in the one end of the crawler frame that supports the first wheel.

In this aspect, the strain is accurately detected. As described above, the strain particularly increases at a position closer to the first wheel serving as the reaction force receiving part. In this aspect, the aforementioned configuration adapted to detect a strain occurring in the one end that supports the first wheel can achieve the accurate detection of the strain.

More specifically, in the mobile crane, the crawler frame may include a frame main body extending in the forward and rearward directions, and a bracket attached to an end of the frame main body to thereby constitute the one end of the crawler frame, and the physical quantity detector may be configured to detect the strain occurring in the bracket.

In this aspect, the strain occurring in the bracket can be accurately detected.

In the mobile crane, it is preferable that each of the pair of crawlers includes a crawler frame extending in the forward and rearward directions, that the lower traveling body includes: a center frame lying between the crawler frame of one of the pair of crawlers and the crawler frame of the other of the pair of crawlers, and connecting the crawler frames with each other; and at least one receiving member, that the crawler frame of the one crawler, the crawler frame of the other crawler, and the center frame constitute a frame unit, that the at least one receiving member has a connection part connected with the frame unit, and a contact part being in contact with the ground, that the connection part is away from the slewing central axis in the boom direction, and that the contact part is away from the connection part in the boom direction and serves as the reaction force receiving part.

In this aspect, the connection part is away from the slewing axis in the boom direction, and the contact part is away from the connection part in the boom direction. With this configuration, the contact part serving as the reaction force receiving part can receive a large reaction force from the ground. Therefore, the detection accuracy of the physical quantity is enhanced.

In the mobile crane, the at least one receiving member preferably includes a hydraulic cylinder extendable and retractable in upward and downward directions.

In this aspect, the relative position of the contact part to the ground is adjustable by extending and retracting the hydraulic cylinder in the upward and downward directions so that the contact part comes into contact with the ground.

The mobile crane preferably further includes: a hydraulic pump for discharging hydraulic fluid; a control valve disposed between the hydraulic pump and the hydraulic cylinder, and shiftable between a supply position for supplying the hydraulic fluid discharged by the hydraulic pump to the hydraulic cylinder through a hydraulic path and a suspension position for suspending the supply of the hydraulic fluid discharged from the hydraulic pump to the hydraulic cylinder; and an instruction device for instructing the control valve to shift between the supply position and the suspension position.

In this aspect, the hydraulic cylinder can be set at the supply position in an extendable and retractable manner by activating the control valve in response to an instruction from the instruction device. In this way, the length of the receiving member in the upward and downward directions is appropriately adjustable so that the contact part of the receiving member comes into contact with the ground prior to the specific work. For the specific work, the hydraulic cylinder is set at the suspension position by activating the control valve in response to an instruction from the instruction device. This inhibits the hydraulic cylinder from extending and retracting. As a result, the contact part serving as the reaction force receiving part can receive the reaction force correlating with the increase and the decrease in the moment while being in contact with the ground in the specific work.

In the mobile crane, the physical quantity detector may include a pressure sensor for detecting, as the physical quantity, at least one of a pressure on a head side of the hydraulic cylinder and a pressure on a rod side of the hydraulic cylinder.

In this aspect, the pressure detected by the pressure sensor increases and decreases in correlation with a decrease and an increase in the moment. That is to say, the pressure increases as the reaction force increases, and decreases as the reaction force decreases in the specific work. The pressure results in a criterion for determining the situation of the mobile crane whether the crane is in the stable state or in the unstable state.

In the mobile crane, the at least one receiving member may include a beam including the connection part and extending from the connection part in the boom direction or in a direction oblique to the boom direction, and a leg including the contact part and attached to a distal end of the beam.

In this aspect, the distance from the connection part to the contact part can be set suitably depending on the beam length. Further, in this aspect, the contact part of the leg connected with the distal end of the beam can receive a large reaction force from the ground. Accordingly, the detection accuracy of the physical quantity is further enhanced.

In the mobile crane, the physical quantity detector may be configured to detect a strain occurring in the beam as the physical quantity.

In this aspect, the strain detected by the physical quantity detector increases and decreases in correlation with an increase and a decrease in the moment. That is to say, the strain occurring in the beam increases as the reaction force increases, and decreases as the reaction force decreases in the specific work. The strain results in a criterion for determining the situation of the mobile crane whether the crane is in the stable state or in the unstable state. Specifically, a moment in a direction of causing the mobile crane to turn over is caused by the gravity acting on the tiltable attachment lowered in the boom direction, and the leg of the receiving member receives an upward reaction force caused by the moment from the ground in the specific work. This causes a bending moment (a bending stress) in the beam that supports the leg, the bending moment resulting in a strain occurring in the beam. From these perspectives, the strain represents the physical quantity which changes in accordance with a change in the reaction force, and correlates with the moment in the direction of causing the mobile crane to turn over.

In the mobile crane, the physical quantity detector preferably includes a first device for detecting a strain occurring in an upper portion of the beam, and a second device for detecting a strain occurring in a lower portion of the beam.

In this aspect, the strain occurring in the boom can be sensitively detected. Details will be described below. A moment in a direction of causing the mobile crane to turn over is caused by the gravity acting on the tiltable attachment lowered in the boom direction, and the beam receives a bending load caused by the moment in the upward and downward directions in the specific work. In this case, a larger strain is likely to occur in each of the upper portion and the lower portion of the beam to which the distance from neutral plane of the beam is large. In this aspect, a strain occurring in the beam is sensitively detectable owing to the first device which can detect a strain occurring in the upper portion of the beam and the second device which can detect a strain occurring in the lower portion of the beam.

In the mobile crane, the boom direction may correspond to one of the leftward and rightward directions of the lower traveling body, the at least one receiving member may include: a first receiving member attached to the crawler frame of the one crawler; and a second receiving member attached to the crawler frame of the one crawler at a distance from the first receiving member in the forward and rearward directions, and each of the first receiving member and the second receiving member may be arranged so that the contact part is away from the connection part in the boom direction.

In this aspect, in the case where the boom direction corresponds to the one of the leftward and rightward directions (i.e., the leftward direction or the rightward direction)

in the specific work, the contact part serving as the reaction force receiving part is away from the connection part in the boom direction, and thus can receive a large reaction force from the ground. Accordingly, the detection accuracy of the physical quantity is enhanced. Moreover, in the aspect, the first receiving member and the second receiving member are attached to the crawler frame at a distance therebetween in the forward and rearward directions. This arrangement can make the posture of the mobile crane more stable than a configuration where only a single receiving member is attached to a crawler frame when the moment in the direction of causing the mobile crane to turn over in the one of the leftward and rightward directions occurs.

In the mobile crane, the boom direction may correspond to one of the forward and rearward directions of the lower traveling body, the at least one receiving member may include: a first receiving member attached to the center frame; and a second receiving member attached to the center frame at a distance from the first receiving member in the leftward and rightward directions, and each of the first receiving member and the second receiving member may be arranged so that the contact part is away from the connection part in the boom direction.

In this aspect, in the case where the boom direction corresponds to the one of the forward and rearward directions (i.e., the forward direction or the rearward direction) in the specific work, the contact part serving as the reaction force receiving part is away from the connection part in the boom direction, and thus can receive a large reaction force from the ground. Accordingly, the detection accuracy of the physical quantity is enhanced. Moreover, in the aspect, the first receiving member and the second receiving member are attached to the center frame at a distance therebetween in the leftward and rightward directions. This configuration can make the posture of the mobile crane more stable than a configuration where only a single receiving member is attached to the center frame when the moment in the direction of causing the mobile crane to turn over in the one of the forward and rearward directions occurs.

In the mobile crane, it is preferable that each of the pair of the crawlers includes a wheel supported on one of a front end and a rear end of the crawler frame rotatably about a rotational axis, the one end being away from the slewing central axis in the boom direction, and that each of the first receiving member and the second receiving member is arranged so that the center of the contact part is away in the boom direction from the rotational axis of the wheel of each of the pair of crawlers.

In this aspect, the center of the contact part of each of the receiving members is away from the rotational axis of the wheel in the boom direction. Hence, a large proportion of the weight of the mobile crane acts on the ground via the receiving member. As a result, the contact part of the receiving member can receive a large reaction force.

In the mobile crane, the boom direction may correspond to one of the forward and rearward directions of the lower traveling body, the at least one receiving member may include: a first right receiving member and a first left receiving member each attached to a first crawler frame that is the crawler frame of the one crawler, and a second right receiving member and a second left receiving member each attached to a second crawler frame that is the crawler frame of the other crawler, the first right receiving member may be arranged so that the contact part of the first right receiving member is away rightward from the first crawler frame, and is away from the connection part of the first right receiving member in the boom direction, the first left receiving member may be arranged so that the contact part of the first left receiving member is away leftward from the first crawler frame, and is away from the connection part of the first left receiving member in the boom direction, the second right receiving member may be arranged so that the contact part of the second right receiving member is away rightward from the second crawler frame, and is away from the connection part of the second right receiving member in the boom direction, and the second left receiving member may be arranged so that the contact part of the second left receiving member is away leftward from the second crawler frame, and is away from the connection part of the second left receiving member in the boom direction.

In this aspect, in the case where the boom direction corresponds to the one of the forward and rearward directions (i.e., the forward direction or the rearward direction) in the specific work, the contact part of each of the first right reaction force receiving member, the first left reaction force receiving member, the second right reaction force receiving member, and the second left reaction force receiving member is away from the corresponding connection part in the boom direction, and thus can receive a large reaction force from the ground. Accordingly, the detection accuracy of the physical quantity is enhanced. Further, in this aspect, the right reaction force receiving member and the left reaction force receiving member are attached to the crawler frame. The contact part of the right reaction force receiving member is on the right of the crawler frame. The contact part of the left reaction force receiving member is on the left of the crawler frame. In this arrangement, the left reaction force receiving member and the right reaction force receiving member can support the crawler frame on the left and right sides thereof while keeping a good balance upon occurrence of the moment (that is the moment in a direction of causing the mobile crane to turn over in the forward direction). If only one of the right reaction force receiving member and the left reaction force receiving member is attached to the crawler frame, the one reaction force receiving member cannot satisfactorily support the crawler frame while keeping the good balance in the leftward and rightward directions. In this case, a torsional moment is likely to occur in the crawler frame. In this aspect, however, an occurrence of such a torsional moment can be suppressed in the above-described manner. Accordingly, it is possible to reduce the influence of the torsional moment on a result of the detection by the physical quantity detector. This consequently achieves suppression of a reduction in the detection accuracy of the physical quantity.

In the mobile crane, it is preferable that each of the pair of crawlers includes a wheel supported on one of a front end and a rear end of the crawler frame rotatably about a rotational axis, the one end being away from the slewing central axis in the one of the forward and rearward directions, and that each of the first right receiving member, the first left receiving member, the second right receiving member, and the second left receiving member is arranged so that the center of the contact part is away from the rotational axis of the wheel of each of the pair of crawlers in the boom direction.

In this aspect, the center of the contact part of each of the receiving members is away from the rotational axis of the wheel in the boom direction. Hence, a large proportion of the weight of the mobile crane acts on the ground via the receiving member. As a result, the contact part of the receiving member can receive a large reaction force from the ground.

In the mobile crane, the receiving member may have a configuration to allow at least a part of the receiving member to be disengageably engaged with an engaging portion.

In this aspect, the at least a part of the receiving member is engageable with the engaging portion only when it is needed in the specific work of the mobile crane, and the at least a part of the receiving member is disengageable from the engaging portion when it is unneeded in, for example, the typical hoisting work performed on a work site. This prevents, in the typical hoisting work, the receiving member from impeding the typical hoisting work, and further can achieve reduction in the weight of the mobile crane by the weight of the receiving member.

In the mobile crane, the at least one receiving member may have a longitudinally extendable and retractable structure.

In this aspect, for the specific work, the receiving member is extended to increase the distance to the turning-over fulcrum. The resultant receiving member can more stably support the mobile crane, and the contact part of the receiving member can receive a larger reaction force from the ground in the specific work. In contrast, for the typical hoisting work, the receiving member is retracted to prevent the receiving member from impeding the hoisting work. Additionally, the receiving member in the retracted state can serve as a trans-lifter for lifting the lower traveling body from the ground.

The mobile crane may further include a parameter calculation part for calculating, based on the physical quantity detected by the physical quantity detector, a moment in a direction in which the weight of the tiltable attachment causes the mobile crane to turn over.

In this aspect, the parameter calculation part calculates the moment based on the physical quantity detected by the physical quantity detector, thereby obtaining the moment of causing the mobile crane to turn over. The calculated moment is notified to the operator via the notification device, for example.

The mobile crane may further include a notification device for notifying an operator of stability information concerning a stability of the mobile crane based on the physical quantity detected by the physical quantity detector.

In this aspect, the operator can acquire the information concerning the stability of the mobile crane via the notification device. Thus, the operator can maneuver the mobile crane by using the information as a criterion, thereby permitting the mobile crane to safely execute the raising and lowering operations.

The mobile crane may further include: a stability determination section for determining the stability based on the physical quantity detected by the physical quantity detector; and a notification control section for outputting a notification instruction of notifying in the notifying device the operator of the stability information concerning the stability determined by the stability determination section.

In this aspect, it is possible to provide the operator with the stability information necessary to safely raise and lower the tiltable attachment in the specific work. The operator having acquired the provided information may manipulate the manipulation lever of the mobile crane for an operation (a avoidance operation) required to avoid a decrease in the stability of the mobile crane. Alternatively, the controller in the mobile crane can automatically execute the avoidance operation to be described later in place of the operator who manipulates the manipulation lever.

Specifically, the mobile crane may further include an operation control section for outputting an operation instruction directing an operation required to avoid a decrease in the stability of the mobile crane based on the stability determined by the stability determination section.

In this aspect, such automatic execution of the avoidance operation in accordance with the operation instruction leads to reduction in the burden on the operator.

The mobile crane may further include a parameter calculation part for calculating a first parameter in connection with a first moment caused by the gravity acting on the tiltable attachment based on the physical quantity, wherein the upper slewing body may carry a counterweight at a position away from the slewing central axis in the opposite direction to the boom direction, and the stability determination section may be configured to determine the stability by comparing the first parameter calculated by the parameter calculation part with a second parameter in connection with a second moment caused to oppose to the first moment and prevent the mobile crane from turning over by the gravity acting on the counterweight.

In this aspect, the comparison between the first parameter and the second parameter can contribute to the comparison between the first moment of causing the mobile crane to turn over and the second moment of preventing the mobile crane from turning over. Accordingly, the stability of the mobile crane is appropriately determined. The first parameter may be the first moment itself, or may be other parameter which changes in accordance with a change in the first moment. Similarly, the second parameter may be the second moment itself, or may be other parameter which changes in accordance with a change in the second moment.

The mobile crane may further include: a ratio calculation part for calculating a ratio between the first parameter and the second parameter, wherein the stability determination section may be configured to determine the stability based on the ratio.

In this aspect, the stability determination section can determine the stability based on the ratio calculated by the ratio calculation part.

The invention claimed is:
1. A mobile crane, comprising:
a lower traveling body which includes a pair of crawlers each extending in forward and rearward directions and spaced apart from each other in leftward and rightward directions;
an upper slewing body supported on the lower traveling body slewably about a slewing axis;
a tiltable attachment including a boom tiltably supported on the upper slewing body; and
a physical quantity detector, wherein
the lower traveling body has a reaction force receiving part for receiving a reaction force from the ground at a position away from the slewing axis in a boom direction in a state where the pair of crawlers is in contact with the ground, the boom direction coinciding with a horizontal component of a direction in which the boom extends from the upper slewing body, and
the physical quantity detector is configured to detect a physical quantity which changes in accordance with a change in the reaction force received from the ground by the reaction force receiving part,
wherein the mobile crane further comprises:
a notification device for notifying an operator of stability information concerning a stability of the mobile crane based on the physical quantity detected by the physical quantity detector;

a stability determination section for determining the stability based on the physical quantity detected by the physical quantity detector; and a notification control section for outputting a notification instruction of notifying in the notifying device the operator of the stability information concerning the stability determined by the stability determination section.

2. The mobile crane according to claim 1, wherein
the boom direction corresponds to one of the forward and rearward directions of the lower traveling body,
each of the pair of crawlers includes:
  a crawler frame extending in the forward and rearward directions; and
  a first wheel supported on one of a front end and a rear end of the crawler frame and rotatable about a rotational axis, the one end being away from the slewing axis in the boom direction, and
the first wheel serves as the reaction force receiving part.

3. The mobile crane according to claim 2, wherein
each of the pair of crawlers includes:
  a second wheel supported on the other of the front end and the rear end of the crawler frame and rotatable about a rotational axis; and
  a crawling member endlessly supported by the first wheel and the second wheel and cyclically movable, and
the physical quantity detector is configured to detect, as the physical quantity, a strain that is caused in the crawler frame of at least one of the pair of crawlers by the reaction force which the first wheel receives from the ground via the crawling member.

4. The mobile crane according to claim 3, wherein
each of the pair of crawlers further includes a plurality of lower rollers rotatably supported on a lower portion of the crawler frame and arranged at intervals between the first wheel and the second wheel in the forward and rearward directions for guiding the crawling member, and
the physical quantity detector is configured to detect the strain on a specific portion of the crawler frame in the forward and rearward directions, the specific portion being away in the boom direction from a rotational axis of a lower roller closest to the first wheel among the plurality of lower rollers.

5. The mobile crane according to claim 3, wherein
each of the pair of crawlers further includes a plurality of lower rollers rotatably supported on a lower portion of the crawler frame and arranged at intervals between the first wheel and the second wheel in the forward and rearward directions for guiding the crawling member, and
the physical quantity detector is configured to detect the strain on a specific portion of the crawler frame in the forward and rearward directions, the specific portion being located in a region between a rotational axis of a lower roller closest to the first wheel among the plurality of lower rollers and the rotational axis of the first wheel.

6. The mobile crane according to claim 3, wherein
the physical quantity detector is configured to detect the strain occurring in the one end of the crawler frame that supports the first wheel.

7. The mobile crane according to claim 6, wherein
the crawler frame includes a frame main body extending in the forward and rearward directions, and a bracket attached to an end of the frame main body to thereby constitute the one end of the crawler frame, and
the physical quantity detector is configured to detect the strain occurring in the bracket.

8. The mobile crane according to claim 1, wherein
each of the pair of crawlers includes a crawler frame extending in the forward and rearward directions,
the lower traveling body includes:
  a center frame lying between the crawler frame of one of the pair of crawlers and the crawler frame of the other of the pair of crawlers, and connecting the crawler frames with each other; and
  at least one receiving member,
the crawler frame of the one crawler, the crawler frame of the other crawler, and the center frame constitute a frame unit,
the at least one receiving member has a connection part connected with the frame unit, and a contact part being in contact with the ground,
the connection part is away from the slewing central axis in the boom direction, and
the contact part is away from the connection part in the boom direction and serves as the reaction force receiving part.

9. The mobile crane according to claim 8, wherein
the at least one receiving member includes a hydraulic cylinder extendable and retractable in upward and downward directions.

10. The mobile crane according to claim 9, further comprising:
  a hydraulic pump for discharging hydraulic fluid;
  a control valve disposed between the hydraulic pump and the hydraulic cylinder, and shiftable between a supply position for supplying the hydraulic fluid discharged by the hydraulic pump to the hydraulic cylinder through a hydraulic path and a suspension position for suspending the supply of the hydraulic fluid discharged from the hydraulic pump to the hydraulic cylinder; and
  an instruction device for instructing the control valve to shift between the supply position and the suspension position.

11. The mobile crane according to claim 9, wherein
the physical quantity detector includes a pressure sensor for detecting, as the physical quantity, at least one of a pressure on a head side of the hydraulic cylinder and a pressure on a rod side of the hydraulic cylinder.

12. The mobile crane according to claim 8, wherein
the at least one receiving member includes a beam including the connection part and extending from the connection part in the boom direction or in a direction oblique to the boom direction, and a leg including the contact part and attached to a distal end of the beam.

13. The mobile crane according to claim 12, wherein
the physical quantity detector is configured to detect a strain occurring in the beam as the physical quantity.

14. The mobile crane according to claim 13, wherein
the physical quantity detector includes a first device for detecting a strain occurring in an upper portion of the beam, and a second device for detecting a strain occurring in a lower portion of the beam.

15. The mobile crane according to claim 8, wherein
the boom direction corresponds to one of the leftward and rightward directions of the lower traveling body,
the at least one receiving member includes:
  a first receiving member attached to the crawler frame of the one crawler; and a second receiving member attached to the crawler frame of the one crawler at a distance from the first receiving member in the forward and rearward directions, and each of the first receiving member and the second receiving member is arranged so that the contact part is away from the connection part in the boom direction.

16. The mobile crane according to claim 8, wherein the boom direction corresponds to one of the forward and rearward directions of the lower traveling body, the at least one receiving member includes:
- a first receiving member attached to the center frame; and
- a second receiving member attached to the center frame at a distance from the first receiving member in the leftward and rightward directions, and each of the first receiving member and the second receiving member is arranged so that the contact part is away from the connection part in the boom direction.

17. The mobile crane according to claim 16, wherein each of the pair of the crawlers includes a wheel supported on one of a front end and a rear end of the crawler frame rotatably about a rotational axis, the one end being away from the slewing central axis in the boom direction, and each of the first receiving member and the second receiving member is arranged so that the center of the contact part is away in the boom direction from the rotational axis of the wheel of each of the pair of crawlers.

18. The mobile crane according to claim 8, wherein the boom direction corresponds to one of the forward and rearward directions of the lower traveling body, the at least one receiving member includes:
- a first right receiving member and a first left receiving member each attached to a first crawler frame that is the crawler frame of the one crawler; and
- a second right receiving member and a second left receiving member each attached to a second crawler frame that is the crawler frame of the other crawler, the first right receiving member is arranged so that the contact part of the first right receiving member is away rightward from the first crawler frame and is away from the connection part of the first right receiving member in the boom direction, the first left receiving member is arranged so that the contact part of the first left receiving member is away leftward from the first crawler frame and is away from the connection part of the first left receiving member in the boom direction, the second right receiving member is arranged so that the contact part of the second right receiving member is away rightward from the second crawler frame and is away from the connection part of the second right receiving member in the boom direction, and the second left receiving member is arranged so that the contact part of the second left receiving member is away leftward from the second crawler frame and is away from the connection part of the second left receiving member in the boom direction.

19. The mobile crane according to claim 18, wherein each of the pair of crawlers includes a wheel supported on one of a front end and a rear end of the crawler frame rotatably about a rotational axis, the one end being away from the slewing central axis in the one of the forward and rearward directions, and each of the first right receiving member, the first left receiving member, the second right receiving member, and the second left receiving member is arranged so that the center of the contact part is away from the rotational axis of the wheel of each of the pair of crawlers in the boom direction.

20. The mobile crane according to claim 8, wherein the receiving member has a configuration to allow at least a part of the receiving member to be disengageably engaged with an engaging portion.

21. The mobile crane according to claim 8, wherein the at least one receiving member has a longitudinally extendable and retractable structure.

22. The mobile crane according to claim 1, further comprising a parameter calculation part for calculating, based on the physical quantity detected by the physical quantity detector, a moment in a direction in which the weight of the tiltable attachment causes the mobile crane to turn over.

23. The mobile crane according to claim 1, further comprising an operation control section for outputting an operation instruction directing an operation required to avoid a decrease in the stability of the mobile crane based on the stability determined by the stability determination section.

24. The mobile crane according to claim 1, further comprising a parameter calculation part for calculating a first parameter in connection with a first moment caused by the gravity acting on the tiltable attachment based on the physical quantity, wherein the upper slewing body carries a counterweight at a position away from the slewing central axis in the opposite direction to the boom direction, and the stability determination section is configured to determine the stability by comparing the first parameter calculated by the parameter calculation part with a second parameter in connection with a second moment caused to oppose to the first moment and prevent the mobile crane from turning over by the gravity acting on the counterweight.

25. The mobile crane according to claim 24, further comprising:

a ratio calculation part for calculating a ratio between the first parameter and the second parameter, wherein the stability determination section is configured to determine the stability based on the ratio.

* * * * *